(12) United States Patent
Brandt

(10) Patent No.: US 10,637,673 B2
(45) Date of Patent: Apr. 28, 2020

(54) ENERGY HARVESTING NODES IN A MESH NETWORK

(71) Applicant: Silicon Laboratories Inc., Austin, TX (US)

(72) Inventor: Anders T. Brandt, Søborg (DK)

(73) Assignee: Silicon Laboratories Inc., Austin, TX (US)

(*) Notice: Subject to any disclaimer, the term of this patent is extended or adjusted under 35 U.S.C. 154(b) by 44 days.

(21) Appl. No.: 15/837,920

(22) Filed: Dec. 11, 2017

(65) Prior Publication Data

US 2018/0167224 A1 Jun. 14, 2018

Related U.S. Application Data

(60) Provisional application No. 62/432,864, filed on Dec. 12, 2016.

(51) Int. Cl.
*H04L 12/10* (2006.01)
*H04W 48/10* (2009.01)
(Continued)

(52) U.S. Cl.
CPC ............... *H04L 12/10* (2013.01); *H04B 7/15* (2013.01); *H04Q 9/00* (2013.01); *H04W 48/10* (2013.01);
(Continued)

(58) Field of Classification Search
CPC ....... H04L 12/10; H04L 67/125; H04L 67/28; H04W 48/10; H04W 84/18;
(Continued)

(56) References Cited

U.S. PATENT DOCUMENTS

| 5,371,782 A | 12/1994 | Casey |
| 5,388,149 A | 2/1995 | Lynn |

(Continued)

FOREIGN PATENT DOCUMENTS

| JP | 2002185559 | 6/2002 |
| JP | 2005203991 | 7/2005 |

(Continued)

OTHER PUBLICATIONS

Leventis, et al., "Intelligent Devices for Appliances Control in Home Networks," IEEE Transactions on Consumer Electronics, vol. 49, No. 2, pp. 328-336 (May 2003).

*Primary Examiner* — Faisal Choudhury
(74) *Attorney, Agent, or Firm* — Egan Peterman Enders Huston

(57) ABSTRACT

In embodiments of the present disclosure improved capabilities are described for an RF wireless energy-harvesting device comprising an energy-harvesting mechanism, a message generation facility, and a transmission facility, wherein the RF wireless energy-harvesting device generates electrical energy through the energy harvesting mechanism from a harvesting action, generates a message through the message generation facility, and transmits the message through the transmission facility to a second wireless device, wherein the second wireless device is a second RF wireless energy-harvesting device, a networked device, a mesh network node, or the like.

16 Claims, 59 Drawing Sheets

(51) Int. Cl.
*H04B 7/15* (2006.01)
*H04Q 9/00* (2006.01)
H04L 29/08 (2006.01)
H04W 52/02 (2009.01)
H04W 84/18 (2009.01)

(52) U.S. Cl.
CPC ............ *H04L 67/125* (2013.01); *H04L 67/28* (2013.01); *H04Q 2209/25* (2013.01); *H04Q 2209/40* (2013.01); *H04Q 2209/883* (2013.01); *H04Q 2209/886* (2013.01); *H04Q 2213/08* (2013.01); *H04W 52/0216* (2013.01); *H04W 52/0229* (2013.01); *H04W 84/18* (2013.01); *Y02D 70/1224* (2018.01); *Y02D 70/142* (2018.01); *Y02D 70/144* (2018.01); *Y02D 70/164* (2018.01); *Y02D 70/168* (2018.01); *Y02D 70/20* (2018.01); *Y02D 70/22* (2018.01); *Y02D 70/26* (2018.01)

(58) Field of Classification Search
CPC ......... H04W 52/0216; H04W 52/0229; H04Q 9/00; H04Q 2213/08; H04Q 2209/25; H04Q 2209/40; H04Q 2209/883; H04Q 2209/886; H04B 7/15; Y02D 70/142; Y02D 70/1224; Y02D 70/20; Y02D 70/26; Y02D 70/22; Y02D 70/144; Y02D 70/164; Y02D 70/168
USPC ........................................................ 370/315
See application file for complete search history.

(56) References Cited

U.S. PATENT DOCUMENTS

| | | |
|---|---|---|
| 5,706,191 A | 1/1998 | Bassett |
| 5,877,957 A | 3/1999 | Bennett |
| 5,935,213 A | 8/1999 | Rananand |
| 5,946,462 A | 8/1999 | Rangan |
| 5,987,011 A | 11/1999 | Toh |
| 6,006,272 A | 12/1999 | Aravamudan |
| 6,192,282 B1 | 2/2001 | Smith |
| 6,195,340 B1 | 2/2001 | Hatayama |
| 6,285,665 B1 | 9/2001 | Chuah |
| 6,301,239 B1 | 10/2001 | Chuprun |
| 6,324,162 B1 | 11/2001 | Chaudhuri |
| 6,462,507 B2 | 10/2002 | Fisher |
| 6,477,171 B1 | 11/2002 | Wakeley |
| 6,480,497 B1 | 11/2002 | Flammer |
| 6,532,222 B1 | 3/2003 | Rege |
| 6,549,513 B1 | 4/2003 | Chao |
| 6,631,134 B1 | 10/2003 | Zadikian |
| 6,633,547 B1 | 10/2003 | Akatsu |
| 6,707,821 B1 | 3/2004 | Shaffer |
| 6,792,474 B1 | 9/2004 | Hopprich |
| 6,816,538 B2 | 11/2004 | Shuey |
| 6,865,428 B2 | 3/2005 | Gonzales |
| 6,901,439 B1 | 5/2005 | Bonasia |
| 6,909,356 B2 | 6/2005 | Brown |
| 6,912,221 B1 | 6/2005 | Zadikian |
| 6,912,429 B1 | 6/2005 | Bilger |
| 6,915,130 B1 | 7/2005 | Chapman |
| 6,950,391 B1 | 9/2005 | Zadikian |
| 6,961,763 B1 | 11/2005 | Wang |
| 6,990,111 B2 | 1/2006 | Lemoff |
| 7,047,092 B2 | 5/2006 | Wimsatt |
| 7,051,116 B1 | 5/2006 | Rodriguez-Val |
| 7,053,770 B2 | 5/2006 | Ratiu |
| 7,069,483 B2 | 6/2006 | Gillies |
| 7,075,919 B1 | 7/2006 | Wendt |
| 7,088,676 B1 | 8/2006 | Doverspike |
| 7,225,268 B2 | 5/2007 | Watanabe |
| 7,248,217 B2 | 7/2007 | Mani |
| 7,274,869 B1 | 9/2007 | Pan |
| 7,353,280 B2 | 4/2008 | Chiles |
| 7,382,731 B1 | 6/2008 | Zhao |
| 7,428,212 B2 | 9/2008 | Saleh |
| 7,433,702 B2 | 10/2008 | Lindskog |
| 7,437,079 B1 | 10/2008 | Hofmeister |
| 7,487,221 B2 | 2/2009 | Araki |
| 7,522,540 B1 | 4/2009 | Maufer |
| 7,554,998 B2 | 6/2009 | Simonsson |
| 7,571,063 B2 | 8/2009 | Tamagni |
| 7,606,175 B1 | 10/2009 | Maufer |
| 7,680,041 B2 | 3/2010 | Johansen |
| 7,729,329 B2 | 6/2010 | Fujita |
| 7,983,820 B2 | 7/2011 | Kelly |
| 8,089,874 B2 | 1/2012 | Johansen |
| 8,121,117 B1 | 2/2012 | Amdahl |
| 8,194,569 B2 | 6/2012 | Shorty |
| 8,219,705 B2 | 7/2012 | Shorty |
| 8,223,783 B2 | 7/2012 | Shorty |
| 8,300,652 B2 | 10/2012 | Christensen |
| 8,339,069 B2 | 12/2012 | Chemel |
| 8,442,042 B2 | 5/2013 | McCoy |
| 8,509,790 B2 | 8/2013 | Christensen |
| 8,526,415 B2 | 9/2013 | Manjeshwar |
| 8,582,431 B2 | 11/2013 | Johansen |
| 8,622,314 B2 | 1/2014 | Matsuoka |
| 8,626,178 B2 | 1/2014 | Johansen |
| 8,626,251 B2 | 1/2014 | Johansen |
| 8,719,337 B1 | 5/2014 | Islam |
| 8,724,532 B2 * | 5/2014 | Shorty .................... H04L 12/10 370/311 |
| 8,725,845 B2 | 5/2014 | Moorer |
| 8,885,482 B2 | 11/2014 | Christensen |
| 9,001,653 B2 | 4/2015 | Johansen |
| 9,072,133 B2 | 6/2015 | Chemel |
| 9,166,812 B2 | 10/2015 | Shorty |
| 9,183,733 B2 | 11/2015 | Kates |
| 9,237,141 B2 | 1/2016 | Logue |
| 9,318,015 B2 | 4/2016 | Kates |
| 9,326,407 B1 | 4/2016 | Musolin |
| 9,418,802 B2 | 8/2016 | Kroymann |
| 9,729,342 B2 | 8/2017 | Dial |
| 9,740,187 B2 | 8/2017 | Wilson |
| 9,954,692 B2 | 4/2018 | Brandt |
| 2001/0021984 A1 | 9/2001 | Kim |
| 2002/0010641 A1 | 1/2002 | Stevens |
| 2002/0015422 A1 | 2/2002 | Inada |
| 2002/0016639 A1 | 2/2002 | Smith |
| 2002/0044042 A1 | 4/2002 | Christensen |
| 2002/0122410 A1 | 9/2002 | Kulikov |
| 2002/0124097 A1 | 9/2002 | Isely |
| 2002/0163904 A1 | 11/2002 | Rao |
| 2003/0028887 A1 | 2/2003 | Frouin |
| 2003/0035424 A1 | 2/2003 | Abdollahi |
| 2003/0103088 A1 | 6/2003 | Dresti |
| 2003/0117969 A1 | 6/2003 | Koo |
| 2003/0135797 A1 | 7/2003 | Choi |
| 2003/0152041 A1 | 8/2003 | Herrmann |
| 2003/0162548 A1 | 8/2003 | Kujala |
| 2003/0200009 A1 | 10/2003 | von Kannewurff |
| 2003/0221195 A1 | 11/2003 | Bizet |
| 2004/0024688 A1 | 2/2004 | Bi |
| 2004/0039459 A1 | 2/2004 | Daugherty |
| 2004/0090943 A1 | 5/2004 | da Costa |
| 2004/0138768 A1 | 7/2004 | Murray |
| 2004/0208180 A1 | 10/2004 | Light |
| 2004/0215816 A1 | 10/2004 | Hayes |
| 2004/0267909 A1 | 12/2004 | Autret |
| 2005/0002533 A1 | 1/2005 | Langin-Hooper |
| 2005/0009498 A1 | 1/2005 | Ho |
| 2005/0025085 A1 | 2/2005 | King |
| 2005/0030177 A1 | 2/2005 | Albsmeier |
| 2005/0035717 A1 | 2/2005 | Adamson |
| 2005/0037787 A1 | 2/2005 | Bachner |
| 2005/0125083 A1 | 6/2005 | Kiko |
| 2005/0131551 A1 | 6/2005 | Ruutu |
| 2005/0136972 A1 | 6/2005 | Smith |
| 2005/0159823 A1 | 7/2005 | Hayes |
| 2005/0163088 A1 | 7/2005 | Yamano |
| 2005/0180438 A1 * | 8/2005 | Ko .......................... H04L 45/02 370/401 |

(56) References Cited

U.S. PATENT DOCUMENTS

| | | |
|---|---|---|
| 2005/0185588 A1 | 8/2005 | Park |
| 2005/0190759 A1 | 9/2005 | Lee |
| 2005/0204385 A1 | 9/2005 | Sull |
| 2005/0243765 A1 | 11/2005 | Schrader |
| 2005/0249139 A1 | 11/2005 | Nesbit |
| 2006/0007001 A1 | 1/2006 | Rastegar |
| 2006/0009861 A1 | 1/2006 | Bonasia |
| 2006/0026296 A1 | 2/2006 | Nagaraj |
| 2006/0056368 A1 | 3/2006 | Ratiu |
| 2006/0056456 A1 | 3/2006 | Ratiu |
| 2006/0066455 A1 | 3/2006 | Hancock |
| 2006/0075140 A1 | 4/2006 | Sobel |
| 2006/0104291 A1 | 5/2006 | Rodriguez |
| 2006/0109787 A1 | 5/2006 | Strutt |
| 2006/0126617 A1 | 6/2006 | Cregg |
| 2006/0129850 A1 | 6/2006 | Hassan |
| 2006/0145842 A1 | 7/2006 | Stilp |
| 2006/0146717 A1 | 7/2006 | Conner |
| 2006/0146875 A1 | 7/2006 | Yang |
| 2006/0153081 A1 | 7/2006 | Simonsson |
| 2006/0183421 A1 | 8/2006 | Proctor |
| 2006/0215556 A1 | 9/2006 | Wu |
| 2006/0215627 A1 | 9/2006 | Waxman |
| 2006/0221891 A1 | 10/2006 | Schmitz |
| 2006/0253735 A1 | 11/2006 | Kwak |
| 2006/0268685 A1 | 11/2006 | Bender |
| 2006/0268692 A1 | 11/2006 | Wright |
| 2006/0271244 A1 | 11/2006 | Cumming |
| 2006/0271703 A1 | 11/2006 | Kim |
| 2007/0022185 A1 | 1/2007 | Hamilton |
| 2007/0112939 A1 | 5/2007 | Wilson |
| 2007/0153702 A1 | 7/2007 | Khan Alicherry |
| 2007/0162536 A1 | 7/2007 | Ostrovsky |
| 2007/0177538 A1 | 8/2007 | Christensen |
| 2007/0177576 A1 | 8/2007 | Johansen |
| 2007/0177613 A1 | 8/2007 | Shorty |
| 2007/0183457 A1 | 8/2007 | Leitch |
| 2007/0195808 A1 | 8/2007 | Ehrlich |
| 2007/0201504 A1 | 8/2007 | Christensen |
| 2007/0204009 A1 | 8/2007 | Shorty |
| 2007/0222585 A1 | 9/2007 | Sabol |
| 2007/0248047 A1 | 10/2007 | Shorty |
| 2007/0258508 A1 | 11/2007 | Werb |
| 2007/0263647 A1 | 11/2007 | Shorty |
| 2007/0286205 A1 | 12/2007 | Johansen |
| 2008/0130535 A1 | 6/2008 | Shorty |
| 2008/0130562 A1 | 6/2008 | Shorty |
| 2008/0151795 A1 | 6/2008 | Shorty |
| 2008/0151824 A1 | 6/2008 | Shorty |
| 2008/0151825 A1 | 6/2008 | Shorty |
| 2008/0151826 A1 | 6/2008 | Shorty |
| 2008/0151827 A1 | 6/2008 | Shorty |
| 2008/0154396 A1 | 6/2008 | Shorty |
| 2008/0159213 A1 | 7/2008 | Shorty |
| 2008/0165712 A1 | 7/2008 | Shorty |
| 2008/0170511 A1 | 7/2008 | Shorty |
| 2008/0291855 A1 | 11/2008 | Bata |
| 2008/0316048 A1 | 12/2008 | Abdallah |
| 2009/0044129 A1 | 2/2009 | Ebrom |
| 2009/0077405 A1 | 3/2009 | Johansen |
| 2009/0082888 A1 | 3/2009 | Johansen |
| 2010/0090655 A1* | 4/2010 | Keating ................ H02J 50/00 320/137 |
| 2010/0149967 A1 | 6/2010 | Johansen |
| 2010/0283579 A1 | 11/2010 | Kraus |
| 2011/0029659 A1 | 2/2011 | Shah |
| 2011/0235575 A1 | 9/2011 | Tapia |
| 2011/0299601 A1 | 12/2011 | Lai |
| 2011/0314274 A1 | 12/2011 | Swartz |
| 2012/0113841 A1 | 5/2012 | Todd |
| 2012/0155253 A1 | 6/2012 | Johansen |
| 2012/0207179 A1 | 8/2012 | Ree |
| 2012/0269131 A1 | 10/2012 | Shorty |
| 2012/0275343 A1 | 11/2012 | Shorty |
| 2012/0281521 A1 | 11/2012 | Shorty |
| 2012/0320751 A1 | 12/2012 | Zhu |
| 2013/0121176 A1* | 5/2013 | Addepalli ............... H04L 67/12 370/252 |
| 2013/0124883 A1* | 5/2013 | Addepalli ................ G06F 1/28 713/310 |
| 2013/0128831 A1 | 5/2013 | Calcev |
| 2013/0142051 A1 | 6/2013 | Christensen |
| 2013/0219482 A1 | 8/2013 | Brandt |
| 2014/0098658 A1 | 4/2014 | Johansen |
| 2015/0115868 A1* | 4/2015 | Ping ......................... H02J 7/34 320/101 |
| 2015/0117462 A1 | 4/2015 | Brandt |
| 2015/0131485 A1 | 5/2015 | Brandt |
| 2015/0142945 A1 | 5/2015 | Brandt |
| 2015/0147067 A1* | 5/2015 | Ryan ..................... H04B 10/116 398/118 |
| 2015/0187209 A1 | 7/2015 | Brandt |
| 2015/0244121 A1 | 8/2015 | Amelio |
| 2015/0271176 A1 | 9/2015 | Wei |
| 2016/0073429 A1 | 3/2016 | Oteri |
| 2017/0005819 A1 | 1/2017 | Brandt |
| 2017/0006521 A1 | 1/2017 | Brandt |
| 2017/0180062 A1 | 6/2017 | Johansen |
| 2017/0195839 A1* | 7/2017 | Rittman ................ H04W 4/023 |

FOREIGN PATENT DOCUMENTS

| | | |
|---|---|---|
| JP | 2006050549 | 2/2006 |
| JP | 2006279950 | 10/2006 |
| WO | 0159607 | 8/2001 |
| WO | 2006099134 | 9/2006 |
| WO | 2007047757 | 4/2007 |
| WO | 2008006066 A2 | 1/2008 |
| WO | 2008006066 A3 | 1/2008 |
| WO | 2009029606 A2 | 4/2009 |
| WO | 2009029606 A3 | 4/2009 |

* cited by examiner

ENERGY HARVESTING NODES IN A MESH NETWORK

CLAIM OF PRIORITY

This patent application claims the benefit of provisional U.S. Patent Application Ser. No. 62/432,864, entitled ENERGY HARVESTING NODES IN A MESH NETWORK, and filed Dec. 12, 2016, which is incorporated herein by reference in the entirety for all purposes.

CROSS-REFERENCE TO RELATED APPLICATIONS

This patent application is related to the following patent applications: U.S. patent application Ser. No. 15/376,609, filed Dec. 12, 2016, which claims the benefit of provisional Patent Application Ser. No. 62/268,584, filed Dec. 17, 2015; U.S. patent application Ser. No. 14/644,334, filed Mar. 11, 2015, which claims the benefit of provisional Patent Application Ser. No. 61/952,219, filed Mar. 13, 2014; U.S. patent application Ser. No. 14/593,390, filed Jan. 9, 2015; U.S. patent application Ser. No. 13/763,850, filed Feb. 11, 2013, now abandoned; U.S. patent application Ser. No. 12/198,241, filed Aug. 26, 2008, now granted U.S. Pat. No. 8,626,178; U.S. patent application Ser. No. 11/737,717, filed Apr. 19, 2007, now granted U.S. Pat. No. 9,166,812; U.S. patent application Ser. No. 11/684,442, filed Mar. 9, 2007, now granted U.S. Pat. No. 8,223,783; U.S. patent application Ser. No. 11/684,430, filed Mar. 9, 2007, now granted U.S. Pat. No. 7,680,041; U.S. patent application Ser. No. 11/681,417, filed Mar. 2, 2007, now granted U.S. Pat. No. 8,219,705; U.S. patent application Ser. No. 11/681,401, filed Mar. 2, 2007, now granted U.S. Pat. No. 8,300,562; U.S. patent application Ser. No. 11/552,418, filed Oct. 24, 2006, now granted U.S. Pat. No. 8,194,569; U.S. patent application Ser. No. 11/456,029, filed Jul. 6, 2006, now abandoned; and U.S. patent application Ser. No. 11/425,917, filed Jun. 22, 2006, now granted U.S. Pat. No. 8,509,790, which claims the benefit of the following provisional applications: U.S. Patent Application Ser. No. 60/763,835 filed Jan. 31, 2006; U.S. Patent Application Ser. No. 60/764,394 filed on Feb. 1, 2006; U.S. Patent Application Ser. No. 60/765,810 filed on Feb. 7, 2006; U.S. Patent Application Ser. No. 60/772,089 filed on Feb. 10, 2006, and U.S. Patent Application Ser. No. 62/528,338 filed on Jul. 3, 2017.

All of the above patent applications and patents are incorporated herein by reference in their entirety.

BACKGROUND

1. Field

This disclosure is related to energy harvesting nodes operating in conjunction with a mesh network.

2. Description of Related Art

Coordination of low-power energy-harvesting sensor nodes with a mesh network can be challenging. Therefore, there exists a need for methods and systems for interfacing with such systems.

BRIEF DESCRIPTION OF FIGURES

The disclosure will be more fully understood by reference to the detailed description, in conjunction with the following figures, wherein.

While the disclosure has been described in connection with certain preferred embodiments, other embodiments would be understood by one of ordinary skill in the art and are encompassed herein.

DETAILED DESCRIPTION

The present disclosure relates to a reliable and low-cost control and monitoring technology which enables embedded intelligence and wireless communication for a variety of residential and light commercial applications such as lighting and appliance control, automated meter reading, thermostat and ventilation control, security, and residential gateway connectivity. In embodiments, a mesh network node may transform any stand-alone device into an intelligent networked device that may be controlled and monitored wirelessly. The mesh network delivers high reliability networking at a fraction of the cost of other technologies by focusing on narrow bandwidth applications and substituting costly hardware with innovative software solutions such as frame acknowledgement, retransmission, collision avoidance, frame checksum, and sophisticated routing algorithms to assure full home coverage.

One of the key features of the mesh network technology is the routing capability of all the nodes in the network. The mesh network automatically routes the signal from one node to the next thereby extending the range. Rather than depending solely on line-of-sight communications like other technologies, the mesh network is able to get around obstacles by routing commands through other device-nodes in the network when required. The mesh network technology also minimizes noise and distortion problems caused by architectural obstacles and radio dead spots using innovative transmission techniques such as 2-way acknowledgement and alternative route seeking.

Figure 1:
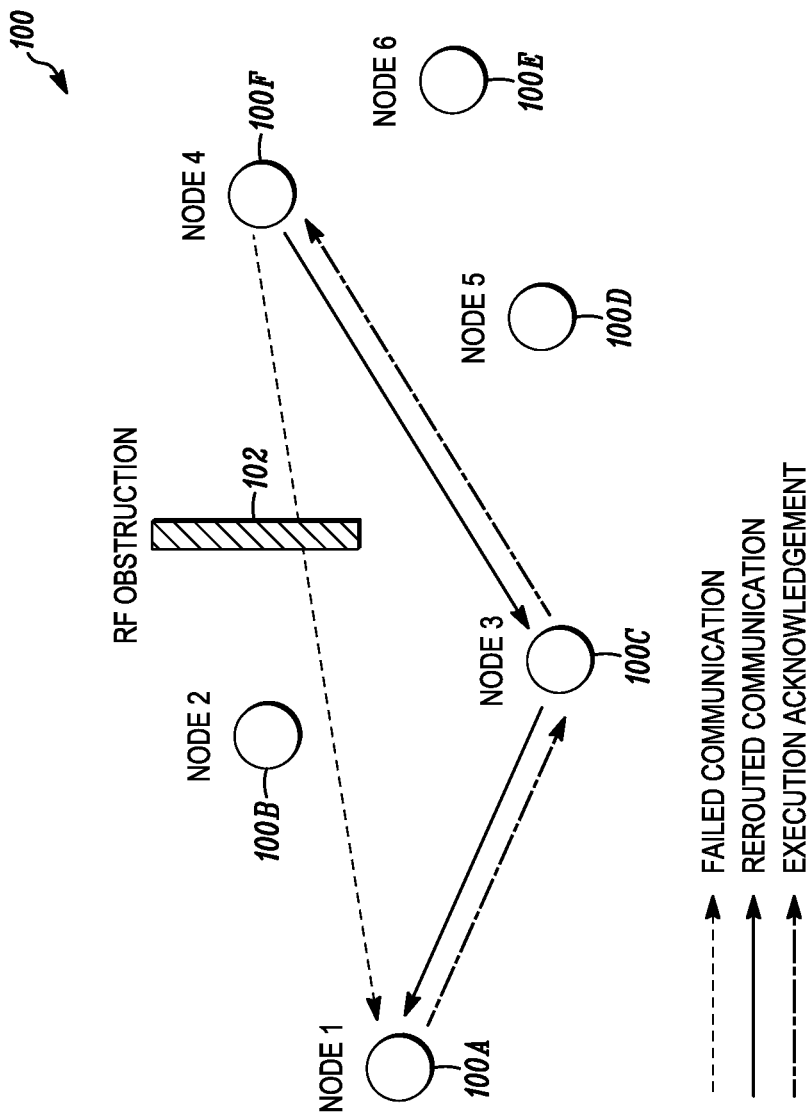
FIG. 1 illustrates a mesh network which includes a number of network nodes.

For example, FIG. 1 illustrates a mesh network 100 which includes a number of network nodes. The user may command a light associated with Node1 100A in a garage to turn off from Node4 100F in a master bedroom. If the direct transmission to Node1 100A is blocked by some Radio Frequency (RF) obstruction 102 (e.g. a stainless steel refrigerator in a kitchen) Node4 100F automatically selects an alternate route, such as through Node3 100C (e.g. a thermostat in a hallway), rerouting as many times as is necessary to complete delivery of a command. An acknowledgement is then sent back to Node4 100F confirming that the command has been executed by Node1 100A.

The mesh network infrastructure is decentralized, with nodes running as both client and as repeater to avoid central points of failure and control. Every new component that is added to the network increases path redundancy and reliability, with the degree of redundancy and signal strength increasing as a function of node density. If the distance between nodes is decreased by a factor of two, the resulting signal is at least four times more powerful at the receiver.

A mesh network is also self-organizing and doesn't require manual configuration. Because of this, adding new equipment or relocating existing equipment may be as simple as plugging it in and turning it on. The network discovers the new node and may automatically incorporate it into the existing system. The mesh network technology may provide vastly improved area coverage and reliability with virtually unlimited range.

Figure 2:
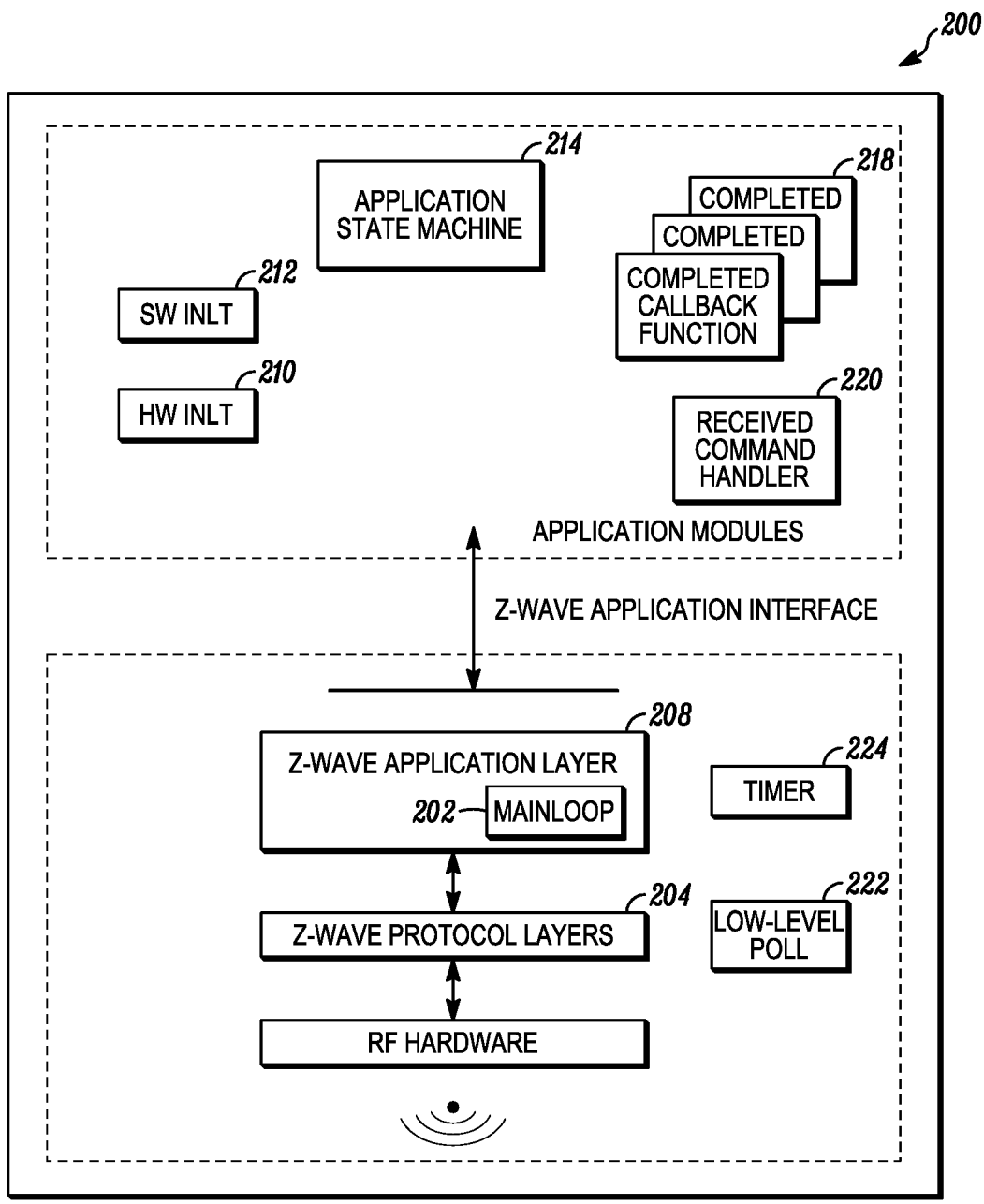
FIG. 2 illustrates a schematic of mesh network and node control software.

Referring to FIG. 2, mesh network software 200 may be designed on polling of functions, command complete callback function calls, and delayed function calls. Software 200 may be split into two groups of program modules: basis software and application software. Basis software may include system startup code, low-level poll function 222, main poll loop 202, protocol layers 204, and memory and timer 224 service functions. Application software may include application hardware initialization 210 and software initialization 212 functions, application state machine 214, command complete callback functions 218, and a received command handler 220 function. The application software may also include hardware drivers.

Main loop 202 may call a list of protocol functions. Functions may be designed to return to the caller as fast as possible to allow the Central Processing Unit (CPU) to do other tasks. It is possible to receive data, transfer data via the Universal Asynchronous Receive Transmit (UART) and check user-activated buttons simultaneously.

When the application layer 208 requests a transmission of data to another node in network 100, the protocol layer may add a frame header and a checksum to the data before transmission. The protocol layer may also handle frame retransmissions, as well as routing of frames through repeater nodes to nodes that are not within direct RF reach. When the frame transmission is completed an application specified transmit complete callback function 218 may be called. The transmission complete callback function 218 may include a parameter that indicates the transmission result.

Application layer 208 may provide the interface to the communications environment which is used by the application process. The application software may consist of the following functions: the hardware initialization function 210, software initialization function 212, application state machine 214, command complete callback functions 218, and a receive command handler function 220. The application implements communication on the application level with other nodes in network 100. At the application level may be a framework defined by device and command classes to obtain interoperability between mesh network enabled products from different vendors. The basic structure of these commands may provide the capability to set parameters in a node and to request parameters from a node responding with a report containing the requested parameters.

Wireless communication is by nature unreliable because a well-defined coverage area simply does not exist since propagation characteristics are dynamic and unpredictable. The mesh network protocol may minimize noise and distortion problems by using a transmission mechanism that may include two re-transmissions to ensure reliable communication. In addition, single casts are acknowledged by a receiving node so the application is notified about how the transmission went.

Figure 3:
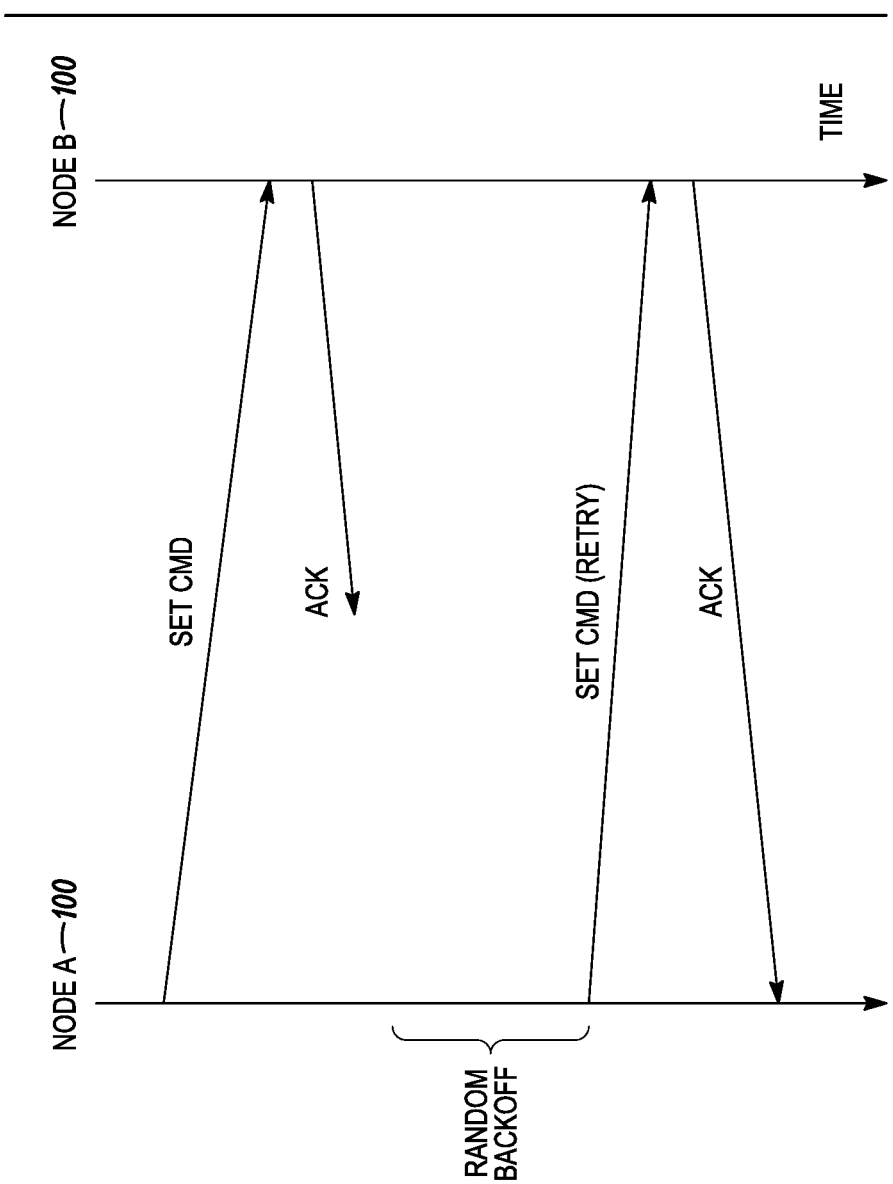
FIG. 3 shows an example of a type of re-transmission hand shaking.
Figure 4:
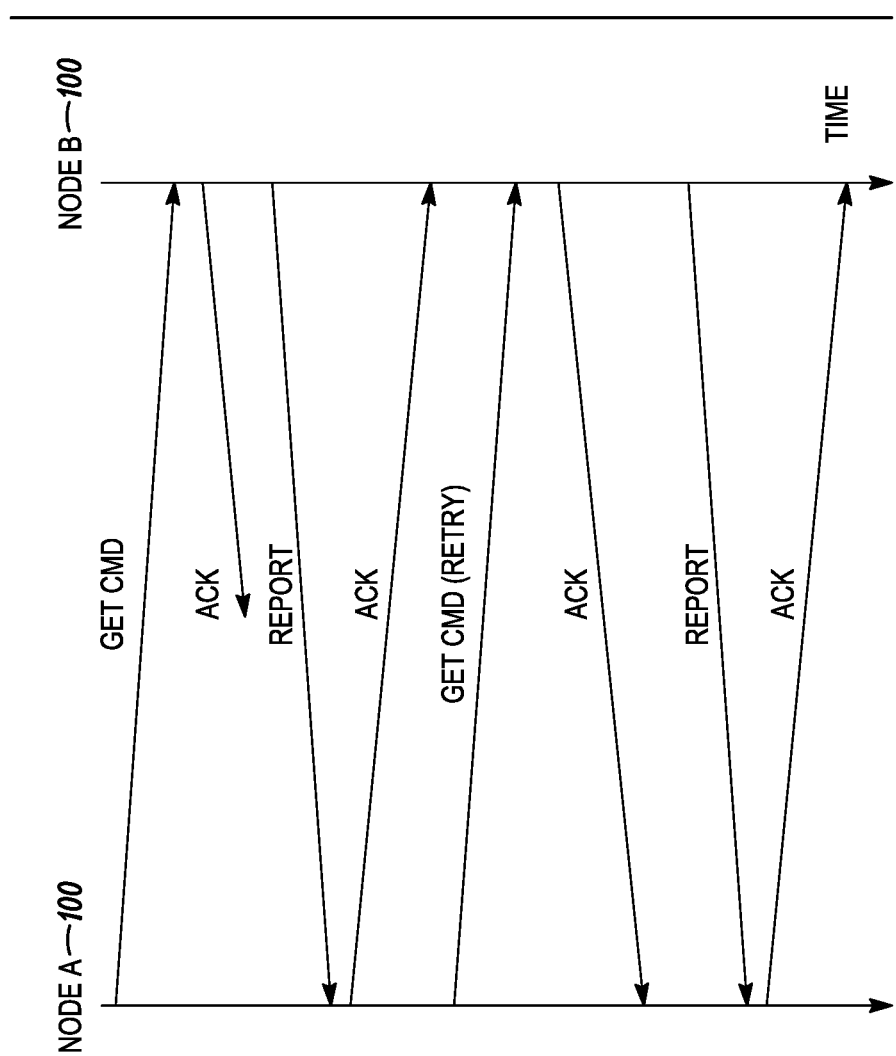
FIG. 4 shows an example of a type of re-transmission hand shaking.

FIGS. 3 and 4 show examples of this type of re-transmission hand shaking. The mesh network protocol may be designed to trade low latency at the expense of handling simultaneously communication to a number of nodes in the network. To obtain this the number of random backoff values is limited to 4 (0, 1, 2, and 3).

Figure 5:
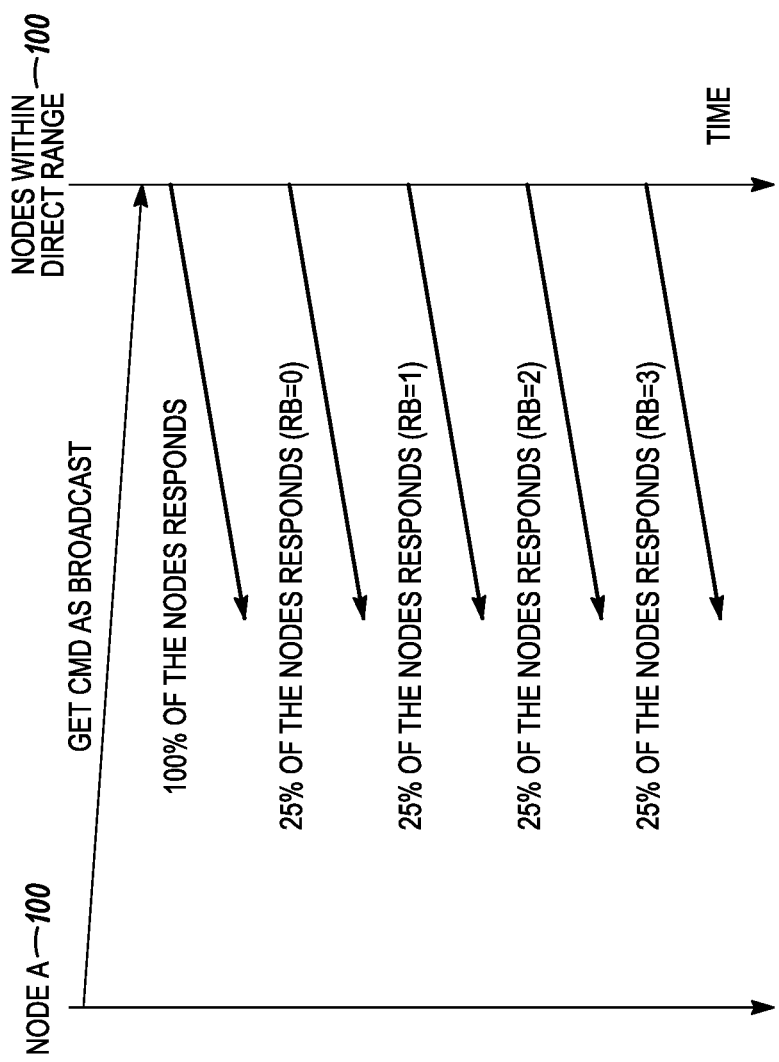
FIG. 5 shows how simultaneous communication to even a small number of nodes impacts communication on a mesh network.

FIG. 5 shows how simultaneous communication to even a small number of nodes 100 may block the communication completely. Simultaneous communication to nodes in the network which require a response from the nodes in question should therefore be avoided in the application.

From a protocol point of view there may be many different types of nodes, for example: Control nodes, Static Controller nodes, Installer Controller nodes, Controller bridge nodes, Slave nodes, Routing Slave nodes, and Enhanced Slave nodes. Controller nodes may store information about other nodes in the network. The node information includes the nodes each of the nodes can communication with (routing information). The Installation node may present itself as a Controller node, which may include extra functionality to help a professional installer setup, configure, and troubleshoot a network. The Controller bridge node may store information about the nodes in the network and in addition it may generate Virtual Slave nodes. A virtual Slave node is a node residing on another network accessible through the bridge.

A network may consist of slaves, a primary controller, and secondary controllers. New nodes may be added and removed to or from the network by using the primary controller. This may cause secondary controllers and routing slaves to malfunction if, for instance, a preferred repeater node is removed. Without automatic network updating a new replication has to be made from the primary controller to all secondary controllers, routing slaves should also be manually updated with the changes. In networks with several controller and routing slave nodes, this could cause difficulties the process is not automated. To automate the process, an automatic network update scheme may be included in the network protocol. To use this scheme a static controller could be available in the network. This static controller may be dedicated to hold a copy of the network topology and the latest changes that have occurred to the network. The static controller used in the automatic update scheme is called the Static Update Controller (SUC).

Each time a node is added, deleted or a routing change occurs, the primary controller may send the node information to the SUC. Secondary controllers may then ask the SUC if any updates are pending. The SUC may then in turn respond with any changes since last time this controller asked for updates. On the controller requesting an update may be called to notify the application that a new node may have been added or removed in the network. The SUC may hold a large number of changes of the network. If a secondary controller requests an updated after more than the maximum changes occurred, then it may not get updates and the request may fail. In this situation a manual replication from the primary controller may be necessary to update information on the secondary controller. Routing slaves may have the ability to request updates for its known destination nodes. If any changes have occurred to the network, the SUC may send updated route information for the destination nodes to the Routing slave that requested the update. The Routing slave application may be notified when the process is done, but may not get information about changes to its routes. Routing slaves may have the ability to request updates for its known destination nodes. If any changes have occurred to the network, the SUC may send updated route information for the designation nodes to the Routing slave that requested the update. The Routing slave application may be notified when the process is done.

A network can optionally have a SUC with enabled node ID server functionality (SIS). The SIS enables other controllers to include/exclude nodes in the network on its behalf. This makes it easier to install complex networks because multiple controllers support inclusion of nodes instead of one dedicated primary controller.

The SIS is the primary controller in the network and it has the latest update of the network topology and capability to include/exclude nodes in the network. Further, it is safer to keep the latest network topology on the SIS (static controller) than a portable primary controller used extensively during network installation. In embodiments, a network may contain only one SIS. A primary controller can instruct a SUC to enable the node ID server functionality (SIS). In case the SUC is primary then the SUC application can enable the node ID server functionality locally.

When including additional controllers to a network containing a SIS they may become inclusion controllers and as such they may obtain the capability to include/exclude nodes in the network on behalf of the SIS. Both portable and static controllers can be inclusion controllers. The inclusion controller's network topology data may be dated from last time a node was included or the last time it requested a network update from the SIS and therefore it may not be classified as a primary controller.

Figure 5A:
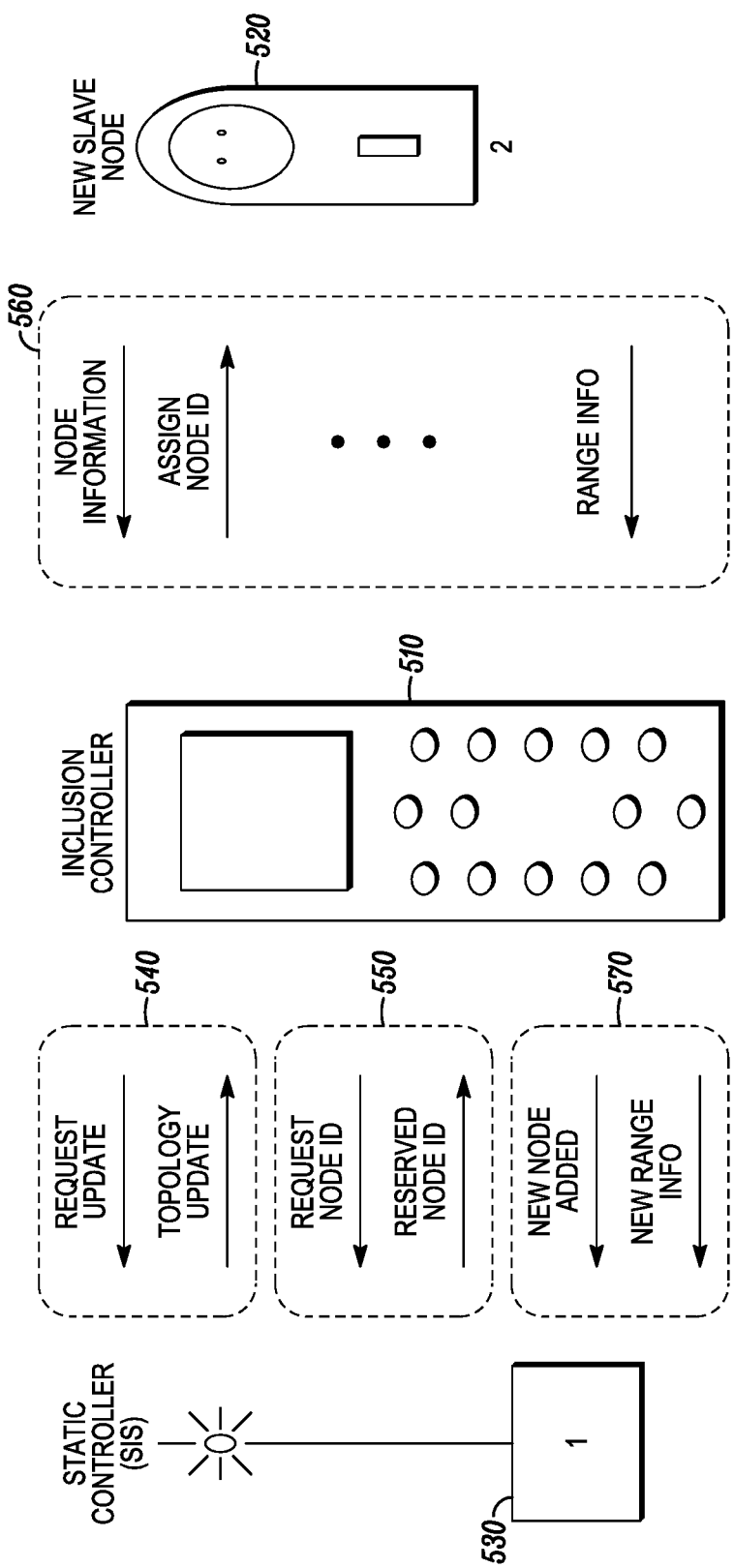
FIG. 5A shows an inclusion controller used to include a new slave on behalf of the network SIS.

FIG. 5A shows an inclusion controller 510 used to include a new slave node 520 on behalf of an SIS 530. Inclusion controller 510 performing the inclusion may first request the latest network topology changes 540 and a free node ID 550 from SIS 530. Inclusion controller 510 may receive node information and range information 560 from newly included slave 520 and may forward such information 570 onto SIS 530. In embodiments, inclusion controller 510 may be within direct range of the node to include.

A failing node may be replaced with a node inheriting the node ID from the failed node. Thereby the user avoids updating nodes having associations to the failed node. Associations within the failed node may be re-established in the new node.

Software components of a system according to the present disclosure may allow a routing slave to extend to a particular number of destinations (e.g. five) having return routes in very low latency applications. In embodiments a routing slave may need to support more than the particular number of destinations and this may require the controller to support favoring return routes for destinations out of direct range with the routing slave. In embodiments, software components may enable a controller to determine if two nodes are within direct range. A routing slave can request new return route destinations from the SUC/SIS node in case the available return routes fails. Furthermore the routing slave can check if a node ID is within direct range in any of the existing return routes.

A software component may be used to cancel ongoing routing attempts. This software component can be used to abort a transmission to a malfunctioning node, thereby eliminating a large amount of routing attempts in a large network.

The software components of a mesh network controller may be split into the controller application and the controller basis software, which may include the mesh network protocol layers and control of the various data stored into memory. Controller nodes may include an external memory in which the application data area may be placed. The controller node may have a unique home ID number assigned, which may be stored in the basis area of memory. When the new slave nodes are registered to the mesh network, the controller node may assign the home ID and a unique node ID to the slave node. The slave node may store the home ID and the node ID. When a controller is primary, it may send any network changes from the SUC node. The use of macros while developing application software may allow adjustments to the interface without changing the application source files.

The software components of a mesh network static controller node may be split into a static controller application and the static controller basis software, which may include the mesh network protocol layers and control of the various data stored into memory. The difference between the Static Controller Node and the Controller Node is that the static controller may not be powered down, that is it may not be used for battery-operated devices. The static controller may have the ability to look for neighbors when requested by a controller. This ability may make it possible for a primary controller to assign static routes from a routing slave to a static controller. The static controller may be set as a SUC node, so it may send network topology updates to any requesting secondary controller. A secondary static controller not functioning as SUC may also request network topology updates.

The software components of a mesh network installer controller may be split into an installer controller application and static controller basis software, which includes the mesh network protocol layer. The installer controller may be a mesh network controller node, which incorporates extra functionality that may be used to implement controllers especially targeted towards professional installers who support and setup a large number of networks.

The software components of a mesh network controller bridge node may be split into a controller bridge application and basis software, which may include the mesh network protocol layer. The controller bridge node may be a mesh network static controller node, which incorporates extra functionality targeted for bridging between the mesh network and other networks.

The software components of a mesh network slave node may be split into a slave application and basis software, which may include the mesh network protocol layer. Slave nodes may have a block of memory reserved for storing data, and may have limited direct access to the block. The home ID and node ID of a new node may be zero. When registering a slave node to a mesh network the slave node may receive home and node ID from the networks primary controller node. These IDs may be stored in the basis data area in memory. The slave may send unsolicited broadcasts and non-routed singlecasts. Further it may be able to respond with a routed singlecast (response route) in case another node has requested this by sending a routed singlecast to it. A received multicast or broadcast may result in a response route without routing.

Figure 6:
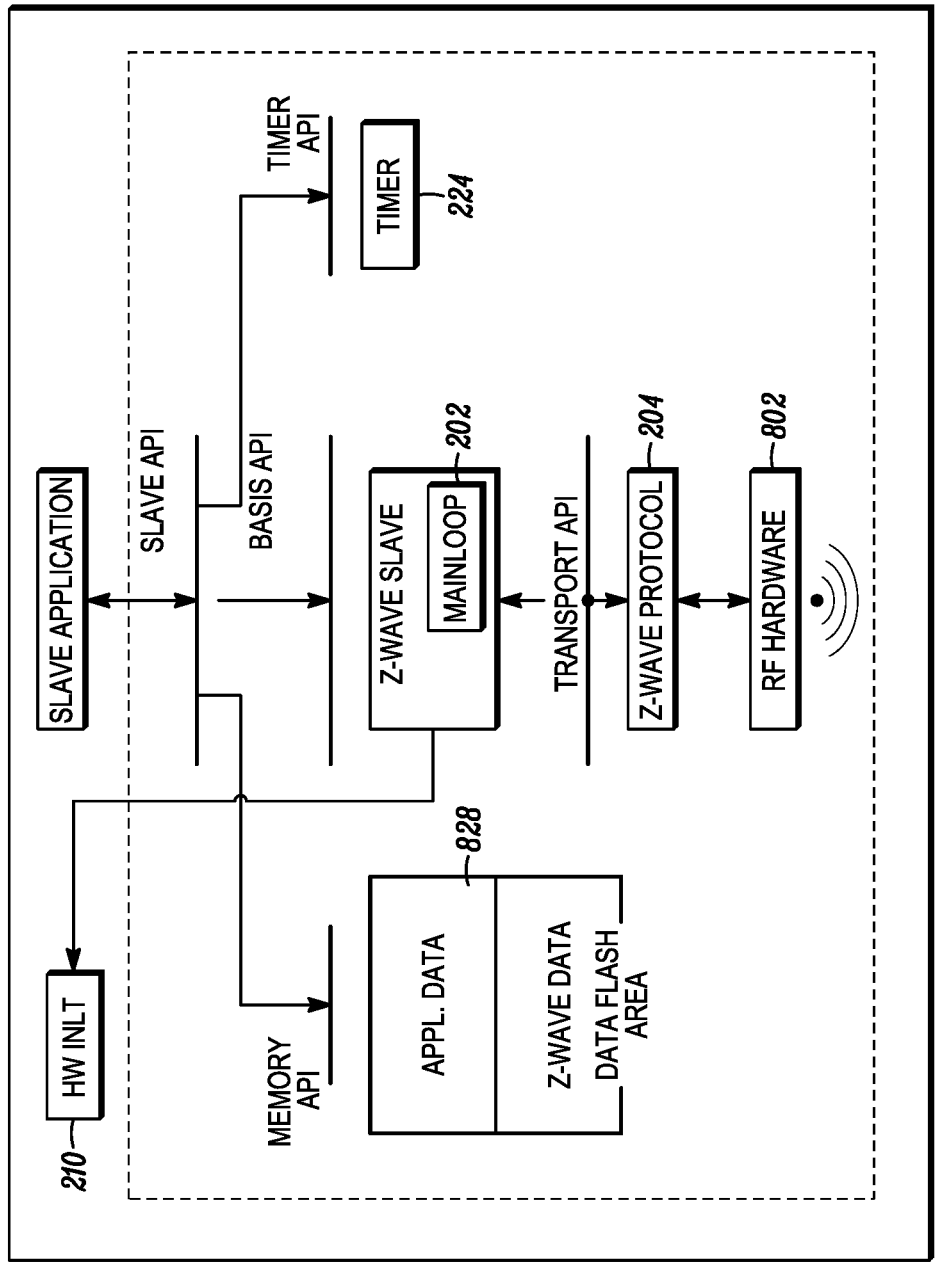
FIG. 6 shows software components of a mesh network split into a slave application and basis software.

FIG. 6 shows how the software components of a mesh network routing slave node may be split into a slave application and basis software, which may include the mesh network protocol layer. Routing slave nodes have a block of memory reserved for storing data, and may have limited direct access to the block. The mesh network basis software may reserve the first part of this area, and the last part of the area may be reserved for the application data. The home ID and node ID of a new node may be zero. When registering a slave node to a mesh network the slave node may receive home and node ID from the network's primary controller node. These IDs may be stored in the mesh network basis data area in memory. The routing slave may send unsolicited broadcasts and single casts (routed or non-routed). Further it may respond with a routed singlecast (response route) in case another node has requested this by sending a routed singlecast to it. A received multicast or broadcast results in a response route without routing.

Figure 7:
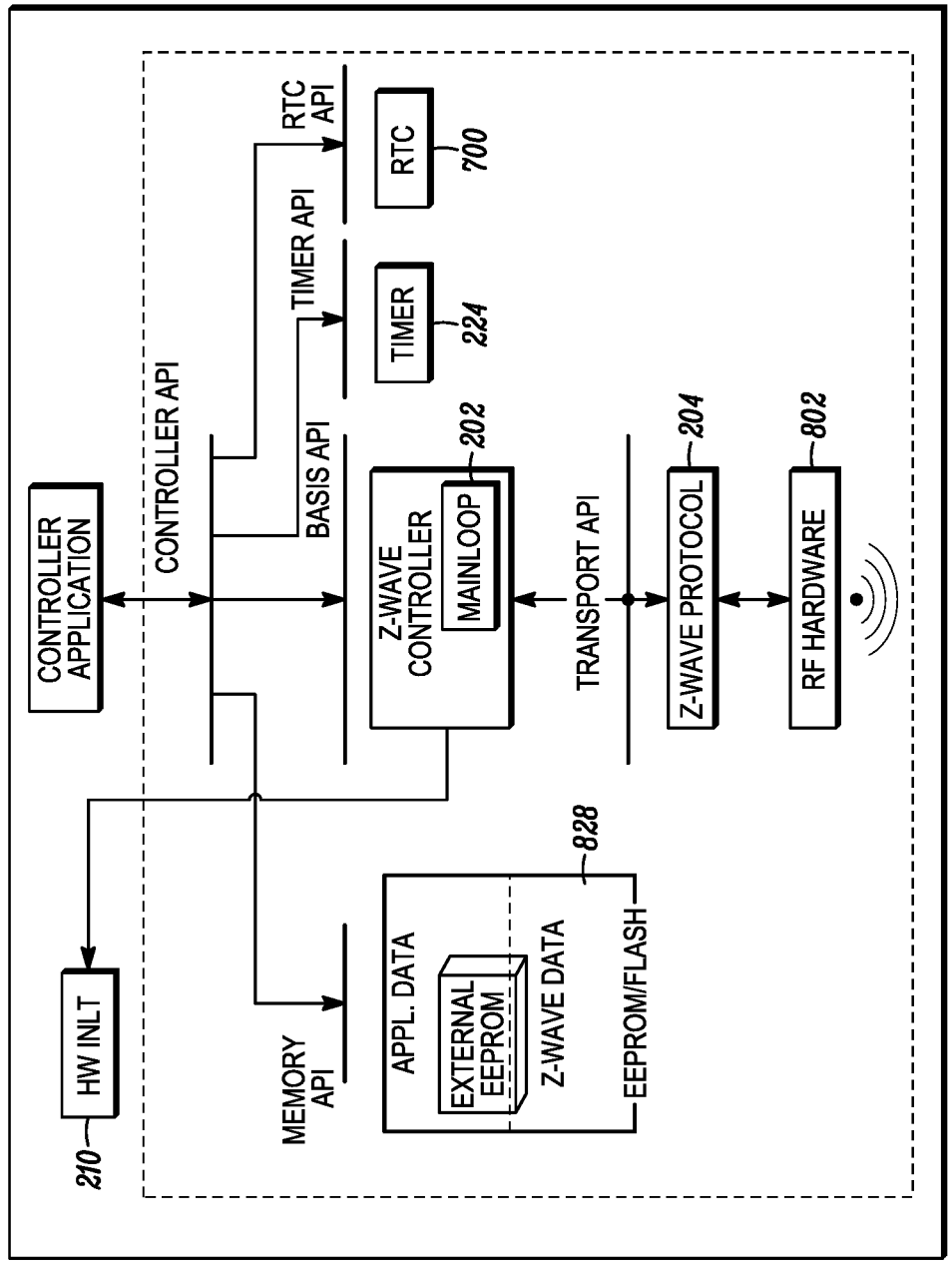
FIG. 7 shows controller node software features.

FIG. 7 shows how the enhanced slave node may have the same basic functionality as a routing slave node, but because it may have more features on the hardware, more software components may be available. Enhanced slave nodes may have an external memory and a Real-Time Clock (RTC) 700 and Wake-Up Timer (WUT) 824. The basis software may reserve the first area of external memory, and the last area of external memory may be reserved for the application data.

An internal ring oscillator is used as a base for a wake up timer. The oscillator has a very low power consumption but is highly dependent on temperature, supply voltage and process variation. In order to compensate for the high variation a calibration circuit is built into the chip. The calibration circuit measures the oscillation frequency against the system clock and derives a calibration constant. As the ring oscillator runs at several kHz the calibration is as fast compared to wake up period. The calibration is performed automatically before entering WUT mode (wake up timer mode).

Figure 8:
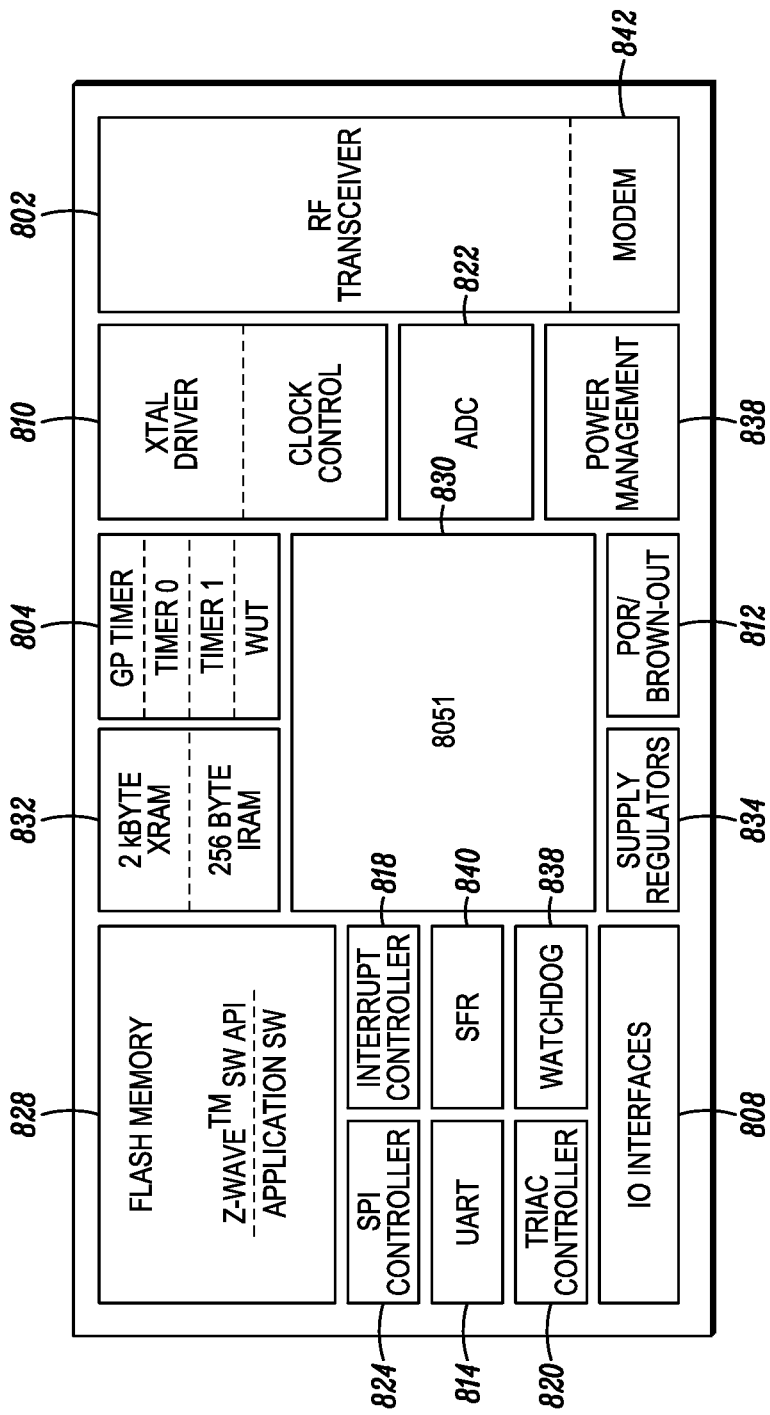
FIG. 8 shows a block diagram of the a mesh network node.

A node in mesh network 100 may be implemented with a single integrated circuit (e.g. an IC, ASIC, FPGA, etc.). FIG. 8 shows a block diagram of the a mesh network node, which may consist of many sub-components such as an integrated RF transceiver 802, an 8051 Microcontroller Unit (MCU) 830 with Random Access Memory (RAM) 832, mesh network software Application Programming Interface (API) 828, and memory storage for user application software 828 such as Flash memory. In addition to these major functional blocks a single chip implementation may contain an Analog-to-Digital Converter (ADC) 822, general purpose Input/Output (I/O) pins 808, Power-On Reset (POR) circuit/brown-out detector 812, Triac controller 820, Serial Peripheral Interface (SPI) 824, interrupt controller, and UART 814 serial interface for connecting to peripheral devices. Such a device may be designed for very low power and low voltage applications and highly optimized for battery-powered applications and easy integration to products with demanding size constraints.

Supply regulators 834 regulate the external supply down to a low internal voltage supply. Supply regulators 834 may significantly improve supply noise tolerance of the chip.

A single chip implementation of the embodiment of FIG. 8 may run on a system clock that is derived from an XTAL. For example, clock control 810 divides an external crystal (not shown) into two internal clocks. In the preferred embodiment of FIG. 1, an external crystal of either 16 MHz or 32 MHZ would allow clock control 810 to generate an 8 MHz clock for RF circuits and a 16 MHz clock for MCU 830 and peripherals. Alternatively, clock control 810 may interface to an external crystal controlled oscillator.

The POR circuit 812 may eliminate the need for external reset circuitry, holding reset during power-on and brown-out situations. POR 812 may be designed with glitch immunity and hysteresis for noise and transient stability. POR 810 circuit may have extremely low power consumption and is active even in a sleep mode.

Figure 9:
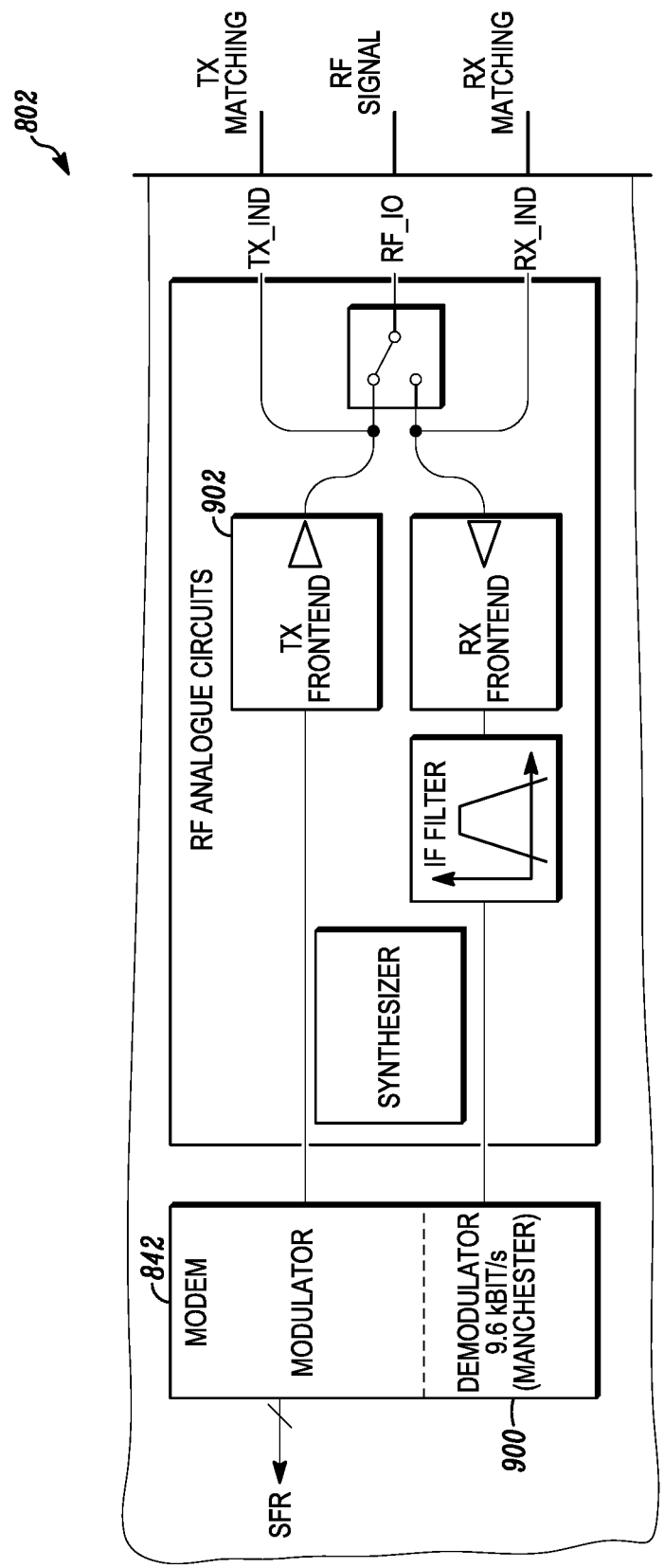
FIG. 9 illustrates a block diagram of a transceiver and RF modem.

Referring further to FIG. 8 and FIG. 9, a transceiver 802 may be able to transmit and receive Manchester coded data 9.6 kbits. FIG. 9 shows the disclosure communicating NRZ coded data at approximately 40 kb/s. RF transceiver 802 may handle all the RF related functions such as Manchester encoding/decoding 900, pre-ample detection and serialization/deserialization. The output power of the transmitter Power Amplifier 902 may be adjustable in steps of 2 dB. The different parts of the RF transceiver 802 may be powered up and down so only the required circuits may be powered at a time. The RF transceiver 802 may only need external components for input and output matching. A block diagram of the Transceiver 802 including RF modem 842 is given in FIG. 9.

Transceiver 802 includes multiple parallel receive demodulators, each for detecting a different received communication signal frequency, enabling the single chip embodiment to operate in an environment with a plurality of communication signal frequencies as may occur in networks of current and older technology devices, and/or different types of devices. The multiple demodulators are configured to receive output signals from RF transceiver 802 interface, allowing the first demodulator that detects a valid signal to take control, thus transparently receiving a signal at any of a plurality of supported data rates, without prior negotiation with an external device. No communication overhead results from supporting multiple receive data frequencies, allowing fast reception of unsolicited transmissions from unknown sources.

An auto-speed receiver may include feeding the output of one radio front-end to multiple demodulators, each for a different data rate, and then allowing the first demodulator detecting a valid signal to take control, thus transparently receiving a signal at any of the supported data rates without prior negotiation. This results in benefits including no overhead from using multiple data rates, and fast reception of unsolicited transmissions from unknown source without overhead of data rate negotiation.

The solution provides seamless installation of nodes only supporting multi-speed nodes (e.g. 9.6 kbps and 9.6/40 kbps) in the same network. The transceiver 802 is used to detect speed (e.g. 9.6/40 kbps) of the frames received to make a speed independent receiver. In embodiments, an optimal speed (e.g. fastest speed) to the destination node may be known (e.g. through testing and storing of information in association with a routing table) and a transmitting node may transmit at the optimal speed.

The transmitter side may use a method where the highest known speed that can be used to reach the end destination will be used. In embodiments, a controller may send a multicast frame using the optimal speed. For example, if a transmitter knows all destination nodes of a multicast frame supports 40 kbps, the transmitter will transmit the multicast at 40 kps. As a further example, to ensure all nodes within direct range of a transmitter receive a broadcast frame, a transmitter will send a the broadcast frame at 9.6 kbps A transmitting controller may select a specific route of nodes for a single cast or a routed single cast frame based on the route comprising only nodes which support a preferred transmission speed. For example, if a transmission controller can determine a route of nodes in which all the nodes support 40 kbps, the controller may select this route for a routed single cast frame. Alternatively if such a route cannot be determined, the controller will transmit at the optimal speed for any route. Continuing the example of above, in such a route the controller would transmit a single cast or routed single cast frame at 9.6 kbps.

Likewise the controller may try to achieve the highest possible speed when assigning return routes to a routing slave. Since a routing slave may store the speed for each route to a destination, a routing slave can have a mixed set of stored speeds (e.g. 40 kbps and 9.6 kbps) for routes to each destination.

A node information frame or a transfer presentation frame may be sent out at a low speed (for example 9.6 kbps) to allow nodes that support only the low speed, or nodes that support a plurality of speeds, to be included/excluded by the controller.

In embodiments, channel selection may be dynamically performed locally on each node without need of distributing network information, or requiring user intervention. Dynamic channel selection may not require additional installation steps. The dynamic nature may also enable the network to maximize the usage of free communications slots on the available channels. The nodes in the network may listen on the available channels based at least in part on a predefined algorithm (e.g., limited to round robin). A node may select a next communication channel, and stay on each selected channel for a predefined duration. The node may stay on the selected communication channel and receive messages. Once the node is ready to receive new frames, it may once again select a next communication channel and repeat the process.

In embodiments, a communication channel may have multi-speed capabilities within a single carrier frequency, and/or it may have multi-speed capabilities across multiple carrier frequencies.

In embodiments, a node in a mesh network may be used to perceive a plurality of channels within a mesh network. A node may select a first channel from the plurality of channels within the mesh network and remain on the first channel for a predefined duration. If during the predefined duration, a signal is not detected, the node may select a second channel and remain on the second channel for predefined duration in order to detect a signal. If during the predefined duration of remaining on the first channel a signal is detected, the node may remain on that channel beyond the predefined duration in order to receive a message. The node may then select a second channel once the message on the first channel is received. This process of channel selection may include a plurality of nodes and or a plurality of channels within a mesh network.

An aspect of the present disclosure relates to a portable node (e.g. portable mesh node) where the portable node may be associated with a user interface or other device. The portable node may be similar to other nodes as described herein and it may communicate to and from the network either directly to a master controller or through other nodes in the mesh network. The portable node may be discoverable as other nodes are discoverable. For example, the portable node may be located by other nodes sending 'find' requests to the portable node. Once the portable node receives a find request, it may respond and a communication link and hand-offs to other nodes in the network may then be completed. In other embodiments, the portable node may be programmed to send 'find' identifiers periodically. For example, the portable node may send a data packet to all nodes in the area (i.e. within its range) and the nearby nodes may identify that they can communicate with the portable node. In other embodiments, the surrounding nodes may be used to physically locate the portable node through triangulation techniques or the like.

Software components of a system according to the present disclosure may involve interfacing with or otherwise controlling streaming data within a network. For example, a user interface may be associated with the portable node and it may be adapted to scan through a set of entertainment titles (e.g. music titles, video titles, movie titles) to select a title to play on an entertainment device (e.g. audio/video equipment) controlled by another node in the network. The entertainment system may provide functionality similar to known high end mp3 players for example. In embodiments, an entertainment device may be a television, a signal conversion device, a DVR, a networked device, a UPnP networked device, a satellite receiver, a cable converter, a VCR, a digital video disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, an audio file player, and audio component, an audio-visual component, or some other entertainment device.

In embodiments, information relating to entertainment devices and/or entertainment media may be distributed through a mesh network in a data structure. A data structure may include metadata. In embodiments, metadata may be related to an image, a photo, audio, a music track, an audio broadcast, an audio book, a video, a movie, a video broadcast, a stored video, a live video, a digital video recorder file, a music video, audio-visual equipment, an appliance, a content directory, and other metadata types. Metadata may be a description of content being delivered, a rating, a title, a music title, a movie title, a publisher, a right, a plurality of rights, a genre, a language, a relation, a region, a radio call signal, a radio station, a radio band, a channel number, an image name, an artist name, a music track, a playlist, a storage medium, a contributor, a date, a producer, a director, a DVD region code, a channel name, a scheduled start time, a scheduled end time, an icon, and the like.

Figure 30:
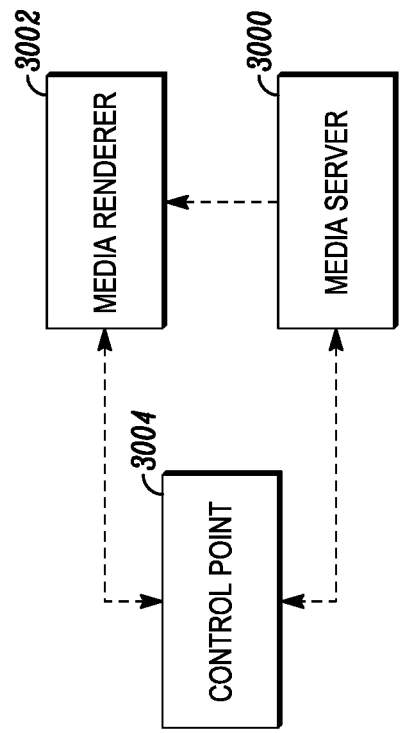
FIG. 30 illustrates the potential relations between a media server, media renderer, and control point.
Figure 31:
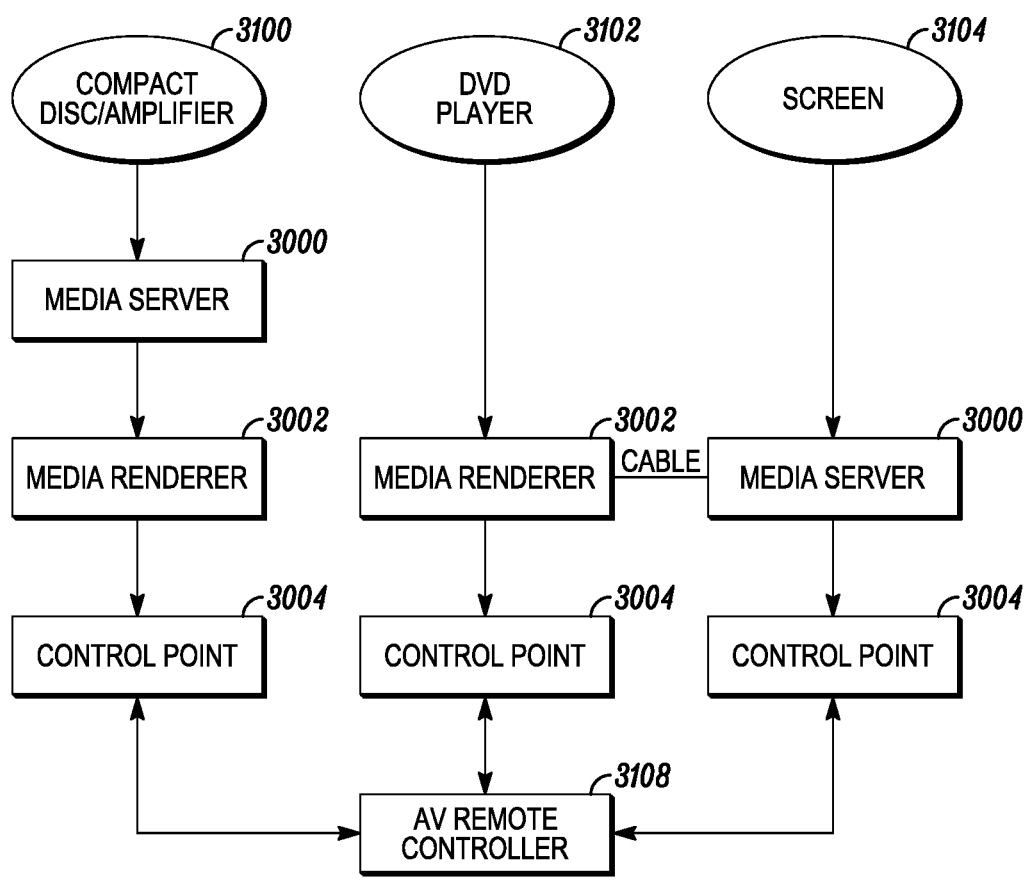
FIG. 31 illustrates a simplified embodiment of a media server, media renderer, and control point combination within a home audio-visual system.

In embodiments, such as that illustrated in FIG. 30, a media server 3000 may provide entertainment content (e.g., video, song, image, etc.) and may provide the content to a media renderer 3002. A media renderer 3002 may be capable of rendering entertainment content provided by a media server 3000. A media renderer 3002 may be identified with an endpoint identifier that is unique to a media renderer 3002. A control point 3004 may coordinate the operation of a media server and media renderer 3002. For example, through a control point, an end-user may be able to select what they want to view and/or hear, and where they want to hear and/or view it. Content that is available on a media server 3000 may be accessed through a control point's 3004 content directory functionality. This directory may comprise a hierarchical organization of content categories in which a superhierarchy is "Music," a sub-category within Music is "Artist," a sub-category within Artist is "Album 1," and so forth.

In embodiments, to cite one example among many potential embodiments, a media server 3000, media renderer 3002, and control point 3004 combination may be used to control a home audio visual system such as one including a compact disc player 3100, DVD player 3102 and a projection screen 3104. In this home audio-visual example, a remote controller 3108 may be used to communicate with a plurality of control points 3004, each of which is associated with a device within the audio-visual system. For example, the remote controller 3108 may communicate with a control point 3004 associated with a compact disc player 3100. The compact disc player 3100 may relay data to a media server 3000 that, in turn, relays the data to the media renderer 3002 and on to the control point 3004. Similarly, a DVD player 3102 and screen 3104 may be controlled by a remote controller using a media server 3000, media renderer 3002, and control point 3004 combination.

In embodiments, the portable node may be associated with a user interface for controlling other aspects of the entertainment system. For example, a user may be able to control output channels, input channels, volume, pitch, balance, treble, bass, brightness, sharpness, HDTV functions and the like. A portable node with a user interface may be adapted as a controller/receiver for other devices, sensors and the like in the network.

A Subscriber Identity/Information Module (SIM) may uniquely identify a connected mobile device and permit a mobile communication device to interface with a mesh network. A SIM card may also provide configurable storage for additional information related to a subscriber. As an example, a SIM card may provide storage for subscriber personal information such as address books, preferences, telephone numbers, network passwords, and such other information that may be beneficial or useful for a mobile user for accessing a wireless network.

Additionally, the SIM may facilitate accessing a mobile network. In an example, the SIM may contain unique information that a GSM mobile device network may detect when the SIM is installed in a GSM compatible phone and operated in a GSM network coverage area. Therefore when a mobile communication device, such as a mobile phone, is operating with a SIM in the range of a wireless network, such as a wireless mesh network, the mobile device may be detected by the network. In this way a SIM may facilitate making a mobile or portable device discoverable by a mesh network. Additionally, subscriber and/or network node identification information on the SIM may be used in an authentication process prior to allowing the mobile phone to join the wireless mesh network.

In embodiments, a mobile communication device equipped with a SIM card may facilitate a user of the mobile device gaining authorized access to a mesh network and further access facilities on the mesh network. For example, an authenticated user of a mobile device on a mesh network may download to the configurable memory of the SIM a list of movies stored on a digital video recorder connected to the network. The mobile device may then use the downloaded list along with display format information stored in the SIM to display the list in a user interface on the mobile device display. In another example, the user may upload digital content such as photos or a video on the mobile device (e.g. a camera phone with video capability) to a home entertainment system for presentation to a user viewing the display of the home entertainment system. Such an example may be used by an international traveler wishing to show images from their travels, or an Emergency Medical Technician providing images of an emergency patient in the field to an emergency room doctor.

Because a SIM may provide both access to a wireless network and may provide authentication for access to a mesh network, a SIM based mobile device, such as a cell phone, may be used to access the facilities of a mesh network from a location that may be far outside the range of nodes on the wireless mesh network by accessing the mesh network through a portal from the mesh network to the cell phone network.

A portable or mobile node may be discoverable through information contained in the SIM, as other nodes are discoverable. For example, the portable node may be located by other nodes sending 'find' requests to the portable node. Once the portable node configured with a SIM card receives a find request, it may respond and a communication link that hand-offs to other nodes in the network may then be completed. In other embodiments, the SIM card may include configured storage information that directs the mobile device or portable node to send 'find' identifiers periodically. For example, the mobile device may send a broadcast type data packet such that the nearby nodes that receive the data may identify that they can communicate with the SIM based mobile device.

An aspect of the present disclosure relates to streaming data (e.g. entertainment data) through the mesh network. Streaming data may be adapted such that control frames can be transmitted over the mesh network while streaming data is transmitted. In embodiments, a software component supporting streaming data may include a minimum delay of 35 ms after each frame carrying streaming data for example.

In embodiments, streaming data is preferably performed at a high transmission rate (e.g. a 40 kbps transmission rate). A controller streaming the data may determine and select the optimal speed, preferably high speed (e.g. 40 kbps, or the highest speed available), for the stream transmission. Depending on the network topology, a slave may not check communication speed of routed streaming data, and therefore the controller may preferably select a low speed (for example 9.6 kbps) for a routed data stream. In embodiments, a master controller and/or the nodes in the mesh network that are handling the streaming information may select the highest speed path available for transmission of the streaming data. For example, the streaming data may reach a node and the node may have the ability to pass the information to anyone of a plurality of nodes because the plurality is in range. The node may determine that one of the plurality is a high speed node and select that node for receiving the next data transmission. Once a high speed path from source to ultimate receiver is determined, the routing information for the high speed path may be saved and used for later transmissions requiring high speed transmissions.

In embodiments, a number of methods and systems may be used for large data file transmission. For example, large data files, such as text files, audio files, video files, and like, may be transferred in a single block of data for an end-processing element to utilize when a transfer is complete. A large file may also be transferred in such a way that the end-processing element buffers the incoming data, and after a short delay, begins to utilize the data before the transfer is complete. A large data file may also be transferred in such a way that the data is sent to the user in real-time, or near real-time.

Transferring a large data file, which may not be used immediately by the end-processing element, may be transferred as a single block of data. An example of this may be a television guide that is distributed to end-processing elements once a day for subsequent use. The lack of immediacy of this task may allow the sending unit to schedule the transfer when bandwidth is available, transfer the data with or without data compression, and data may only need to be stored, reducing processing requirements. This method of transferring a large data file may be the least burdensome for the processing elements, but may not be the best choice for large data files that may require immediate action, such as real-time audio and video files.

In embodiments, a large data file may be transferred for immediate use based at least in part on buffering the data at the receiving end of the transfer. This method is often referred to as progressive downloading or pseudo-streaming, and may not be fundamentally different from other methods for transferring data for subsequent use. As a result, the same data transfer protocols that the sending processing element uses for small data transfers may be utilized for progressive downloading. The data file may also be retained after transfer to the end-processing element. One addition to the end-processing element, in order to aid in the immediate use of the data by the user, is the addition of a data-buffering layer between the input from the source and the output to the user. As long as the available bandwidth during data transfer between processing elements is not less than the required data rate to the user, the user may not be aware that the data transfer is still ongoing while the initial data is being used. When available bandwidth during transfer is predicted to be less than that of the user, data compression may be employed to reduce the throughput requirement. Data compression rates may vary from low, for lossless data compression schemes, through high, for lossy data compression schemes. In general, the receiving data buffer may also be expanded as an alternative to the need for lossy data compression. This method generally maintains a high quality of file transfer, while allowing the user to begin using a file prior to its completed download.

Another method for transferring a large data file for immediate use may involve the real-time transfer of data between the source and the user. This method is often referred to as streaming data. The process of transferring data in real-time may require unique data transfer protocols from those used in non-real-time file transfers. Data transferred in real-time may have to conform to predetermined data transfer rates. Audio and video are both examples where the real-time data rates are predetermined. In addition, when these predetermined data rates cannot be met by the source, data may have to be sacrificed in order to maintain the real-time data steam rate. For example, lossy data compression rates may have to be varied as bandwidth in the transfer medium becomes reduced. The increased data compression rates may reduce the quality of the real-time data, such as reduced quality audio or and increased graininess of a video file output. Another example may be the dropping of short portions of an audio stream, the reduction of the size of a video output, or the momentary freezing of a web-cast. These issues with streaming may be offset by the advantages of being able to skip around in a video file without waiting for a download to complete, or having the ability to monitor a scene real-time. In addition, since the data rates are known, being either predetermined or through communication between the send and receive processing elements, the sending processor element may be able to more effectively utilize available bandwidth. The end-processor element may also have no need to store the data it is receiving, and so memory storage may be reduced. This method is generally utilized when real-time data is a higher priority than the quality of the data transferred.

RF transceiver 802 benefits with improved sensitivity by employing a demodulator correlation function. The demodulator detects the frequency of the FSK input signal by counting clock pulses between zero-crosses. In order to separate the two input frequencies an average filter is run on the input signal. The DC is subtracted from the input signal and the result is sampled into a delay chain of registers. The demodulator then correlates this signal history to the pattern of the known NRZ/Manchester symbols. For NRZ the correlation value is computed as the sum of the sampled input signal over one NRZ bit period. For Manchester the correlation value is computed at the sum of the first half Manchester bit period minus the sum of the second half bit period. The bit slicing is performed by checking the sign of the correlation function at the rising edge of the recovered clock. This results in improved sensitivity.

Figure 29:
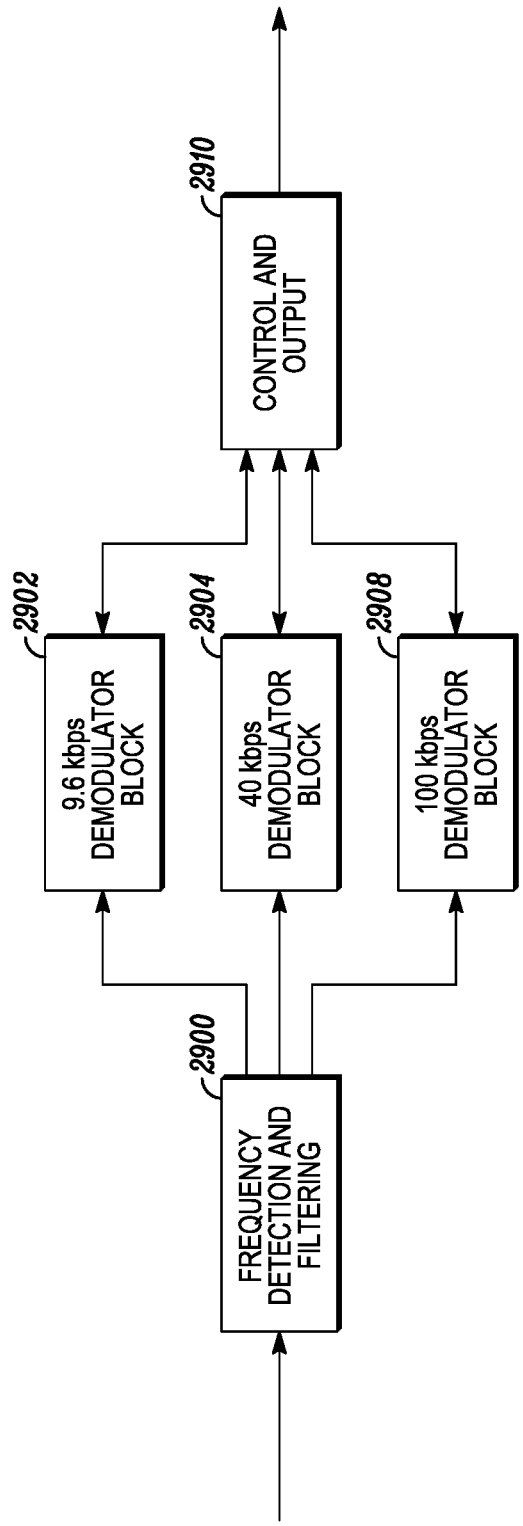
FIG. 29 illustrates a multi-speed demodulator.

In embodiments, a demodulator, such as that illustrated in FIG. 29, may be designed so that it can detect Manchester (MCH) code at 9.6 kbit/s 2902 and NRZ code at 40 kbit/s 2904 and 100 kbps 2908. It may be set in three different modes: (i) to detect and receive only MCH data (9.6 kbit/s) 2902; (ii) to detect and receive only NRZ data (40 kbit/s) 2904; or to detect and receive only NRZ data (100 kbit/s) 2908.

In embodiments, when a demodulator is in an auto mode, both MCH and NRZ data may be detected. Once a frame is detected as either MCH or NRZ, the demodulator may switch to this mode and start receiving data in an auto mode. In the auto mode the demodulator must listen for Manchester (MCH) code at 9.6 kbit/s 2902 and NRZ code at 40 kbit/s 2904 and 100 kbps 2908. In order to do this the demodulator may contain three detectors, one for MCH and two for NRZ. However some part of the demodulator may be common for both detectors, such as the IF detection 2900, filtering 2900, and the control of the demodulator 2910.

RF communication error detection may be improved by the use of CRC16, or other similar robust error detection techniques, on elements of the communication signal including Z-wave frames.

Referring further to FIG. 9, transceiver 802 may transmit using a modulation frequency that is asymmetrical to a reference carrier/local oscillator frequency, resulting in a transmit frequency that is not supported by the reference frequency synthesizer. By supporting asymmetric radio frequency signal modulation, transceiver 802 has the ability to transmit on a frequency not supported by the frequency synthesizer.

Figure 9A:
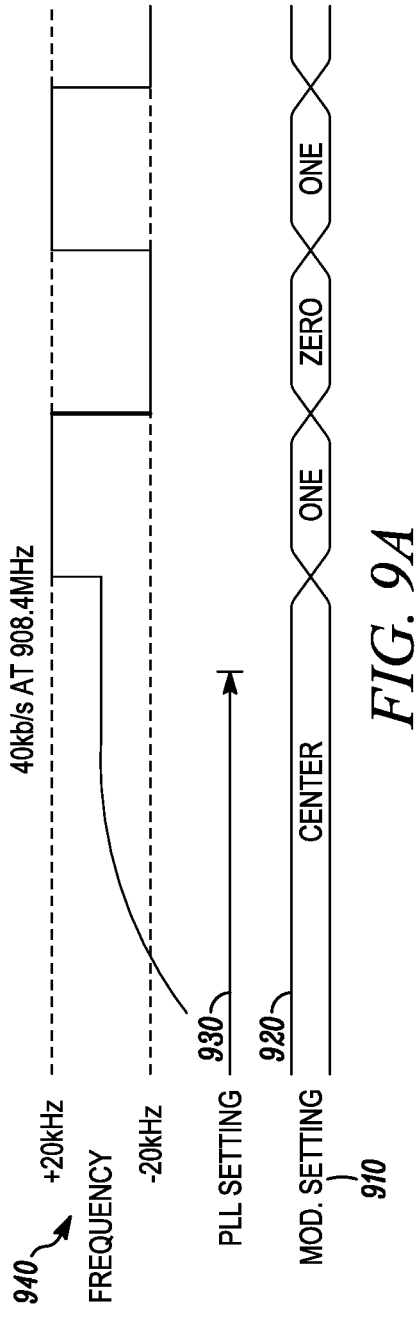
FIG. 9A and FIG. 9B are waveforms of asymmetric modulation.

Referring to FIG. 9A, a waveform diagram representing selection of asymmetric modulation, if offset control 910 is set at its center frequency 920 during settling of PLL 930, modulation 940 will go to both sides of PLL 930 frequency. As an example, this may correspond to binary FSK with a carrier frequency at an integer multiple of 200 kHz.

Figure 9B:
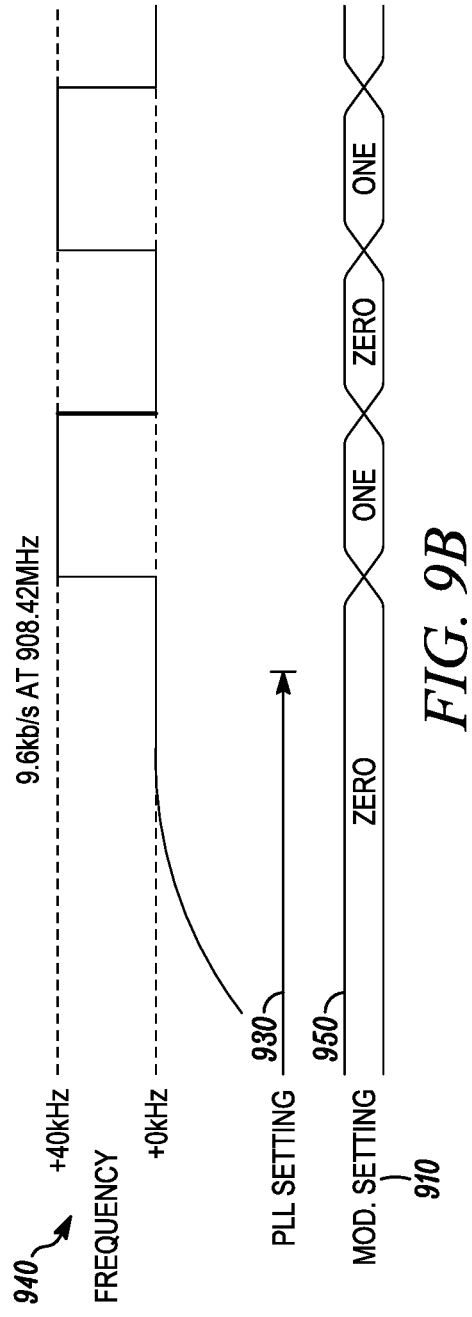

Referring to FIG. 9B, if offset control 910 is set at the zero symbol setting 950 during settling of PLL 930 then modulation 940 will only go to an upper side of PLL 930 frequency. As an example, this may correspond to binary FSK with a carrier frequency at half the modulation separation above an integer multiple of 200 kHz or N×200 kHz+20 kHz to N×200 kHz+25 kHz. Benefits of asymmetric modulation include the ability to transmit on a frequency not supported by the frequency synthesizer.

RF transceiver 802 may include a Phase Lock Loop (PLL) which may be synchronized while the system is powering up. Such synchronization may reduce locking time, afford faster RF turn-on, and lower power consumption PLL divider synchronization at start-up to reduces locking time. The VCO frequency is divided by a circuit denoted as the PLL divider, into a signal that matches a well-defined reference signal. The reference signal is generated from the system clock and can be optionally 100 kHz or 200 kHz. During calibration, the center frequency of a Voltage Controlled Oscillator is adjusted so that the divided frequency after calibration is very close to the reference frequency. After calibration a PLL fine-tunes the divided VCO signal so that it locks completely onto the reference signal.

In order to minimize VCO lock settling time, the PLL and the reference signal are disabled and then released simultaneously after calibration. The result of simultaneous release is a synchronization action where both signals start at the beginning of their high period. The synchronization between the signals minimizes the PLL settling time, resulting in faster turn-on of radio, and lower power consumption.

RF transceiver 802 includes an RF transmitter including a transmitter digital to analog converter which delivers the benefit of reduced cost. The transmitter chain contains a D/A converter which has two functions. The first is to convert the digital encoded bit symbols to analog signals, and the second is to set the transmission power of the transmitted RF signal, since the D/A converter is followed by a fixed gain PA amplifier. The D/A converter is a digital symbol to sine-voltage converter. Each output voltage of the D/A is a discrete step on a sine-curve which is selected by the digital value on the input. A thermometer coded signal is applied, and each value of the input signal selects a step on the sine wave. Counting from 0 to 31 and back again is therefore generating a full sine-period. The advantage of having sine-sized D/A steps is that a low number of control-bits can generate a high resolution sine-wave. Furthermore, the amplitude of the sine-wave is controllable, which means, that the transmission strength of the RF signal is set in the D/A.

Figure 9C:
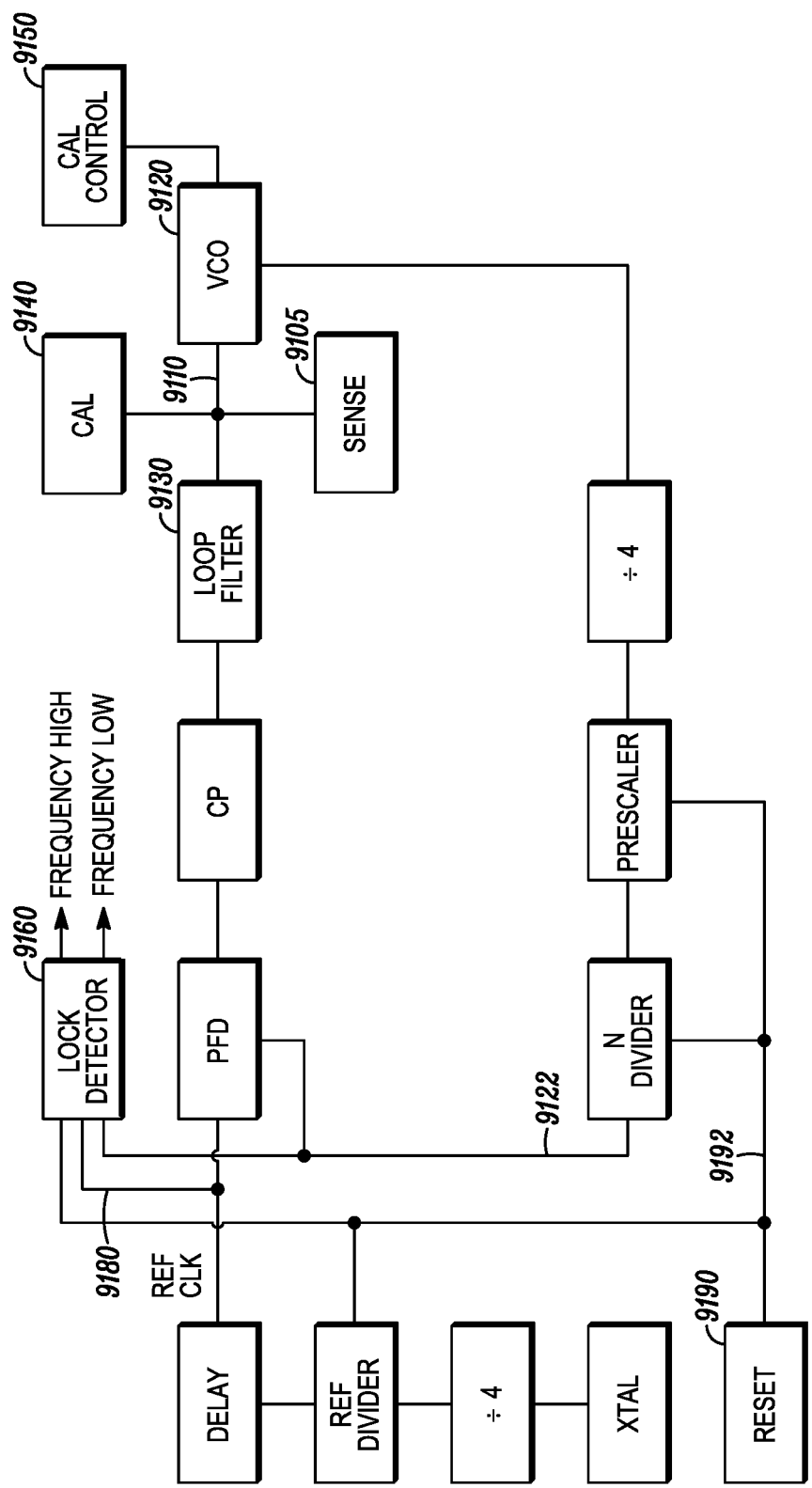
FIG. 9C is a block diagram of the Phase-Lock-Loop functionality of the disclosure.

Referring to FIG. 9C, VCO frequency calibration ensures that an analogue control voltage 9110 input to VCO 9120 is preferably within a narrow range and compensates for variation of on-chip capacitance which affects VCO 9120.

During calibration, PLL loop filter 9130 is opened and Cal block 9140 sets VCO control voltage 9110 to a predetermined value. A calibration control block 9150 may adjust the frequency of VCO 9120 by changing capacitance values internal to VCO 9120.

Figure 9D:
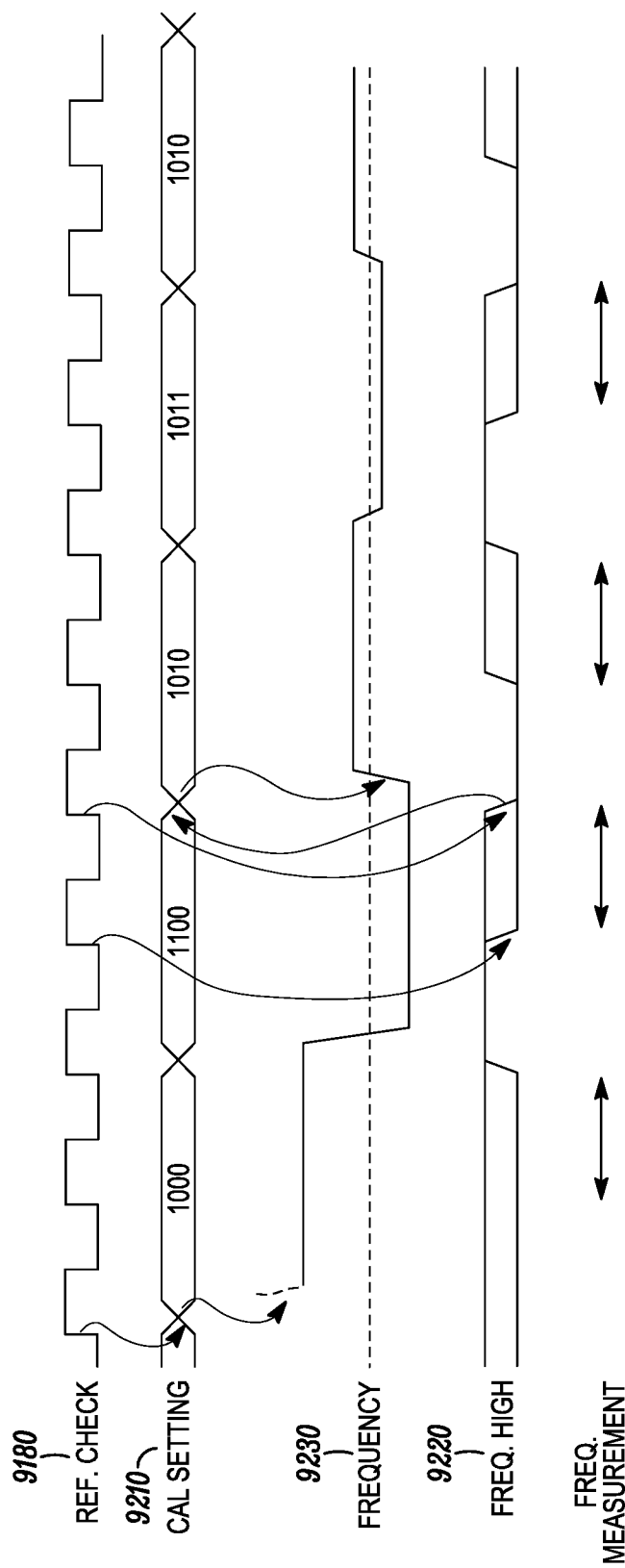
FIG. 9D is a timing diagram of the sequence for frequency calibration.

Referring further to FIG. 9D, for various calibration control 9150 settings of VCO 9120 capacitors, output frequency of VCO 9120 is measured by using a lock detector 9160. After resetting of the different dividers to synchronize all blocks, lock detector 9160 may compare a subdivided version 9122 of VCO 9120 output frequency to a reference clock 9180. By using a successive approximation approach the correct calibration setting can be determined in very few reference clock 9180 cycles. FREQ High and FREQ Low bits generated by lock detector 9160 are used in calibration control circuit 9150 to indicate if VCO 9120 frequency is too high or too low.

To ensure the PLL locks precisely onto a predetermined frequency, reference clock 9180 and subdivided VCO output 9122 are preferably synchronously released. In embodiments, reset circuit 9190 may automatically issue synchronous reset signal 9192 upon receiving a signal from calibration control 9150. Alternatively, a software accessible control register can be used to signal reset circuit 9190 to issue synchronous reset signal 9192.

FIG. 9D illustrates a calibration sequence wherein 4 bits of calibration control information 9210 is passed from calibration control circuit 9150 to VCO 9120 (as shown in FIG. 9C). For each calibration information 9210 setting, freq high signal 9220 may respond on a rising edge of reference clock 9180, further enabling a change in calibration information 9210 setting. This sequence repeats until PLL frequency 9230 is substantially close to a predetermined value.

Figure 9E:
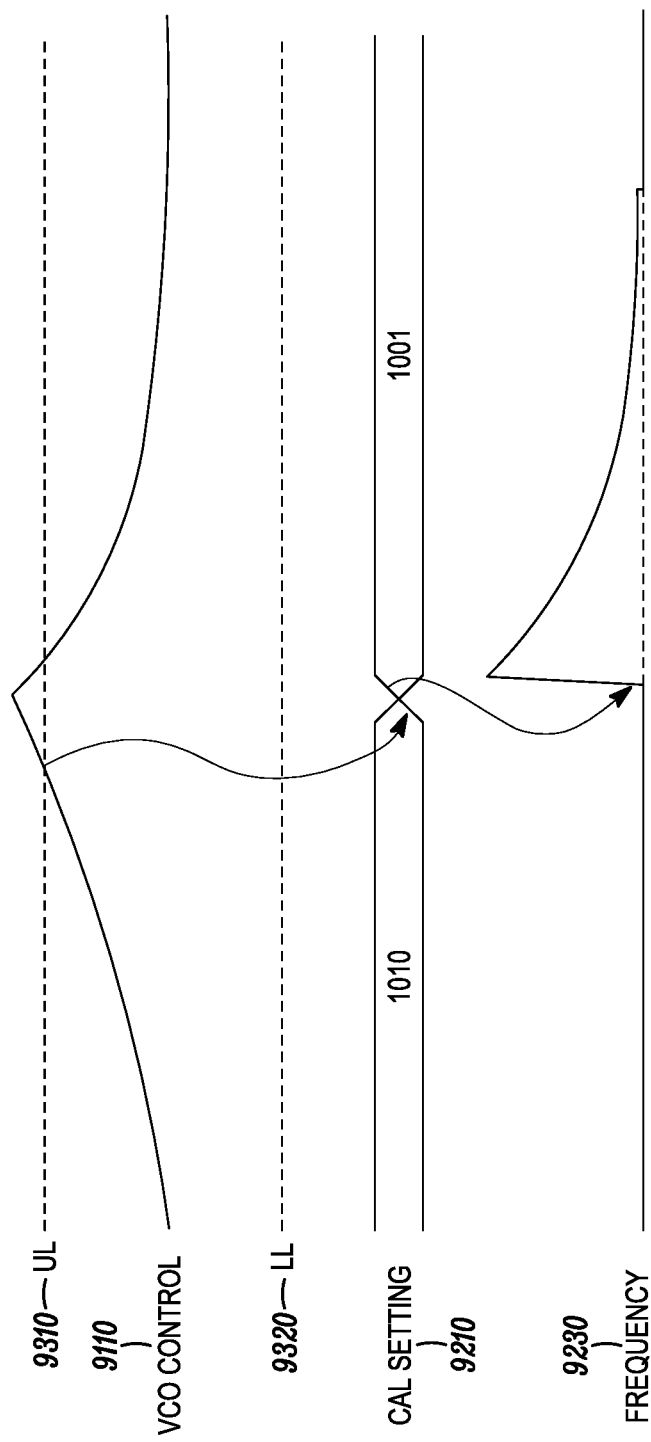
FIG. 9E is a waveform of VCO automatic self-calibration.

Referring to FIG. 9C and FIG. 9E, in receive mode during periods when no preamble or SOF has been detected and no data is currently being received, calibration control 9150 may adjust calibration setting whenever VCO control voltage 9110 has changed significantly. This function is done by sense block 9105 by comparing VCO control voltage 9110 with an upper limit 9310, and a lower limit 9320. As illustrated in the diagram in FIG. 9E, VCO control voltage 9110 may be monitored continuously such that when it falls outside sense block 9105 limits, calibration control 9150 adjusts calibration information setting 9210. In embodiments, a sudden change in calibration control 9150 output will result in PLL 9230 loosing lock, therefore calibration control 9150 may be disabled until lock detector 9160 indicates that PLL 9230 has settled again.

Additionally, voltage controlled oscillator (VCO) calibration may use portions of the PLL, thereby reducing hardware resources and cost. Additionally cost is reduced by IF calibration. In order to counteract the natural variation in resistors and capacitors, the IF filters of the ZW0201 has programmable resistors, which are set during a calibration process. This calibration process is able to reduce the variation of the IF filter center frequency, and this helps relax the requirements to the system clock. The calibration is performed using the components of the IF filter. The procedure is like this: One capacitor is discharged and another is charged. The voltages across the capacitors are compared, and when they cross each other, the charge/discharge time is recorded (as being the time from start of the process until the voltages cross each other). The two capacitors are reset, the programmable resistors of the IF filter is changed, and another charge/discharge sequence is done. Four charge/discharge periods are performed, and resistors are changed during each period, which results in a resistor setting that has an optimal charge/discharge period.

The single chip embodiment of FIG. 8 contains an embedded MCU 830. One example of a preferred MCU is embedded 8051 MCU core (Inventra M8051 Warp) including two standard 8051 timer/counters 804. MCU 830 may be compatible with industry standard 803x/805x MCUs. The single chip solution may allow for optimisation of MCU 830. MCU 830 of the embodiment of FIG. 8 completes one instruction cycle per two clock cycles as opposed to a standard 8051 with 12 clock cycles per instruction cycle. This makes MCU 830 six times faster than the standard 8051.

Figure 10:
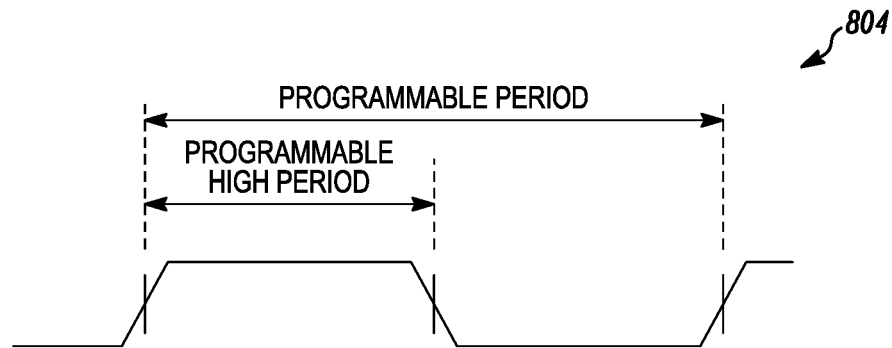
FIG. 10 illustrates a timing diagram of a pulse width modulated output (PWM).

Referring to FIG. 10, a timing diagram of a pulse width modulated output (PWM), general purpose timer 804 is a timer that may be polled or programmed to generate interrupts. Timer 804 may be an auto-reload counter with a fixed clock divider ratio. The timer of the single chip solution of FIG. 8 uses a 16-bit timer that may be an auto-reload counter with a fixed clock divider ratio of either 4 or 512. Timer 804 may also be set in Pulse Width Modulation (PWM) mode. The PWM may be controlled by setting the total period and the total high period. This embodiment utilizes an 8-bit register to set the total period and an 8-bit register to set the high period, therefore timer 804 counts using a fixed clock divider ratio of either 4 or 512.

Wake up timer 838 may be an ultra low power timer that may be enabled in a sleep mode or power down mode to wake up MCU 830 after a programmable time period. The sleep period may be configurable in number of seconds, such as in a range of 1 to 256 seconds. Wake up timer 838 is based on an internal oscillator that may be automatically calibrated against the system clock. IN the preferred embodiment of FIG. 10, wake up timer 838 may automatically calibrate during power-down mode, resulting in an easier to use system that automatically calibrates under the same conditions as when operating.

Special function registers 840 may contain registers that are used to control MCU 830 operating mode, and the operating mode of built-in peripherals.

Various memory technologies may be used for MCU program store, application store, and for internal/external data storage. In the preferred embodiment of FIG. 8, two types of memory are used.

A 32 kbytes of flash memory 828 is MCU 830 program memory containing mesh network 100 API and customer application software. MCU 830 also has the ability to read, write and erase the flash memory 828. Flash memory 828 has a built-in read back protection in order to prevent reverse engineering or design theft. Clearing a dedicated lock bit in flash memory 828 activates the read back protection. As long as the lock bit is cleared it is not possible to read from the flash memory 828 externally. Other lock bits may protect parts of the flash against writing. The lock bits may only be unlocked by erasing the entire flash memory. 256 bytes of Internal Random Access Memory (TRAM) 832 may be used by MCU 830 for 8051 internal data memory, and may also be accessed through direct instructions from MCU 830.

2 kbytes of External Random Access Memory (XRAM) 832 may be used by MCU 830 as 8051 external data memory. The single chip implementation of FIG. 8 may contain an interrupt controller 818, supporting 10 interrupt sources including two external interrupt sources on through General Purpose I/Os. Some of the interrupt sources may be reserved by the mesh network API. The Interrupt Controller controls the interrupt priority assignment. The priority may be fixed by the mesh network protocol. The external interrupt may also be enabled to wake up the chip from Sleep mode.

The single chip implementation of FIG. 8 may further contain a Triac Controller 820 for power regulating applications. Triac Controller 820 may be compatible with 50-60 Hz external alternating current power. Using an external Triac and a few extra external passive components a complete phase control circuit may be designed. Triac controller 820 may be implemented in a separate circuit within the single chip in order to keep timing and operation independent of software and to minimise MCU 830 workload.

In embodiments, a Triac controller within an integrated circuit mesh network node may be used to deliver power to a load, wherein timing of the power delivery is based at least in part on a zero crossing point of an AC power signal. The load may be a resistive load or a non-resistive load (e.g., an inductive load). The power delivery may be based at least in part on a fire angle. The power delivery may be initiated in coordination with a fire angle. The power delivery may be terminated in coordination with the zero crossing point. In embodiments, the Triac controller may be associated with a noise mask adapted to reduce false indications of zero crossing.

The mesh network node 100 may contain an analog-to-digital converter (ADC) 822 with a resolution that may be set to 8-bit or 12-bit. An 8-bit conversion takes less than half the time of a 12-bit conversion. ADC 822 may be rail-to-rail and programmed to refer to various internal or external voltage references. The ADC block may include a battery-monitoring mode. ADC 822 may support both single and continuous multi conversion mode. ADC 822 may have a built-in comparator for generating interrupts when a threshold set by software is exceeded. The threshold may be either a low threshold or a high threshold. It is possible to shut down ADC 822 for reducing power consumption. ADC 822 also includes self-test capability which may reduce test related costs.

The 8-bit part of the ADC is tested for missing codes, mismatch and missing connections in a simple and fast way. The precision of the test is better than ½ LSB. The 8 bit part of the LSB is made of 9 capacitors, 8 capacitors having an individual size ratio which is binary and 1 capacitor having the unit size. The largest of the 8 capacitors is $2\hat{0}7$ units large, called C0, the next is $2\hat{0}6$, called C1, down to C7, which is $2\hat{0}0$ units large. The 9.th capacitor, having the unit size 1, is called Cs (for stationary). The capacitors presence and size ratio is tested by testing C0 against C1+C2+ . . . C7+Cs and adding an extra test-capacitor having the size of ½ unit. Since C0 is=C1+C2+ . . . C7+Cs, adding the extra ½ lsb capacitor (called Cc) ensures that the term. C1+C2+ . . . C7+Cs+Cc is now for sure larger than C0. If any capacitor units misses in any of the 9 capacitors (C0 . . . C7+Cs), the test will fail. Next, C1 is tested against C2+ . . . C7+Cs, etc. The test is very fast to perform and does not require any high precision external stimuli or conventional ADC conversion cycles. If this test should be performed in a normal fashion, 256 ADC conversions with an input voltage ranging from 0V to Vdd would have to be performed. With the new approach, this test time is reduced to app. the time it takes to perform one ADC conversion.

A software programmable interface (SPI) 824 may be included in the implementation. Two examples of how SPI 824 may be used are: 1) to provide external access to the flash memory 828 and 2) to allow mesh network node 100 to communicate with an external memory. The SPI may act as a master or slave when interfacing to memory. For example, network node 100 acts as a master when accessing external Electrically Erasable Read Only Memory (EEPROM) and as a slave when accessing the flash memory 828. External flash memory may also be accessible by MCU 830.

The mesh network node embodiment of FIG. 8 may contain a UART 814 and may operate independent of MCU 830. UART 814 may support full duplex and may operate with the following three baud rates: 9.6 kbaud, 38.4 kbaud, or 115.2 kbaud.

Power Control Block 838 controls node 100's different power saving modes. For example two power saving modes are: Normal Mode and Sleep Mode/Power Down Mode. In Normal Mode MCU 830 is running and the RF circuits and ADC 822 may be powered up or down. Sleep Mode/Power Down Mode may be the lowest power mode, with everything shut down except the RAM's brown-out detection and low power timer. In addition ADC 822 may be powered up or down. In Sleep mode it is possible to wake MCU 830 up using an external interrupt source. The source may be active low or active high. MCU 830 may also be woken by the wake up timer 838, a reset, or by power cycling.

It is also possible to power down MCU 830 while keeping RF transceiver 802 operating, by automatically stopping MCU 830 before powering up RF transceiver 802. Additionally, it is possible to restart MCU 830 when transmission has completed and RF transmitter 802 has been powered down. This sequence of powering up and down these elements reduces power consumption and cuts peak current demand.

Two examples of how this may be executed is: automatically stopping the MCU before powering up the radio and transmitting, and restarting it when transmission has completed and the radio powered down; and automatically stopping the MCU before powering up the radio for reception and automatically powering up the MCU when a signal is received Depending on information frames contained within a signal received by RF transceiver 802, MCU 830 can be automatically powered up. A frame handler coupled to RF transceiver 802 automatically detects Z-wave frames and can automatically generate a signal to power-up MCU 830 or generate an interrupt to MCU 830 if it is already powered-up. The benefit of the frame handler functionality is reduced operating load on MCU 830, lowering memory requirements, and reducing power consumption.

This embodiment also has general purpose I/O interfaces 808. For example, the ZW0201 has 10 configurable General Purpose I/O (GPIO) pins with optional weak internal pull-up. The GPIO pins may be organized as two ports. The GPIO pins may have dual or even triple functionality, user programmable from MCU and some special hardware functions (for instance SPI 824, ADC 822, UART 814, TRIAC controller 820, etc.). In this implementation four of the GPIO pins may be either analogue (for ADC) or configured for digital interfacing as an input, or output. Reset I/O may also be available. Two examples of reset I/O are 1) External reset and 2) Enable programming mode. For example, when the reset pin is pulled low a master reset is generated. If the reset is held low for an extended period then the chip accepts programming commands on SPI 824. The chip may not go into actual programming mode until an SPI 824 Programming Enable command is received. As an example five dedicated analogue pins are used for RF interface 802 and crystal connections 810. GPIO pins may be set as inputs during reset. This pin configuration may be maintained after the reset is released until the software changes the setting.

By using one or more of the disclosure interface circuits, an RC-oscillator may be used as a temperature sensor, lowering cost by reusing existing interface circuits for the additional function of sensing temperature. The Wake-up timer internal ring oscillator is designed in a way so the calibration value has a near linear temperature dependency. The calibration depends on temperature, supply voltage and process variation. Fortunately the supply voltage variation can be taken into account by using the built in battery monitoring circuit. The impact of process variation is mostly on the offset value. Consequently if the calibration value is known at a given temperature then the temperature can be estimated at another temperature. This results in the benefit of low cost from reuse of existing circuit as temperature sensor.

Figure 11:
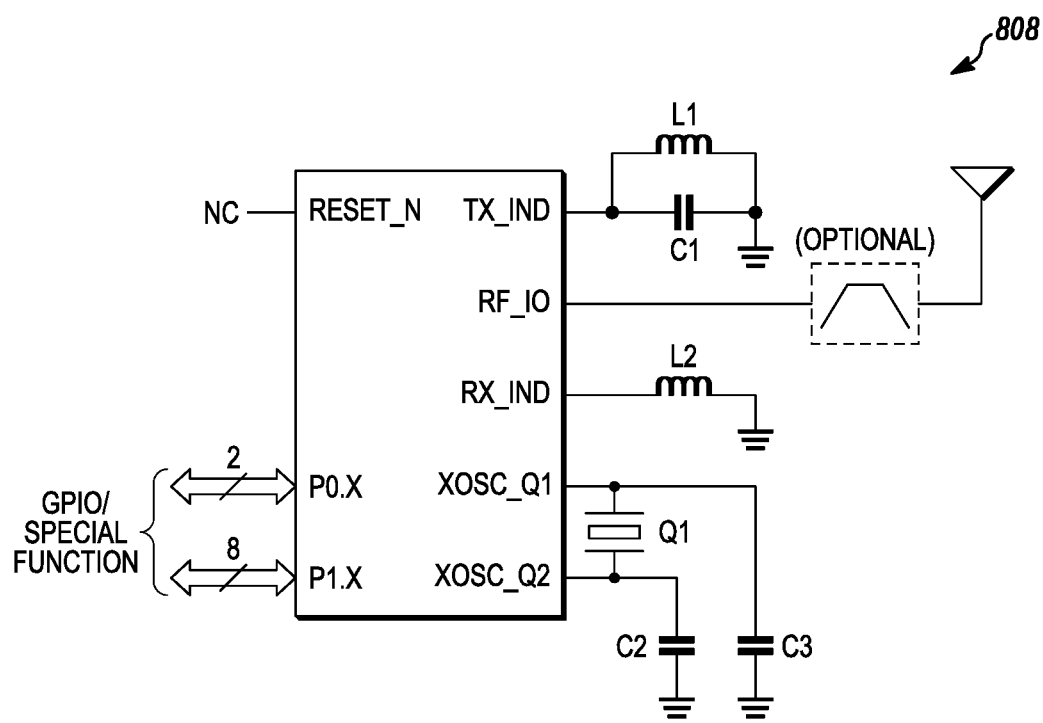
FIG. 11 shows I/O for a typical application circuit.

The single chip 100 implementation may contain a number of external interfaces including general I/O 808, clock signals 810, resets 812, transceiver I/O 802, UART 814, interrupts 818, Triac control 820, ADC 822, SPI 824, and external memory. FIG. 11 shows the I/O for a typical application circuit.

Figure 12:
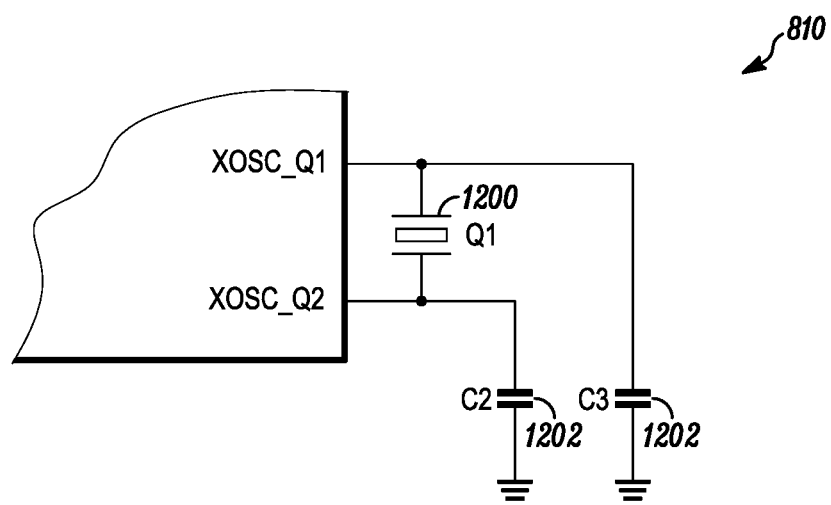
FIG. 12 shows external crystal connections.

Clock signals 810 may require external interfaces. For example FIG. 12 shows external crystal 1200 connections. Node 100 includes an on-chip crystal oscillator making it possible to drive a crystal directly and can operate with either a 32 MHz or a 16 MHz crystal. An external load capacitor 1202 may be required on each terminal of the crystal. The loading capacitor values may depend on the total load capacitance specified for the crystal.

Figure 13:
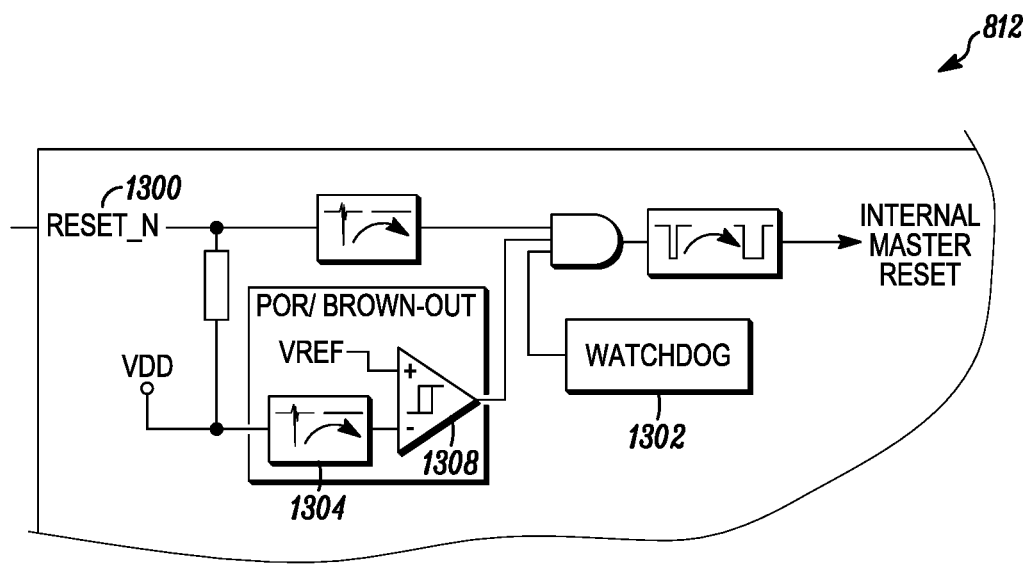
FIG. 13 shows a simplified block diagram of an internal reset circuit.

FIG. 13 shows a simplified block diagram of an internal reset circuit 812. For example all parts of node 100 are reset when one or more of the following conditions are true: 1) Reset 1300 is low, 2) When POR/brown-out detection circuit detects low supply voltage, 3) When WATCHDOG 1302 times out. The reset may be an asynchronous input with internal pull-up, Schmitt trigger, and glitch protection. The signal may be synchronized internally so that the reset may be asserted and deasserted asynchronously. The POR circuit may also contain a low pass filter 1304 for glitch protection and hysteresis 1308 for noise and transient stability. In Sleep mode the POR may go into a low power mode that protects the circuit against brown-out while keeping the power consumption at an absolute minimum. During master reset all GPIO 808 pins may be configured as inputs and the RF Transceiver 802 may be set in power down condition.

Figure 14:
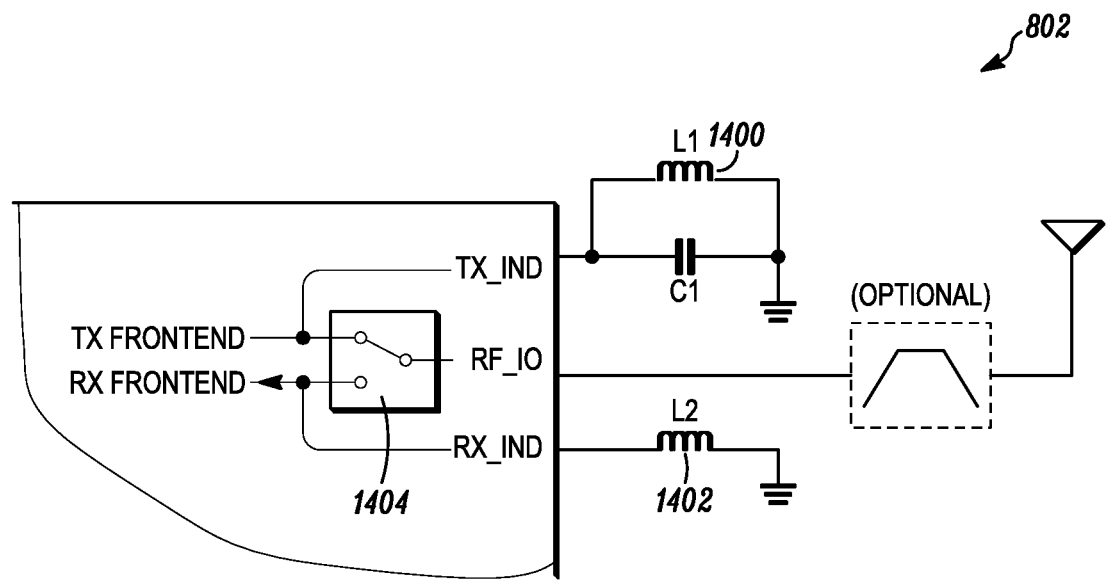
FIG. 14 shows the RF connections in a typical application.

FIG. 14 shows the RF connections in a typical application. RF transceiver 802 may require very few external passive components 1400, 1402 for input and output matching. IN this embodiment an internal T/R switch circuit 1404 makes it possible to match the receive (RX) and transmit (TX) independently. L1/C1 1400 is used for matching the transmitter output to 50Ω L2 1402 may be used for matching the receiver input to 50Ω. The values of the matching components may depend on the actual PCB layout. Moreover the matching components should be placed as close as possible with efficient grounding in order to achieve best performance. Additional external filter components may be added in order to filter the RF harmonics (if necessary) and improve the blocking performance.

Figure 15:
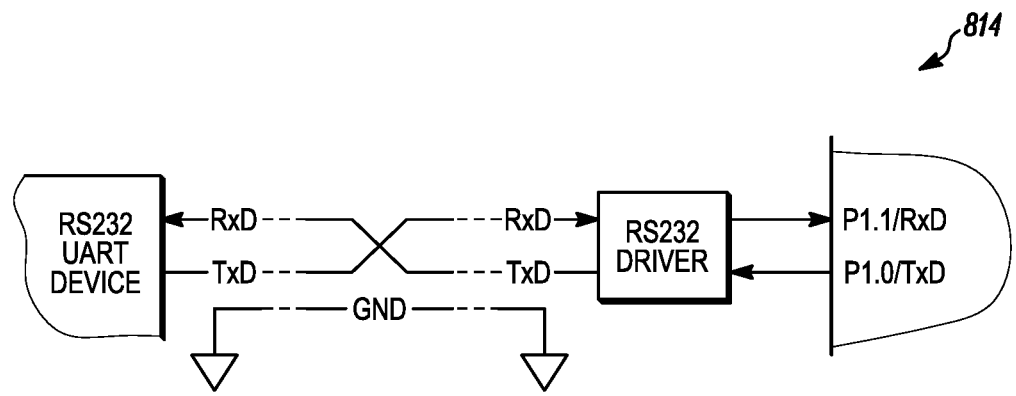
FIG. 15 shows a typical RS232 UART application circuit.
Figure 16:
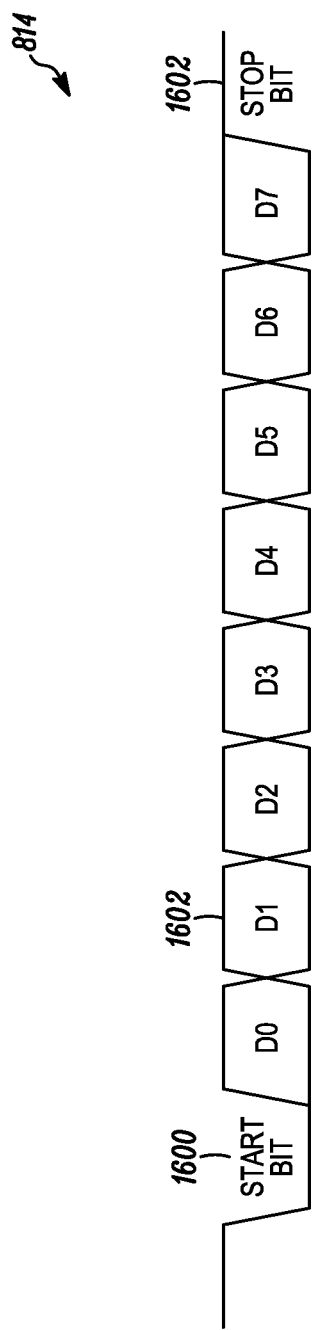
FIG. 16 gives a waveform of a serial byte.

UART 814 interfaces with external components. For example UART 814 interfaces with a data rate of 9.6 kbaud, 38.4 kbaud, or 115.2 kbaud, with 8-bit words, one start bit, one stop bit and no parity. FIG. 15 shows a typical RS232 UART application circuit. FIG. 16 gives a waveform of a serial byte. UART 814 shifts data in and out in the following order: start bit 1600, data bits 1602 (LSB first) and stop bit 1604. For noise rejection, the serial port may establish the content of each received bit by a majority voting on the sampled input. This is especially true for the start bit. If the falling edge on RxD is not verified by the majority voting over the start bit then the serial port stops reception and waits for another falling edge on RxD. After ⅔ of the stop bit time, the serial port waits for another high-to-low transition (start bit) on the RxD pin.

Figure 17:
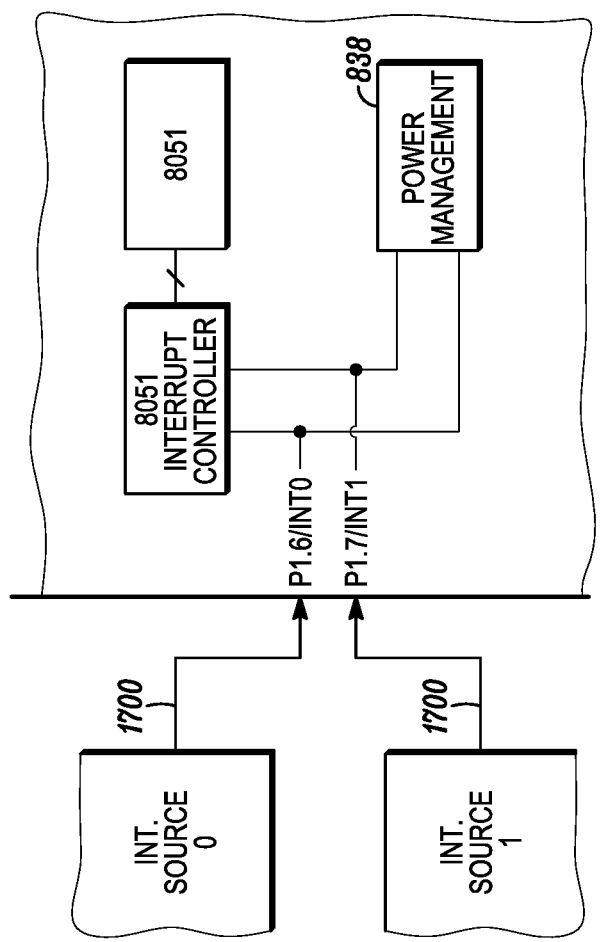
FIG. 17 shows external interrupts.

Single chip embodiment of network node 100 supports external interrupts 818 to MCU 830 as shown in FIG. 17. For example, Interrupts 1700 may be programmed to be either level-triggered (high/low) or edge-triggered (rising/falling). Also, interrupt(s) to Power Management 838 may enable wake up from sleep mode. Interrupts may be used to wake up the chip from sleep mode. The interrupts to the Power Management 838 may be level-triggered (high/low). When the chip wakes up from Sleep mode the clock oscillator may start up before program execution starts.

Figure 18:
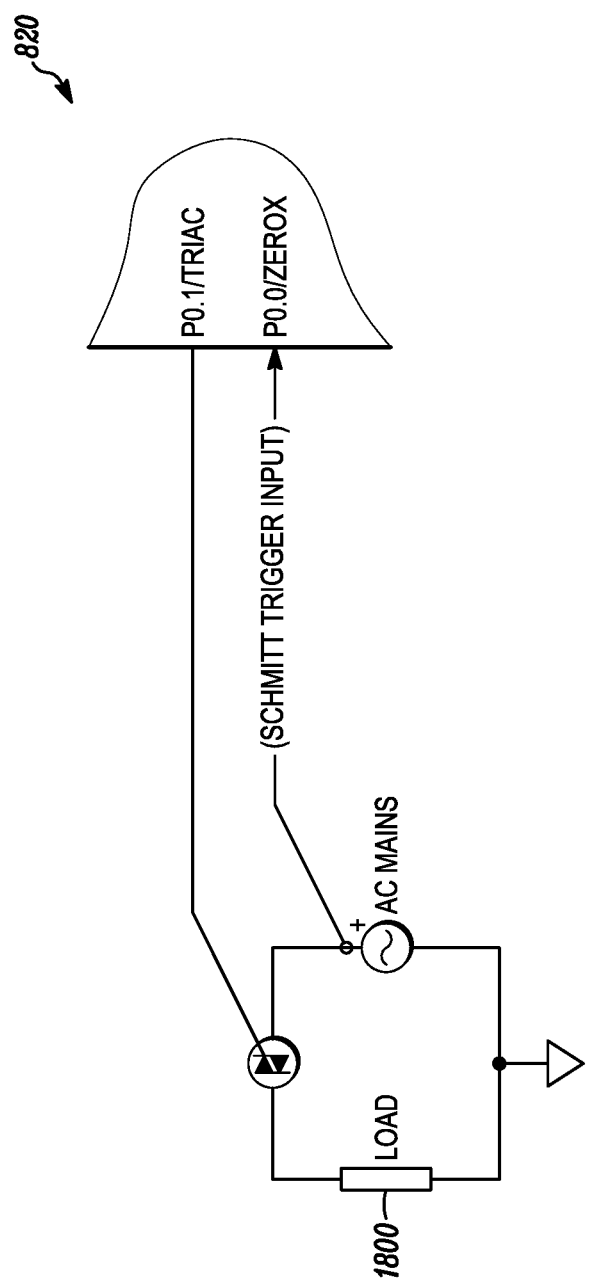
FIG. 18 shows a simplified Triac application circuit.
Figure 19:
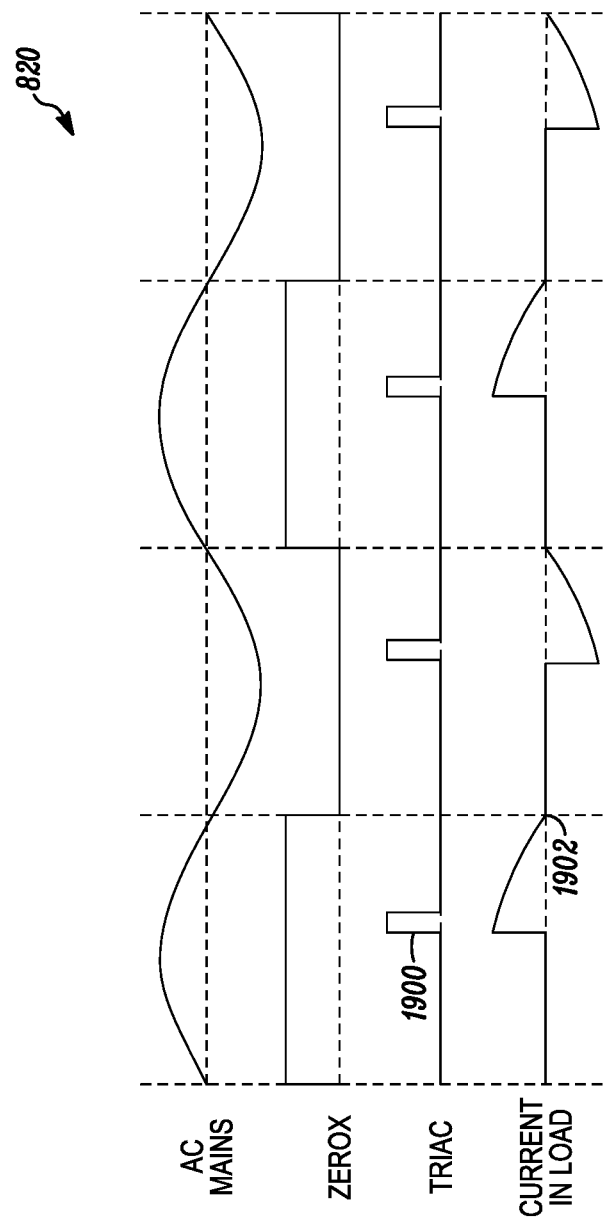
FIG. 19 shows typical Triac waveforms.
Figure 20:
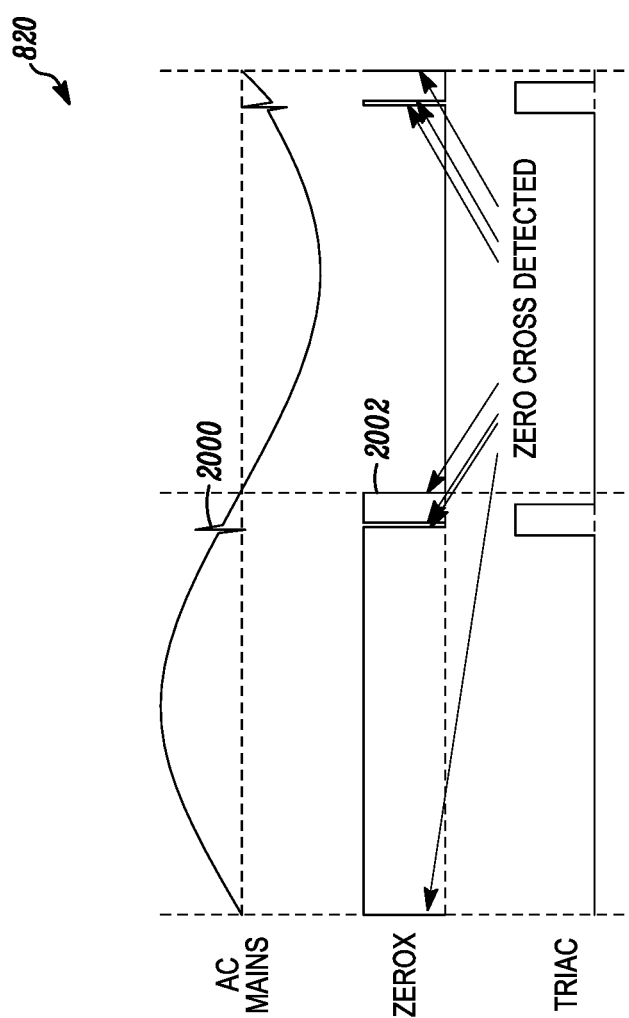
FIG. 20 shows zero cross detection disturbed by noise.
Figure 21:
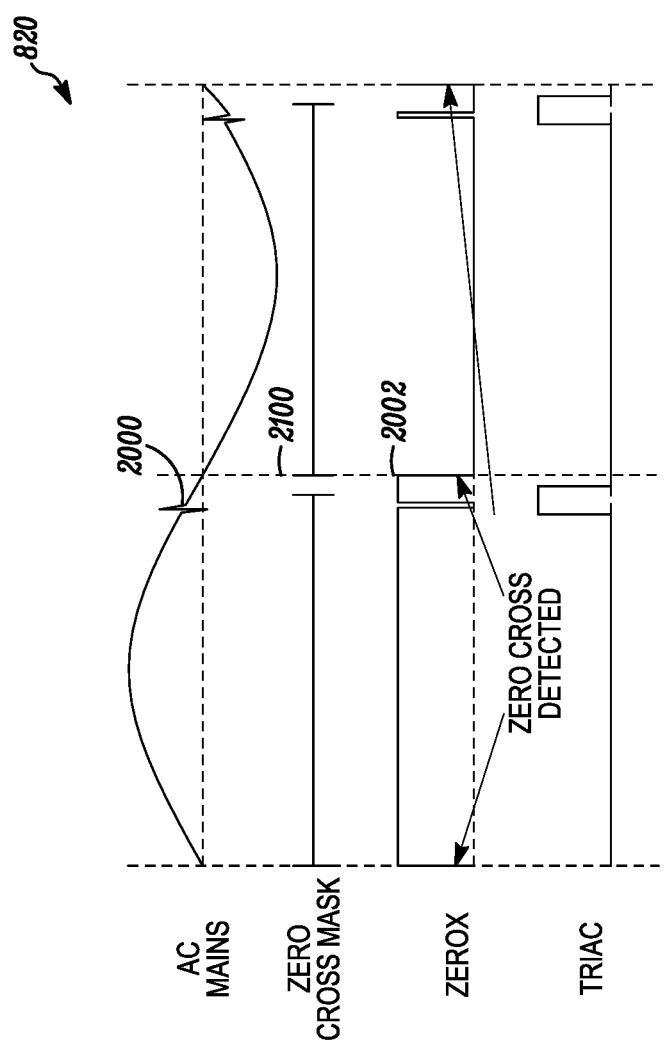
FIG. 21 shows a masking of zero cross detection.
Figure 22:
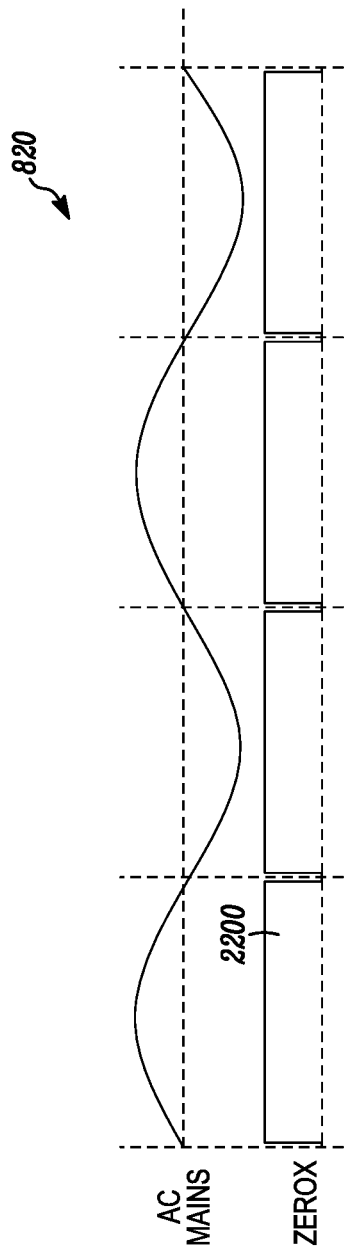
FIG. 22 shows the timing of a zero cross detect output.
Figure 23:
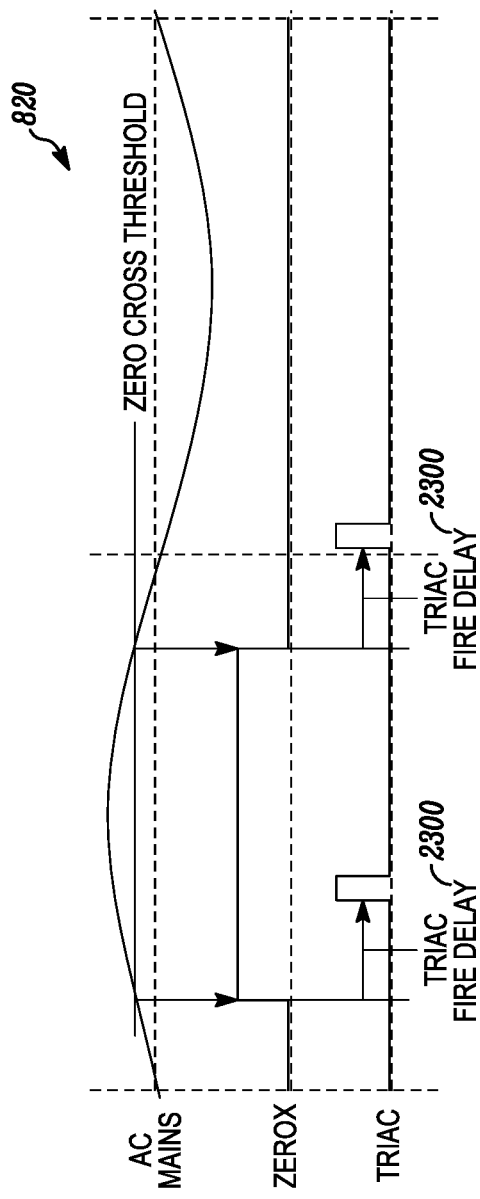
FIG. 23 shows Triac fire delay from zero cross detect.
Figure 24:
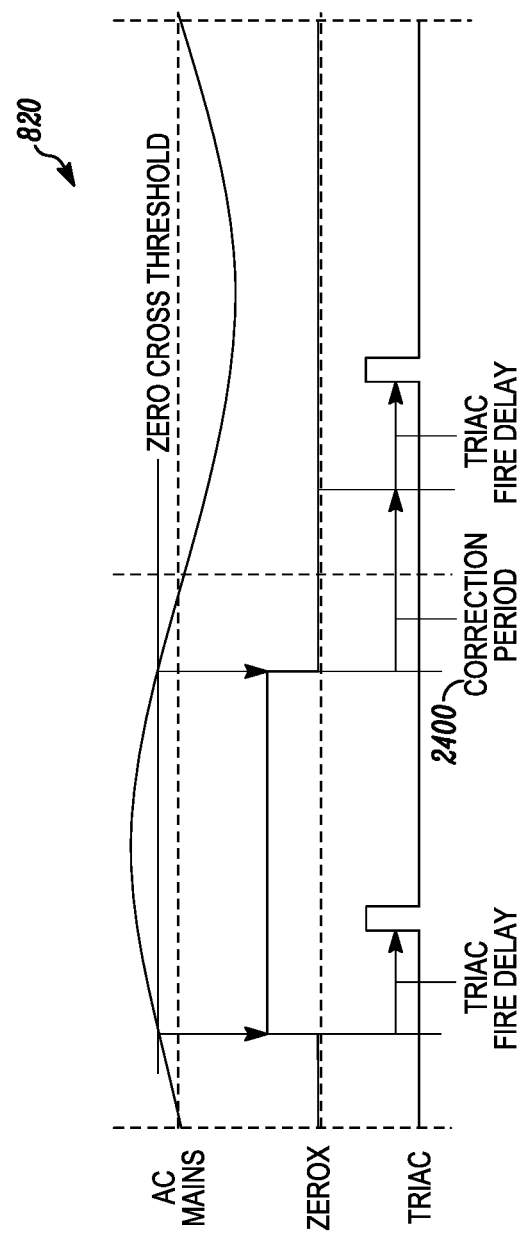
FIG. 24 shows Triac fire delay of FIG. 23 with a correction period.

This implementation may have a Triac Controller 820 which uses phase control for power regulation of resistive loads 1800 and to some degree non-resistive loads. FIG. 18 shows a simplified application circuit. The phase control method may conduct power during a specific time period in each half of the AC power cycle. FIG. 19 shows typical Triac waveforms. A Triac is commonly used to switch on and off the power to the load in the AC power system application. A gate voltage 1900 may be required to turn on the Triac (fire pulse). Once "on", the Triac may stay "on" until the AC sine wave reaches zero 1902 current regardless of the gate voltage. The power regulation is performed by controlling the fire angle (turn on start time). The Triac may deliver the power to the load after the fire angle and turn off at the zero-crossing point. The fire pulse must be of a certain duration in order to 1) provide sufficient charge for the Triac to turn on and 2) ensure that is does not subsequently switch off due to potential noise. The duration of the fire pulse may be programmed in SW. The zero cross detection may be disturbed by noise 2000 on the AC line. In case this noise is strong enough it could worst case cause additional triggering 2002 on the ZEROX as shown in FIG. 20. In order to avoid these extra zero crossing triggers a noise mask 2100 has been implemented in the Triac Controller. The mask masks out zero crossings from the true zero cross until a period before the next true zero cross, as shown in FIG. 21. The zero cross detector may either be programmed to use both the rising edge and the falling edge of the zero cross signal 1900 (like the ZEROX signal in FIG. 19) or it may be programmed to only use the rising edge of the zero cross signal 2200 (like the ZEROX signal in FIG. 22). The Triac Controller may be programmed to generate an interrupt request to the MCU whenever it detects a zero cross. When detecting zero crosses on both rising and falling edges then the detection moments may be offset 2300 due to the threshold level of the ZEROX input, as shown in FIG. 23. Because of this offset the Triac fire pulse may not be fired at the same distance from the beginning of the positive period and from the beginning of the negative period. It means that the AC load, which the Triac controls, may have a DC voltage different from 0V. To make this DC voltage negligible, the Triac Controller may be programmed with a variable correction 2400 period to correct for the offset, as shown in FIG. 24.

In order to control a Triac, two signals are important. The ZEROX signal, which reflects the zero crossing of the mains signal, and the TRIAC signal, which is used to fire the Triac. The ZEROX signal is used to generate a fire pulse (TRIAC signal) for every half period, that is, both the rising edge and the falling edge are used as time base for generating the fire pulse. The zero-cross detection logic isn't toggling exactly on the zero cross because of the threshold level of the input buffer of the ZEROX pin. Therefore the fire pulse in the "negative" half period will be slightly earlier than the fire pulse in the "positive" half period. This difference generates an unwanted DC current in the connected appliance. To correct for this difference; a programming register, TRI-COR, can be used to skew the time for the generation of the fire pulse in the negative half period, thus removing the difference and avoid DC in the controlled load. A benefit of this Triac control functionality is avoiding DC in the controlled load (specifically a problem for inductive loads).

Figure 25:
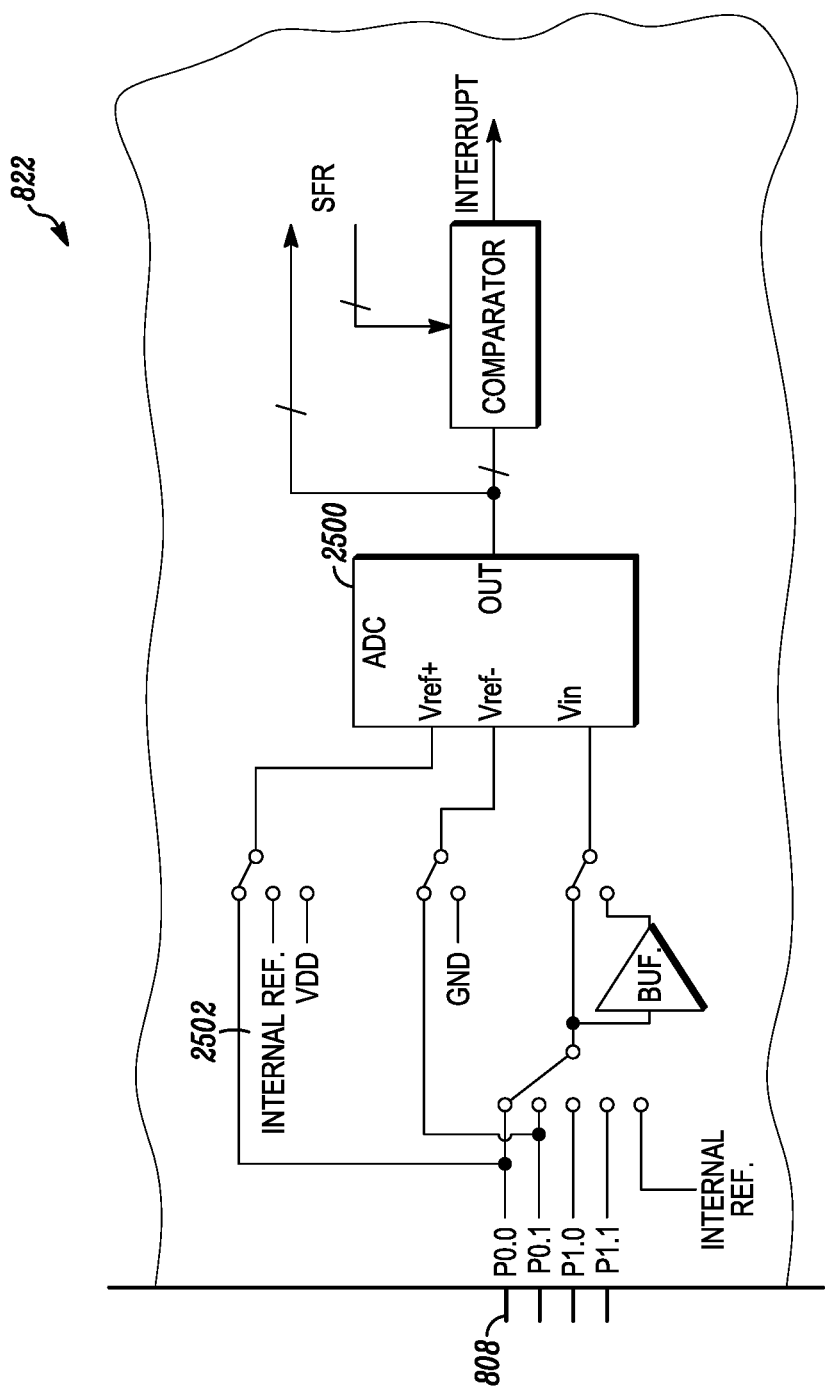
FIG. 25 illustrates an overview of the internal ADC block.

External interfaces are required for the ADC 822. ADC 822 may be a versatile rail-to-rail converter, which may operate in high-resolution 12-bit mode or a fast 8-bit mode. The ADC may be connected to the external circuit using GPIO 808 pins. The ADC may sample an analogue signal on any of the pins. The ADC is able to perform single conversion or continuous multi conversion. The ADC block may be programmed to generate an interrupt to the 8051W when a certain high or low threshold is exceeded. FIG. 25 gives an overview of the internal ADC block. The ADC may also be used for monitoring the supply level. In this set-up the Internal Reference 2502 is measured with reference to the supply level. The ADC input signal may be loaded by an internal sampling capacitor. In 8-bit mode the sampling time may be configured to fit the source impedance and frequency contents of the input signal. Alternatively an internal buffer may be switched in between the external source and the ADC to reduce capacitive loading of the input.

Figure 26:
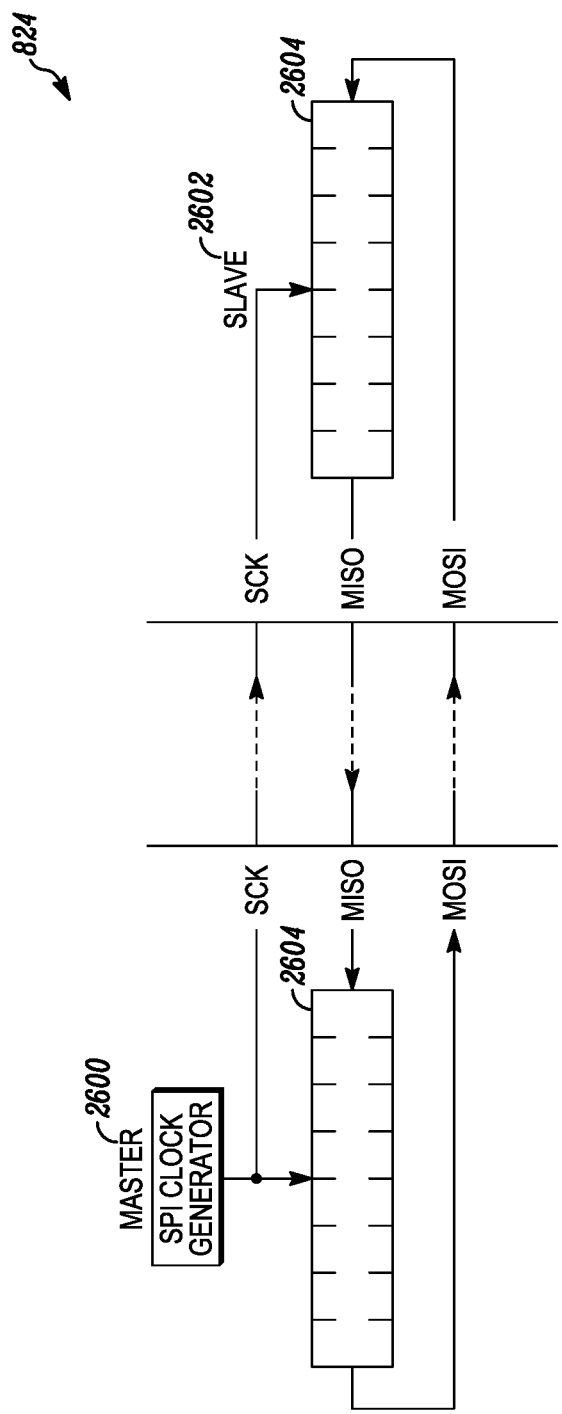
FIG. 26 shows two registers connected as one distributed shift register.
Figure 27:
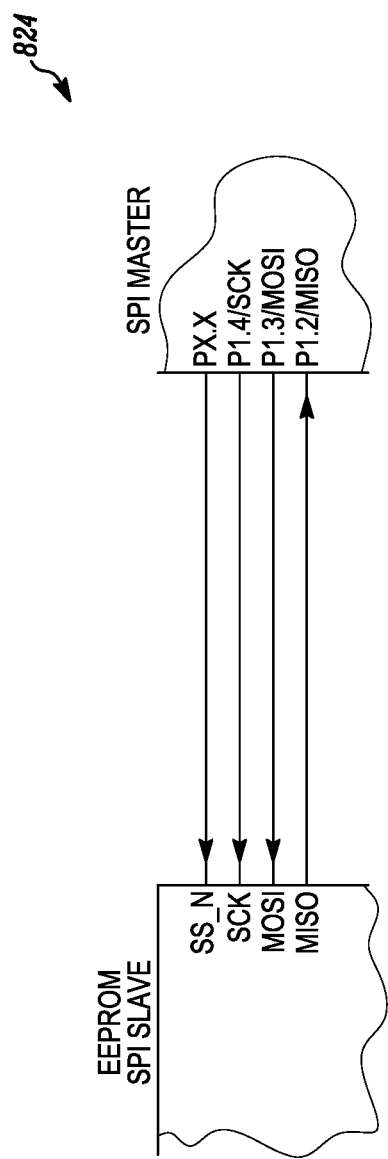
FIG. 27 shows a typical interface application of an EEPROM.

SPI 824 may be used for synchronous data transfer between the single chip 100 device and an external memory, used by some node types, or between a programming unit and the device. The SPI may not be available to the external application. Mater mode 2600 is activated when interfacing to an external EEPROM and slave 2602 during programming mode. The programming mode may be enabled by setting Reset low for an extended period. The SCK may be the clock output in master mode and is the clock input in slave mode. During data transmission the SCK may clock the data from a slave register into a master register. At the same time data may be clocked in the opposite direction from master to the slave connection. Consequently the two registers 2604 may be considered as one distributed circular shift register as illustrated in FIG. 26. After 8 clock cycles the two registers will have swapped contents. FIG. 27 shows a typical interface application to an EEPROM.

Figure 28:
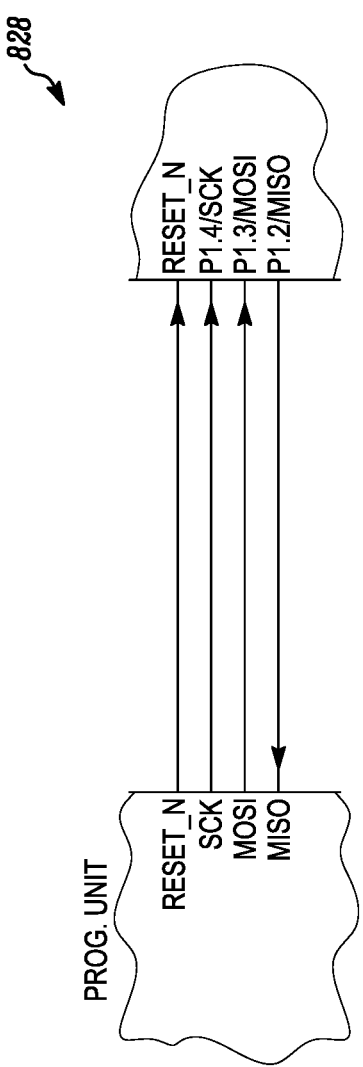
FIG. 28 illustrates a simplified block diagram of a typical interface to programming equipment.

An embodiment may contain a function for programming external memory, such as external Flash memory. In flash programming mode an external master may control the SPI bus causing node 100 to act as slave. In programming mode the flash may be erased, read, and/or written. Moreover it is possible to read a signature byte identifying the chip, enable/disable read/write protection, and/or read/write the Home ID. Flash programming mode may be entered by setting and keeping the Reset pin low. When the Reset has been held low for two XTAL periods then the SPI may accept a Programming Enable command. The chip may not enter programming mode until the two first bytes of the Programming Enable has been accepted. After the chip has entered programming mode the device may stay in programming mode as long as the Reset pin is held. When the Reset pin is set high the chip may generate an internal master reset pulse and normal program execution may start up. The watchdog function may be disabled as long as the chip is in programming mode and all other GPIOs 808 than the SPI 824 interface may be tri-stated. FIG. 28 gives a simplified block diagram of a typical interface to programming equipment.

Figure 32:
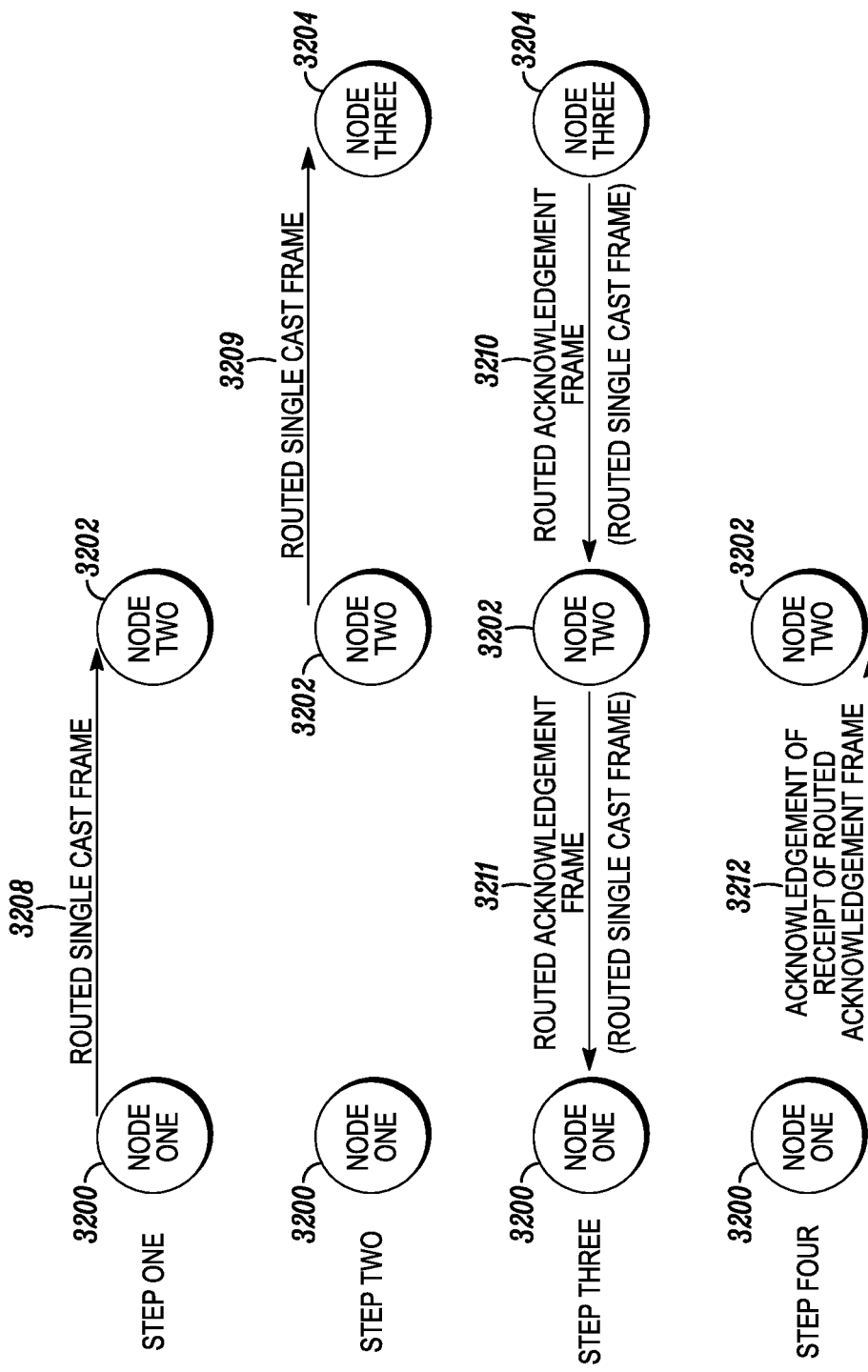
FIG. 32 illustrates a simplified embodiment of silent acknowledgement of a single cast frame routed over a mesh network.

Referring to FIG. 32, the present disclosure may include a method and system for silently acknowledging a successful transmission of a single case frame from a first node to a second node. For example, a single cast frame 3208 may be sent from a first node 3200 to a third node 3204 by using a second node 3202 as an intermediate relay between the first 3200 and third nodes 3204. As the second node 3202 sends the single cast frame 3209 that it received from the first node 3200 onto the third node 3204, the first node 3200 may be able to detect the single cast frame 3209 sent from the second node 3202 to the third node 3204 and interpret this single cast frame 3209 as an acknowledgement of success in sending the single cast frame 3208 from the first node 3200 to the second node 3202. Third node 3204 may send a routed acknowledgement frame 3210 to node two 3202 indicating that it received the single cast frame 3209 from node two 3202. The third node 3204 may be able to detect the routed acknowledgement frame 3211 sent from the second node 3202 to the first node 3200 and interpret this routed acknowledgement frame 3211 as an acknowledgement of success in sending the routed acknowledgement frame 3210 from the third node 3204 to the second node 3202. The first node 3200 may then send an acknowledgement 3212 to node two 3202 that it received the routed acknowledgement frame 3211 from node two 3202. This process may be repeated throughout a single cast frame transmission sequence, with subsequent nodes (e.g. the fourth or sixtieth node in a transmission sequence, etc.) wherein a sending node detects a transmission from a receiving node to a third node, and interprets this as acknowledgement that the receiving node successfully received a transmission from the sending node In embodiments, this silent acknowledgement routing schema may be implemented through an ASIC or any other consolidated processor platform described herein and or illustrated in the included figures.

In embodiments, a second single cast frame may be sent from the second node to a third node in a mesh network, and detection of the second single cast frame by the first node interpreted as an acknowledgement of success in sending the first single cast frame from the first node to the second node. A single cast frame may be a routed single cast frame. It may be routed based at least in part on a routing table. A single cast frame may be related to a metadata, a command, or some other form of data. A command may relate to including and or excluding a node in a mesh network, to enabling a security functionality, to a communication speed, to a communication channel, to a communication channel availability, to a network security level, to a network topology, to a network routing strategy, or some other command type.

In embodiments, a network mandated speed may be 9.6 kbps, 40 kbps, 100 kbps, or some other communication speed.

In embodiments, a communication channel availability may be associated with a single channel or a plurality of channels.

In embodiments, a network security level may be high, medium, low, or some other network security level.

Still referring to FIG. 32, a single cast frame may be routed over a mesh network topology that is an automation system network for controlling a device. A device may be a plurality of devices. In embodiments, the mesh network topology may be implemented within a home. A home mesh network topology may be related to an audiovisual system, such as an audiovisual system including an entertainment device. An entertainment device may be a television, a signal conversion device, a DVR, a networked device, a UPnP networked device, a satellite receiver, a cable converter, a VCR, a digital video disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, an audio file player, and audio component, an audio-visual component, or some other entertainment device.

In embodiments, the mesh network topology may be related to a security system. A security system may include an alarm, a lock, a sensor, a detector (such as a motion detector, and the like), or some other security system component.

In embodiments, the mesh network may be a wireless mesh network.

In embodiments, a node within the mesh network may be a multi-speed node.

Figure 33A:
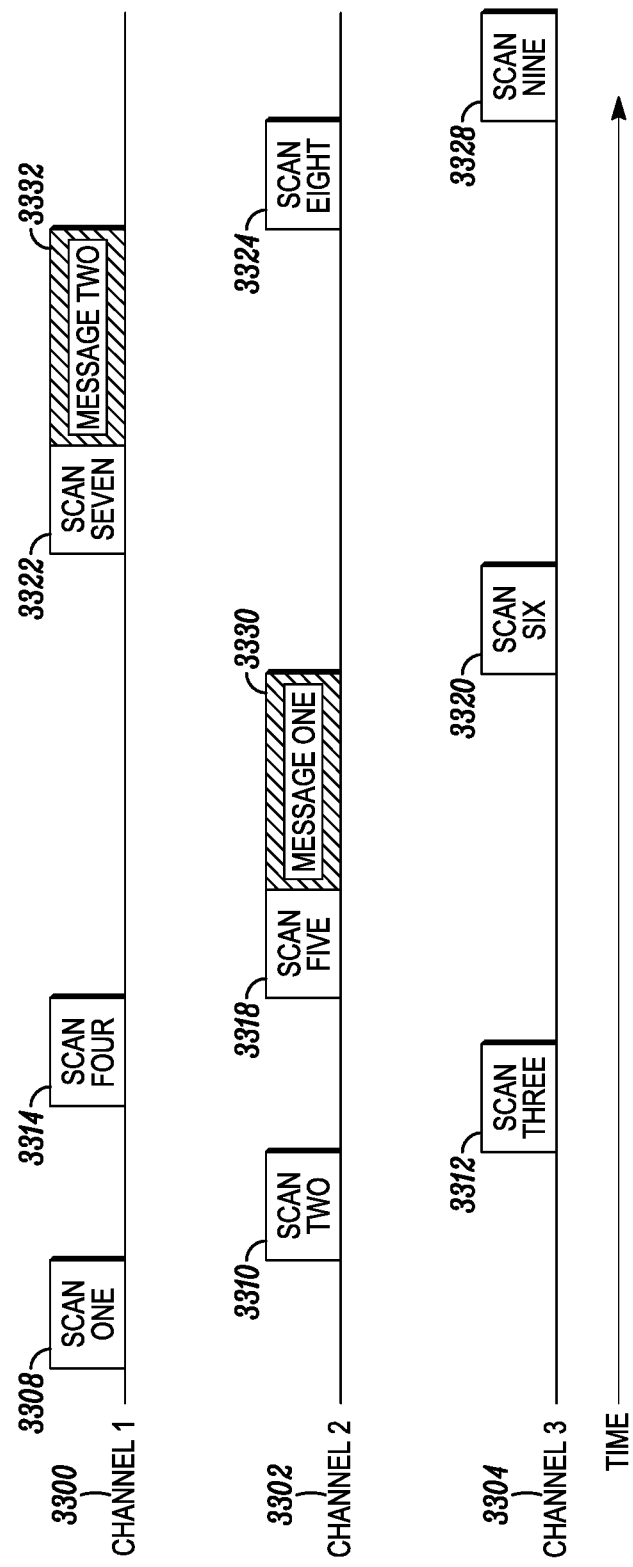
FIG. 33A illustrates a simplified embodiment of dynamic enablement of a secondary channel selection.
Figure 33B:
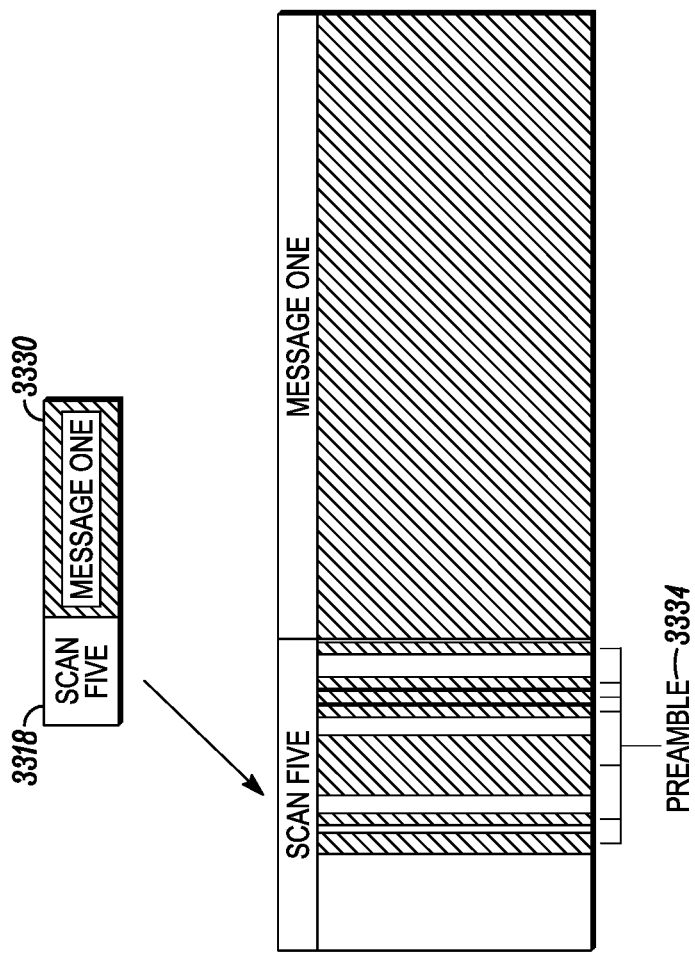
FIG. 33B illustrates a simplified embodiment of the use of a preamble during a dynamic enablement of a secondary channel selection.

FIG. 33A illustrates a simplified embodiment for dynamically enabling channel selection within a mesh network containing three channels. A node may begin a scan one 3308 on channel one 3300 and remain on the channel for a predefined duration. If the node does not detect a signal, the node may switch to channel two 3302 and begin scan two 3310. If during scan two 3310 a signal is not detected, the node may switch to channel three 3304 and begin scan three 3312. If no signal is detected during scan three 3312, the node may cycle back to channel one 3300 and begin scan four 3314. If no signal is detected during scan four 3314, the node may switch to channel two 3302 and begin scan five 3318. In this simplified hypothetical example, a signal may be detected during scan five 3318 on channel two 3302. As depicted in FIG. 33B, the signal that is detected during scan five 3318 may be a preamble 3334 that indicates to the node that a message is to follow and that the node should remain on channel two 3302 beyond the predefined duration originally set for scan five 3318. Following receipt of the preamble or plurality of preambles, the node may receive message one 3330 over channel two 3302. Following receipt of message one 3330, the node may switch to channel three 3304 and remain on the channel for the predefined duration of scan six 3320. If no signal is received during scan six 3320, the node may switch back to channel one 3300 and begin scan seven 3322. Scan seven may include a signal, such as a preamble or plurality of preambles, and remain on channel one 3300 beyond the predefined duration in order to receive message two 3332. Following receipt of message two 3332, the node may continue switching channels in scan eight 3324, scan nine 3328, and so forth, remaining on a channel for a predefined duration in order to detect a signal, and switching channels once the predefined duration has expired without a signal detected.

In embodiments, the message received by a node may be a plurality of messages. The message may be a command. A command may relate to including and or excluding a node in a mesh network, to enabling a security functionality, to a communication speed, to a communication channel, to a communication channel availability, to a network security level, to a network topology, to a network routing strategy, or some other command type.

In embodiments, the dynamic enablement of a secondary channel described herein may be implemented through an ASIC or any other consolidated processor platform described herein and or illustrated in the included figures.

In embodiments, a network mandated speed may be 9.6 kbps, 40 kbps, 100 kbps, or some other communication speed.

In embodiments, a communication channel availability may be associated with a single channel or a plurality of channels.

In embodiments, a network security level may be high, medium, low, or some other network security level.

In embodiments, the signal may be a predefined signal type.

In embodiments, the signal may be an implementation specific preamble signal. The implementation specific preamble signal may be predefined. The implementation specific preamble signal may be dynamically defined. In embodiments, the implementation specific preamble signal may equal a specific number of preamble symbol (a symbol consists of one or more bits). A preamble with less than the specific number of preamble signals may generate a command for a node to change to another channel. A preamble with equal the specific number of preamble symbol may generate a command for a node to remain on the current channel. A preamble with greater the specific number of preamble signals may generate a command for a node to remain on the current channel. The selection of the second channel may be based at least in part on a combination of receiving the signal and a round robin algorithm, a combination of receiving the signal and a predefined algorithm, a combination of receiving the signal and a locally based heuristic, or some other signal-rule combination.

In embodiments, the mesh network is a wireless mesh network.

In embodiments, the present disclosure may provide a method and system for using a first node to select a first channel in a mesh network; transmitting a frame over the first channel to a second node in the mesh network; and using the first node to select a second channel over which to transmit the frame to the second node if failure of the transmission over the first channel to the second node is detected by the first node.

In embodiments, node communication within a mesh network may be based at least in part on a distributed routing method and system. In a distributed routing system, each node in the network may store at least two types of routing tables, a forward routing table and a reverse routing table. Routing tables may be used to indicate the route through which a given node within the network may transmit data. Routing tables may be based upon data that is obtained through the use of an explore frame, or a plurality of explore frames.

In an example, a user of a mesh network containing a Node 1, Node 2, Node 3, Node 4, and Node 5 may wish to transmit data from Node 1 to Node 5. In this example, Node 1 has not previously communicated directly with Node 5. Thus, Node 1 does not know the route to Node 5 (i.e. it does not have the route stored in its routing tables). As a result, Node 1 may broadcast an explore frame. Upon receipt of the explore frame from Node 1, Node 2 may update its reverse routing table to include information regarding the source of the explore frame (Node 1), the next "hop" (Node 1). Upon receipt of the explore frame from Node 1, Node 3 may update its reverse routing table to include information regarding the source of the explore frame (Node 1), the next "hop" (Node 2) and the destination node (Node 5). Upon receipt of the explore frame from Node 1, Node 4 may update its reverse routing table to include information regarding the source of the explore frame (Node 1), the next "hop" (Node 3) and the destination node (Node 5). Upon receipt of the explore frame from Node 1, Node 5 may update its reverse routing table to include information regarding the source of the explore frame (Node 1), the next "hop" (Node 4) and the destination node (Node 5). Continuing the example, next, Node 5 may transmit a report frame to Node 1 through Node 4; Node 4 may transmit a report frame to Node 1 through Node 3; Node 3 may transmit a report frame to Node 1 through Node 2; and, Node 2 may transmit a report frame to Node 1. Following receipt of the report frames from Nodes 2 through 4, Node 1 may update its routing table to include Node 5 as a destination, and Node 2 as the next hop node.

In embodiments, an algorithm may be used in a distributed routing system in which there is a local prioritization that determines which of the next hops are to be stored in a given routing table based at least in part on a metric. In an example, such an algorithm and its associated metric may be used to determine which of a plurality of received report nodes is to be stored in a node's routing table. For example, the metric employed by the algorithm may require that the node receiving more than one report frame store only the report frame having the lowest metric value, thus storing that data that is associated with the best available route.

In embodiments, the initiation of a node transmission within a distributed routing system may originate with a user request (e.g., a human operating a remote control), with a device initiated request (e.g. a smoke alarm activated during a fire), or some other origin.

In embodiments, a node may experience an error in transmission within a distributed routing method and system. For example, if Node 3 cannot communicate with Node 4 when forwarding a frame to Node 5 on behalf of Node 1, it may issue an explore frame for Node 5. This may have the effect of repairing the remaining communication path to Node 5.

In embodiments of the present disclosure, node communication within a mesh network may be based at least in part on a source routing method and system. A source routing method may be preferable to a distributed routing method and system, in certain embodiments, insofar as a source routing system does not require distributed memory and the storage of routing data at the node level. In embodiments, a mesh network using a source routing methodology may be associated with a central network topology server from which any node in the network may request network topology updates. A node may request network topology updates on a fixed time interval, upon the receipt of a type of transmission, or based upon some other criterion. The receipt of the network topology update data may enable a node to continuously ensure that its network awareness is accurate.

In embodiments, the network topology data that is stored within a central network topology server may not be accurate. As a result of the outdated network topology data, a node in the mesh network may have to use an alternate method and system for obtaining current network topology and routing data.

Figure 34:
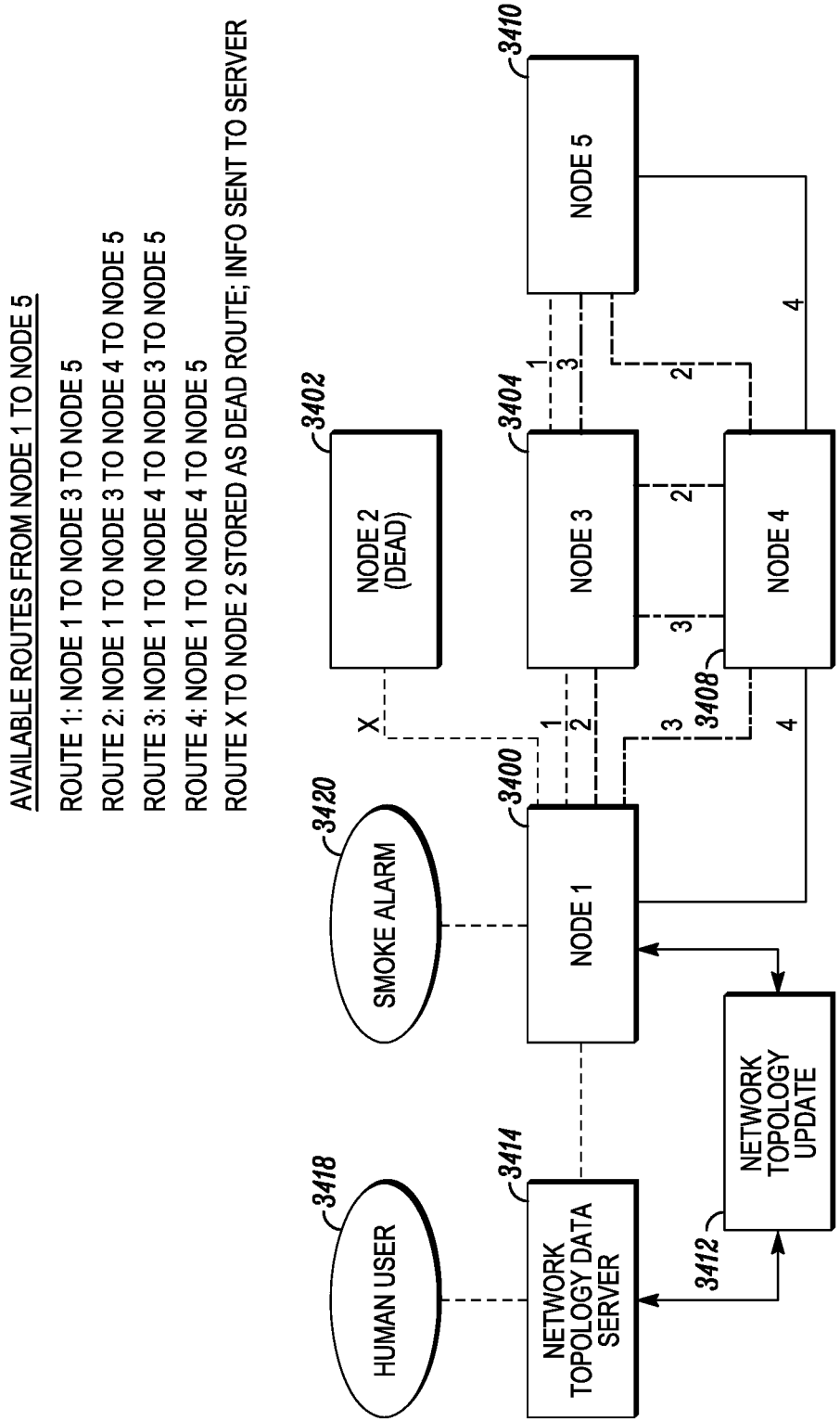
FIG. 34 illustrates a simplified embodiment of a source routing method and system.

In embodiments, route resolution through explore frames may be used to obtain current routing information in mesh network. Referring to FIG. 34, in an example, a Node 1 3400 may attempt to communicate with a destination node, Node 5 3410, in a mesh network using the network topology data obtained from a central network topology data server 3414, a source data master controller, or some other source of network topology data residing apart from the node itself.

Node 1 3400 may as part of its algorithm have a preferred Node 1 3400 to Node 5 3410 route consisting of "Node 1 to Node 2 to Node 5." Upon failure of the transmission to the dead Node 2 3402 (e.g., the failure of Node 1 to receive an acknowledgement frame from Node 2 3402 indicating transmission success) Node 1 3400 may request a network topology update from the central network topology server 3414. Next, Node 1 3400 may again attempt to transmit to the destination node, Node 5 3410, this time using the updated network topology data. In this example, the second attempt of Node 1 3400 also fails due to inaccurate network topology data regarding the status of Node 2 3402 that is received from the central network topology server 3414. As a result, Node 1 3400 may broadcast explore frames using a flooding algorithm in which an explore frame is distributed to all of the nodes in the mesh network with which Node 1 3400 may communicate (for the example embodied in FIG. 34 it is presumed that Node 1 3400 is unable to directly communicate with Node 5 3410 due to too great a physical separation between the nodes). Thus, Node 1 3400 sends an explore frame that's picked up by Node 3 3404 and Node 4 3408. Node 3 3404 in turn forwards a copy of the explore frame from Node 1 3400 which is picked up by Node 4 3408 and Node 5 3410. Similarly, Node 4 3408 forwards a copy of the explore frame which is picked up by Node 3 3404 and Node 5 3408. Upon receipt of the explore frames, Node 5 3410 transmits a frame back through Node 3 3404 and Node 4 3408, which in turn transmit to the nodes with which each has contact: Node 4/Node 3, and Node3/Node 1, respectively. During each transmission between nodes, a node ID is appended to the message header indicating its origin. As a result, the report frames received by Node 1 3400 each indicates the route traveled from Node 5 3410 to Node 1 3400. In an embodiment, this data may be used to confirm the presence of an available route that Node 1 3400 may use in transmitting data from Node 1 3400 to Node 5 3410. In the example illustrated in FIG. 34, the available routes are:

Route 1: Node 1 to Node 3 to Node 5;
Route 2: Node 1 to Node 3 to Node 4 to Node 5;
Route 3: Node 1 to Node 4 to Node 3 to Node 5;
Route 4: Node 1 to Node 4 to Node 5.

In embodiments, an algorithm may be associated with Node 1 3400 and used to distinguish among the routes that are available for transmitting between Node 1 3400 and Node 5 3410. For example, the algorithm may include information on traffic density over each route and select the least busy route for transmission. Alternatively, the order in which the report frames are received may be used as a proxy by the algorithm for determining which of the routes is associated with the faster transmission. Alternatively, the algorithm may use some other network information as a basis for selecting which of the available routes to use in transmitting from Node 1 3400 to Node 5 3410.

In embodiments, any node in the mesh network may initiate the explore frames as shown for Node 1 3400 in FIG. 34.

In embodiments, the frame distributed by Node 1 3400 may be a special frame type (e.g. explore report frame).

In an embodiment, the available route information received by Node 1 3400, indicating, in part, that Node 2 3402 is dead, may be transmitted to the central network topology server 3414 in order for it to update 3412 its inaccurate network topology. In an embodiment, the central network topology server 3414 may then broadcast the network topology update to all nodes in the mesh network in order to inform each of Node 2's 3402 demise.

In embodiments, the initiation of a node transmission within a source routing system may originate with a user request (e.g., a human operating a remote control) 3418, with a device initiated request (e.g. a smoke alarm activated during a fire) 3420, or some other origin.

Figure 35:
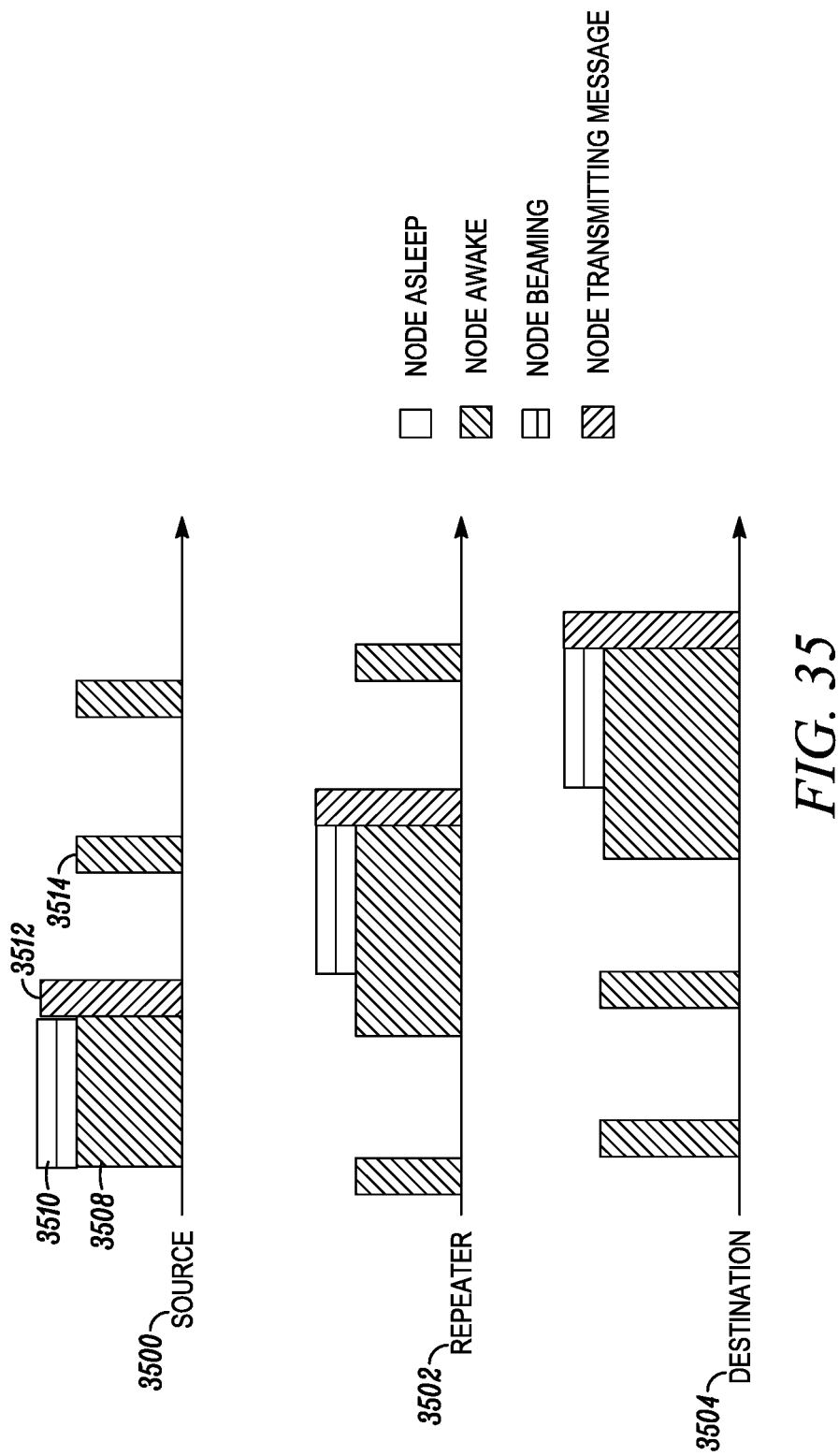
FIG. 35 illustrates a message transmission with node beaming in a simplified network.

As illustrated in FIG. 35, in embodiments, a mesh network node, including but not limited to a battery-powered node, may cycle through "asleep" periods during which time the node is unable to receive a message, and "awake" periods 3514 when the node is powered and enabled to receive a transmitted message 3512. The time interval between the awake periods 3514 of node may be varied across nodes within a network. For example, one node may operate at an interval of 0.25 seconds, and another within the same mesh network may have an awake period 3514 interval of 1.0 seconds. The time interval between the awake periods 3514 may be node-specific, may be the same across a mesh network, or the same for only a subset of nodes within a mesh network.

FIG. 35 shows a simplified mesh network, such as a wireless mesh network, consisting of three nodes: a source node 3500, a repeater node 3502, and a destination node 3504. In the example, the source node 3500 seeks to transmit a message 3512 to the destination node 3504 by using the repeater node 3502 as an independent relay. Each of the nodes is cycling through awake period intervals 3514. The asleep periods of the nodes may enable the nodes to conserve their electrical usage, as compared to a node that is fully powered at all times. This may enable a battery powered node to conserve its electrical storage and provide a longer battery life to the nodes in the network. This may minimize maintenance, user operator interaction, cost, or some other variable.

In the FIG. 35 example, the source node 3500 seeks to transmit a message 3512 first to the repeater node 3502. Because the repeater node 3502 must be in an awake period 3514 (i.e., powered) in order to receive the message 3512, the source node 3500 precedes the message 3512 with a "wake up beam" 3510 that exceeds the length of the asleep period of the repeater node 3502. This may ensure that no matter when the source node 3500 initiates transmission of the beam there will be at least one awake period 3514 during which time the repeater node 3502 may receive it. Once the repeater node 3502 is in an awake period 3514 that temporally overlaps transmission of the beam 3510, it is instructed to remain active (as opposed to its standard procedure of cycling back into the asleep mode) and the repeater node continues to remain powered and enable to receive a transmitted message 3512. In this awake state 3514, the repeater node 3502 may now receive the transmitted message 3512 that is associated with the beam 3510 sent from the source node 3500. The repeater node 3502 may next relay the message 3512 on to the destination node 3504 using the same methods and systems as that used in the source-to-repeater-node-transmission.

Figure 36:
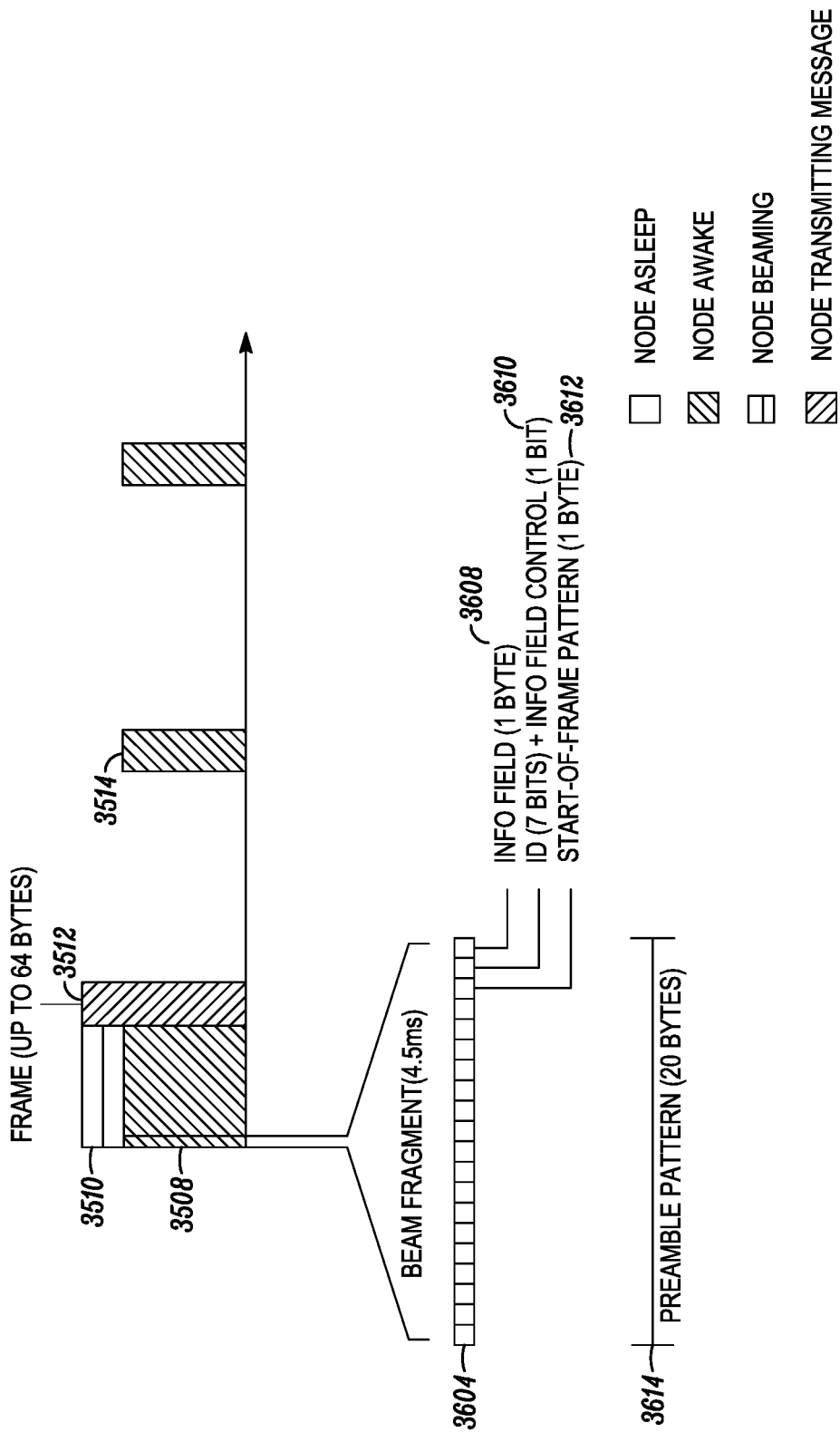
FIG. 36 illustrates a preamble pattern within a node beam.

Referring to FIG. 36, in order to indicate to the repeater node 3502 that the beam 3510 and its associated message 3512 are intended for it, the beam 3510 may include a preamble pattern 3614 within a fragment of the beam 3604. A preamble pattern 3614 may consist of 20 bytes and include within it an info field 3608, a node ID and info field control 3610, a start-of-frame pattern 3612, or some other information. This information may be used to indicate which nodes are to remain active upon receipt of a beam 3510, and enable it to receive a message 3512 upon receipt of the beam 3510. In embodiments, the information contained with the preamble may be specific to a single node, all nodes within a mesh network, or some subset of nodes within a mesh network.

In embodiments, a mesh network according to the methods and systems describe herein may include configuring a constant powered mesh network node to control the configuration of an intermittently powered mesh network node, wherein the intermittently powered mesh network node periodically powers down to conserve energy; and causing the intermittently powered mesh network node to request configuration information from the constant powered mesh network node when the intermittently powered mesh network node powers up.

In embodiments, a node may be powered by a battery, a fuel cell, a solar cell, an alternative energy source, AC power source, DC power source, or some other energy supply.

In embodiments, a wake up destination may maintain a plurality of configurations associated with a plurality of intermittently powered mesh network nodes.

In embodiments, a configuration facility may be used to configure the constant powered mesh network node. A configuration facility may be a portable node, a handheld node, a PDA node, a permanently mounted facility, or some other node or facility type.

In embodiments, the present disclosure provides a method and system for scanning a plurality of nodes in a mesh network to identify a current active wake up destination for a battery powered mesh network node; requesting the current active wake up destination to send a change wakeup destination signal; and requesting a new route from a node in the mesh network if the battery powered mesh network node does not have a wakeup destination in its memory. In embodiments, the method may further comprise a battery powered mesh network node confirming a change from a first wakeup destination to a second wakeup destination.

In embodiments, the mesh network may be a wireless mesh network.

In embodiments, the present disclosure provides a method and system for associating a first node in a mesh network with a communication type; activating the first node at a predefined interval to detect the presence of a message of the communication type in a transmission from a second node in the mesh network; continuing to activate the first node at the predefined interval if the transmission from the second node does not conform to the associated communication type of the first node; activating the first node beyond the predefined interval if the associated communication type is detected in the transmission from the second node; and receiving a message at the first node from the second node following detection of the associated communication type.

In embodiments, a node, including but not limited to a battery powered node, may be associated with a device. A device may be a consumer electronic device, or some other device. A consumer electronic device may be networked. A consumer electronic device may be UPnP networked. A consumer electronic device may be a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a refrigerator, a freezer, a microwave, an oven, a stove, a computer, a printer, a fax, a scanner, a copier, a gateway, a modem, an ISDN, a garage door, a door lock, a drape, a storm shutter, a window opener, a door opener, a sprinkler, or some other device, component, gadget, electronic system for indoor or outdoor use.

In embodiments, a battery powered node may be associated with a capacitor. A capacitor may be further associated with a device. In embodiments, a battery powered node may be associated with a rechargeable battery. A rechargeable battery may be associated with a device.

In embodiments, a mesh network may include a plurality of battery powered nodes.

In embodiments, a node may be associated with a node ID. A node ID may be unique to a node. A node ID may be randomly assigned. A node ID may be associated with a plurality or nodes.

In embodiments, a node in a mesh network may be associated with data indicating which nodes in the mesh network are battery-powered. This data may be stored locally at the node, stored in a central network topology server, or stored in some other location.

In embodiments, a communication type may be identified based at least in part on data in a message preamble pattern. A message preamble pattern may be associated with a sensor network. A sensor network may be a grouping of network nodes. A grouping of network nodes may be created by a user, an algorithm, or some other method or system. In embodiments, a sensor network may be associated with a network identifier. A message preamble pattern may include a network identifier.

In embodiments, a sensor network may be associated with an edge node that is further associated with a network.

In embodiments, a message may be transmitted through a mesh network using a flooding algorithm. A flooding algorithm may include an instruction for a first node to transmit the message to all mesh network nodes with which it can communicate. A flooding algorithm may include an instruction for a node receiving a first node's transmitted message to further transmit the message to all mesh network nodes with which it can communicate.

In embodiments, a message may be associated with route information.

In embodiments, a message preamble pattern may be associated with route information.

In embodiments, route information may include the identifiers of the nodes within a route. Route information may include an indication if a node in a route is battery-powered or not. Route information that includes a battery-powered node may be further associated with an algorithm to associate message preamble pattern to activate a node for a sufficient period to receive a message.

In embodiments, activation of a first node beyond the predefined interval may enable it to receive a plurality of messages prior to deactivating.

In embodiments, a message transmitted from a first node to a second node may be further transmitted to a third node in the mesh network. A third node may be a plurality of nodes. A third node may be activated at a predefined interval to detect the presence of a communication type as with the first node transmission to a second node.

In embodiments, a mesh network may be a wireless mesh network.

In embodiments, a message may be associated with a message identifier. A message may include a list of all nodes to which the message has previously been forwarded.

In embodiments, a first node may store a list of neighbouring nodes. In embodiments, a node may compare a list of neighbouring nodes to the list of all nodes to which the message has previously been forwarded, and relay the message only to those neighbouring nodes that have not previously received the message.

In embodiments, a mesh network signal may be a radio signal.

In embodiments, a mesh network signal may be an infrared signal.

Figure 37:
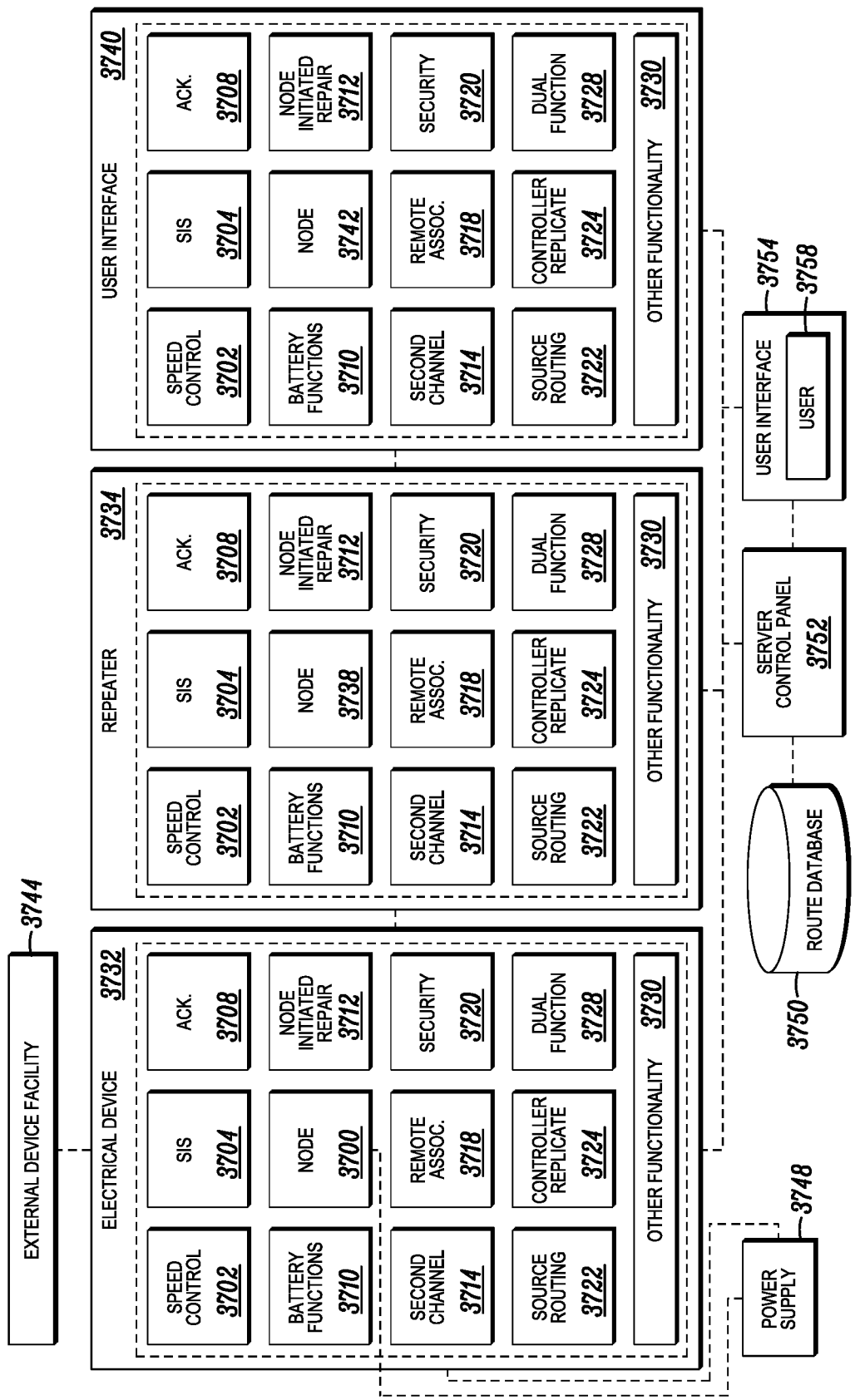
FIG. 37 illustrates a simplified wireless network incorporating an electrical device.

Referring to FIG. 37, in embodiments, a mesh network node (3700, 3708, 3742) may be associated with an electrical device 3732, a repeater 3734, a user interface 3740, or some other facility. In embodiments, a node 3700 may be associated with a power supply 3748. In embodiments, a mesh network node (3700, 3708, 3742) may be associated with a functionality including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein. A functionality associated with a mesh network node (3700, 3708, 3742) may be used in combination with each of the other functionalities, including a plurality of the functionalities.

In an example, an electrical device 3732 may be associated with a node 3700 that is operating in a wireless mesh network that includes a mix of AC-powered devices and battery-powered devices. Battery-functions 3710 may be associated with the node 3700 in order to extend the operational lifetime of the device. This same node 3700 may be further associated with an acknowledgement functionality 3708. For example, the node may receive a wakeup beam alone or in combination with a point-to-point flooding of nodes in the network. The wakeup beam may transmit a preamble alerting the battery-powered node 3700 to receive the message. Once the message is received, the node 3700 may acknowledge this receipt using an acknowledge functionality 3708 that is associated with the node 3700. This acknowledgement may be a silent acknowledgement functionality, as described herein, or some other form of acknowledgement functionality. In embodiments, just as in this example the node 3700 is associated with the combination of battery functions 3710 and acknowledgement 3708, a node 3700 may be further associated with any other functionality or combination of functionalities described herein including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730.

In embodiments, an electrical device 3732 may be associated with an external device facility 3744. In an example, an electrical device 3732, such as a door status device that is enabled to determine if a door is "open" or "closed," may be further associated with an external device facility 3744, such as an alarm speaker that is enabled to sound if the door is opened.

In embodiments, an electrical device 3732, repeater 3734, and/or user interface 3740, and their corresponding mesh network nodes (3700, 3708, 3742) and functionalities, may be associated with a server control panel 3752, route database 3750, user interface 3754, and/or a user 3758. In an example, a user 3758 may employ a user interface 3754 such as a panel with a numeric keypad, a mobile device, or some other user interface 3754 to communicate with a mesh network. The user 3758 may be able to issue a command (e.g., "turn on the porch light") to the mesh network through the user interface 3754. The command may be communicated to a server control panel 3752. The server control panel 3752 may be associated with a route database 3750 which stores the route information for transmitting a command to the node 3700 that is associated with the electrical device 3732 (e.g., "porch light node"). The server control panel 3752 may transmit the command to the node 3700 directly, or it may use an intermediate repeater 3734, or plurality of repeaters.

In embodiments, an electrical device may be a home control device, an audio-visual device, a security device, a temperature control device, an environmental device, a lighting device, a healthcare device, a user interface device, or some other electrical device type.

In embodiments, a home control device may be an electrical lamp, a stand alone light, a fixed light, a refrigerator, a stove, a microwave, a freezer, a coffee machine, an oven, a window covering, a lock, an HVAC device, a garage door, an alarm system, a camera, a camcorder, a sprinkler, a wine cooler, a dishwasher, a washing machine, a dryer, a water softener, a humidifier, a dehumidifier, an awning, a window opener, a rice cooker, an iron, a door opener, a gas detector, a fax, a shredder, a keyboard, a mouse, a trackball, a pen, a pool circulator, a pump, a valve, a hot water heater, a boiler, an appliance motor, a communication link, a machinery device, a garden light, a landscape light, an invisible pet fence, a gate, a spa, or some other home control device type. In embodiments, each home control device type may be associated with a plurality of repeater nodes 3734, user interface nodes 3740, external device facilities 3744, and the like. The home control device may be associated with an external power supply 3748, as described herein. The home control device may be associated with an external user 3758, user interface 3754, and a server control panel 3752 and route database 3750. In embodiments, the home control device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, a user 3758 who is a commuter in traffic during a rainstorm may recall that she left a window open in her home when leaving for work in the morning and now wish to close that window to prevent water damage on her wood floor. This user 3758 may use a user interface 3754, such as a cell phone, PDA or some other user interface, to send a command to her home mesh network to close the window. The command may be transmitted to a server control panel 3752. The server control panel 3752 may access route information regarding how to route the command to the node 3700 that is associated with the electrical device 3732 controlling the window (e.g. a motor). The server control panel 3752 may associate the command with the route information and transmit the command to a repeater 3734, a plurality of repeaters, or directly to the node 3700 associated with the electrical device 3732 controlling the window. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein. For example, the command may be associated with a security functionality 3720 that authenticates the user, user interface, and like from which the command originates. Upon receipt of the command, the node 3700 may activate the motor controlling the window in order to close it. In another example of functionality that may be associated with the transmission of the command to the electrical device, as the command is transmitted from node to node, acknowledgement 3708 may be used to verify a successful transmission of the command.

In embodiments, an audio-visual device may be a VCR, a TV, a personal computer, a stereo, a radio, a phonograph, an MP3, a streaming media player, an amplifier, a camera, a camcorder, a scanner, a copier, a surround sound device, a light, a cable, a network, a satellite dish, a wireless router, a CD player, an Ipod, a communication link, an HDMI bridge/converter, or some other audio-visual device type. In embodiments, each audio-visual device type may be associated with a plurality of repeater nodes 3734, user interface nodes 3740, external device facilities 3744, and the like. The audio-visual device may be associated with an external power supply 3748, as described herein. The audio-visual device may be associated with an external user 3758, user interface 3754, and a server control panel 3752 and route database 3750. In embodiments, the audio-visual device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, a user 3758 may have a personal computer that is connected to the Internet from which it may access streaming media content. This personal computer may be further associated with a network, cable, and the like which includes, in part, a monitor such as a TV. This user 3758 may use a user interface 3754, such as a TV monitor with a remote control, personal computer monitor or some other user interface, to send a command to her home mesh network to download streaming media, such as a movie, to her personal computer and to transmit the movie through the home network for viewing on the TV monitor. Each electrical device (e.g., personal computer, network, TV, etc.) may be associated with a node 3700 within the mesh network. The command to retrieve the streaming media may be transmitted to a server control panel 3752. The server control panel 3752 may access route information regarding how to route the command to the node 3700 that is associated with the electrical device 3732 controlling the personal computer. The server control panel 3752 may associate the command with the route information and transmit the command to a repeater 3734, a plurality of repeaters, or directly to the node 3700 associated with the electrical devices 3732 necessary for presenting the streaming media on the TV monitor. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, a security device may be a home alarm, a smoke alarm, a fire alarm, a siren, a bell, a gas detection alarm, a motion detector, a light, a motion-detector-lighting combination, an intercom system, a paging system, or some other type of security device. In embodiments, each security device type may be associated with a plurality of repeater nodes 3734, user interface nodes 3740, external device facilities 3744, and the like. The security device may be associated with an external power supply 3748, as described herein. The security device may be associated with an external user 3758, user interface 3754, and a server control panel 3752 and route database 3750. In embodiments, the security device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, a smoke alarm may be associated with a node 3700 in a mesh network. Upon detection of smoke, the smoke alarm may transmit a command over the mesh network using the node with which it is associated. This command may be transmitted to an external device facility 3744, such as a siren mounted on the outside of the house, a municipal firefighting station, or some other external device facility. This mesh network may be further associated with a user 3758 and a user interface 3754. The command may be transmitted to a server control panel 3752. The server control panel 3752 may access route information regarding how to route the command to the external device facility 3744, user interface 3754, or some other facility associated with the mesh network. The server control panel 3752 may associate the command with the route information and transmit the command to a repeater 3734, a plurality of repeaters, or directly to, for example, a user interface (3754, 3740) to alert the user 3758 that smoke has been detected at the house. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, a temperature control device may be an air conditioner a fan, a heater, a furnace, a thermostat, a water-based heater, a forced-air heater, a floor heater, or some other type of temperature control device. In embodiments, each temperature control device type may be associated with a plurality of repeater nodes 3734, user interface nodes 3740, external device facilities 3744, and the like. The temperature control device may be associated with an external power supply 3748, as described herein. The temperature control device may be associated with an external user 3758, user interface 3754, and a server control panel 3752 and route database 3750. In embodiments, the temperature control device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, an air conditioner may be associated with a node 3700 in a mesh network. A homeowner, upon learning that he must remain at work until late at night, may wish to intervene with his home thermostat's daily schedule of turning on the house air conditioner at 5 p.m. so that the house is cool when he arrives home. Instead, because his expected home arrival is now 11 p.m., he may wish to alter the schedule to turn on the air conditioner at 10 p.m. Using a user interface 3754, such as a personal computer in his workplace, this user 3758 may transmit a command to his home mesh network instructing it to alter the air conditioner's schedule. The command may be transmitted to a server control panel 3752. The server control panel 3752 may access route information regarding how to route the command to the electrical device 3732 (i.e., air conditioner). The server control panel 3752 may associate the command with the route information and transmit the command to a repeater 3734, a plurality of repeaters, or directly to the node 3700 that associated with the air conditioner. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, an environmental device may be a light sensor, a water sensor, a water leak sensor, a motion sensor, a humidity sensor, a soil moisture sensor, a temperature sensor, an animal detection sensor, a sensor-alarm combination, a sprinkler, a gas detector, a poison detector, a Geiger counter, a meter, an energy harvester, a pump, a valve, or some other type of environmental device. In embodiments, each environmental device type may be associated with a plurality of repeater nodes 3734, user interface nodes 3740, external device facilities 3744, and the like. The environmental device may be associated with an external power supply 3748, as described herein. The environmental device may be associated with an external user 3758, user interface 3754, and a server control panel 3752 and route database 3750. In embodiments, the environmental device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, an environmental device, such as a soil moisture sensor may be associated with a mesh network. The mesh network may also include other electrical devices, including other environmental devices, such as a sprinkler, a water leak sensor or some other electrical device. A soil moisture sensor may be further associated with rules relating to soil moisture threshold values, such that upon the soil dropping to a stated moisture level, the node 3700 associated with the soil moisture sensor transmits a command through the mesh network. A component of the command may be information signaling the sprinkler system to begin spraying the soil with water. The command may be transmitted to a server control panel 3752. Alternatively, the command may include data causing it to transmit directly to a node that is associated with the sprinkler system. The server control panel 3752 may access route information regarding how to route the command to the electrical device 3732 (i.e., sprinkler). The server control panel 3752 may associate the command with the route information and transmit the command to a repeater 3734, a plurality of repeaters, or directly to the node 3700 that associated with the sprinkler. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, a lighting device may be a dimmer, a lighting control switch, an electric lamp, a luminary, a bulb, an energy saving lamp, an LED, an external light, an internal light, a pool light, a programmable light, or some other type of lighting device. In embodiments, each lighting device type may be associated with a plurality of repeater nodes 3734, user interface nodes 3740, external device facilities 3744, and the like. The lighting device may be associated with an external power supply 3748, as described herein. The lighting device may be associated with an external user 3758, user interface 3754, and a server control panel 3752 and route database 3750. In embodiments, the lighting device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, a lighting device may be a lighting control switch that is associated with a node 3700 in a mesh network. A user 3758 driving in a car that is about to arrive at a user's home may wish to illuminate the interior of his home prior to arriving as a means of alerting any intruders that someone may be arriving soon, and for the practical reason of removing the necessity of the user 3758 walking through the dark to turn on a light. To activate the lighting control switch, the user 3758 may employ a user interface (3754, 3740) to transmit a command to the home mesh network. This user interface may be the car's GPS navigation monitor, a cell phone, PDS, or some other user interface (3754, 3740). The command may be transmitted to a server control panel 3752. Alternatively, the command may include data causing it to transmit directly to a node that is associated with the lighting control device. The server control panel 3752 may access route information regarding how to route the command to the electrical device 3732 (i.e., light(s)). The server control panel 3752 may associate the command with the route information and transmit the command to a repeater 3734, a plurality of repeaters, or directly to the node 3700 that associated with the light(s). Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, a healthcare device may be an anesthesia device, a cardiovascular device, a clinical chemistry/toxicology device, a dental device, an ear/nose/throat device, a gastroenterology device, a urology device, a general surgery device, a plastic surgery device, hematology device, pathology device, an immunology device, microbiology device, a mammography device, a neurological device, an OB/GYN device, an ophthalmic device, a radiology device, or some other type of healthcare device. In embodiments, each healthcare device type may be associated with a plurality of repeater nodes 3734, user interface nodes 3740, external device facilities 3744, and the like. The healthcare device may be associated with an external power supply 3748, as described herein. The healthcare device may be associated with an external user 3758, user interface 3754, and a server control panel 3752 and route database 3750. In embodiments, the healthcare device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In an example, a healthcare device may be a cardiovascular device, such as an electronic blood pressure monitor, that is associated with a mesh network operating within a physician's office. The blood pressure monitor may be further associated with rules or threshold values (e.g. "diastolic pressure>85=high blood pressure") which when surpassed cause a node 3700 that is associated with the blood pressure monitor to transmit a command over the mesh network. A patient visiting the physician's office may have her blood pressure taken with the device and if a threshold, such as "high blood pressure" is triggered, a plurality of commands may be transmitted to a plurality of locations including, but not limited to, a server storing an electronic medical record, a nursing station, a physician's PDA, or some other facility. The command may be transmitted to a server control panel 3752. Alternatively, the command may include data causing it to transmit directly to a node that is associated with another electrical device (e.g., a personal computer). The server control panel 3752 may access route information regarding how to route the command. The server control panel 3752 may associate the command with the route information and transmit the command to a repeater 3734, a plurality of repeaters, or directly to another location. Transmission of the command may be associated with a functionality or plurality of functionalities including, but not limited to, speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, a user interface device may be a PDA, a personal computer, a cell phone, a blackberry, a GPS monitor, a TV, a touchscreen, or some other type of user interface device. In embodiments, each user interface device type may be associated with a plurality of repeater nodes 3734, user interface nodes 3740, external device facilities 3744, and the like. The user interface device may be associated with an external power supply 3748, as described herein. The user interface device may be associated with an external user 3758, user interface 3754, and a server control panel 3752 and route database 3750. In embodiments, the user interface device may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, an action may be performed based at least in part on the data that is transmitted in association with an electrical device. An action may be a general controlling action in which a device is manipulated in a manner, for example locking or unlocking a door, or some other controlling action. An action may be a monitoring action, an action that determines the status of a node or device (e.g. "window is open"), or some other general action.

In embodiments, an action may be a lighting control action. A lighting control action may include, but is not limited to, turning a light on, turning a light off, and/or dimming a light. A lighting control action may be related to configuring a light, to a preset dim value, to a dim ramp rate, to timing delays, to a grouping of lighting devices, setting a specific light to a light intensity level, setting a group of lights to a specific light intensity level, programming a light, or a plurality of lights, to a specific light intensity level, or some other lighting control action.

In embodiments, an action may be a temperature control action. A temperature control action may be setting a heating level, setting a cooling level, setting a humidity level, setting a temperature level according to a time schedule, and/or setting a fan level. A temperature control action may be related to turning a temperature control device on, turning a temperature control device off, or performing some other temperature control action.

In embodiments, an action may be an access control action. An access control action may include, but is not limited to, locking, unlocking, opening a device, closing a device, moving a device, turning an alarm on, turning an alarm off, sending a low battery alert, detecting motion, detecting an occupancy, or some other access control action.

In embodiments, an action may be an audio-visual action. An audio-visual action may include, but is not limited to, playing a device, pausing a device, stopping a device, recording with a device, fast forwarding a device, rewinding a device, transferring media, browsing media, searching media, managing media, controlling a media screen, controlling volume, changing a channel on a device, performing a parental control, browsing and/or searching an electronic program guide, or some other audio-visual action.

In embodiments, an action may be related to consumer goods, for example, alerting a consumer to a maintenance issue.

In embodiments, an action may be related to energy production control.

Figure 38:
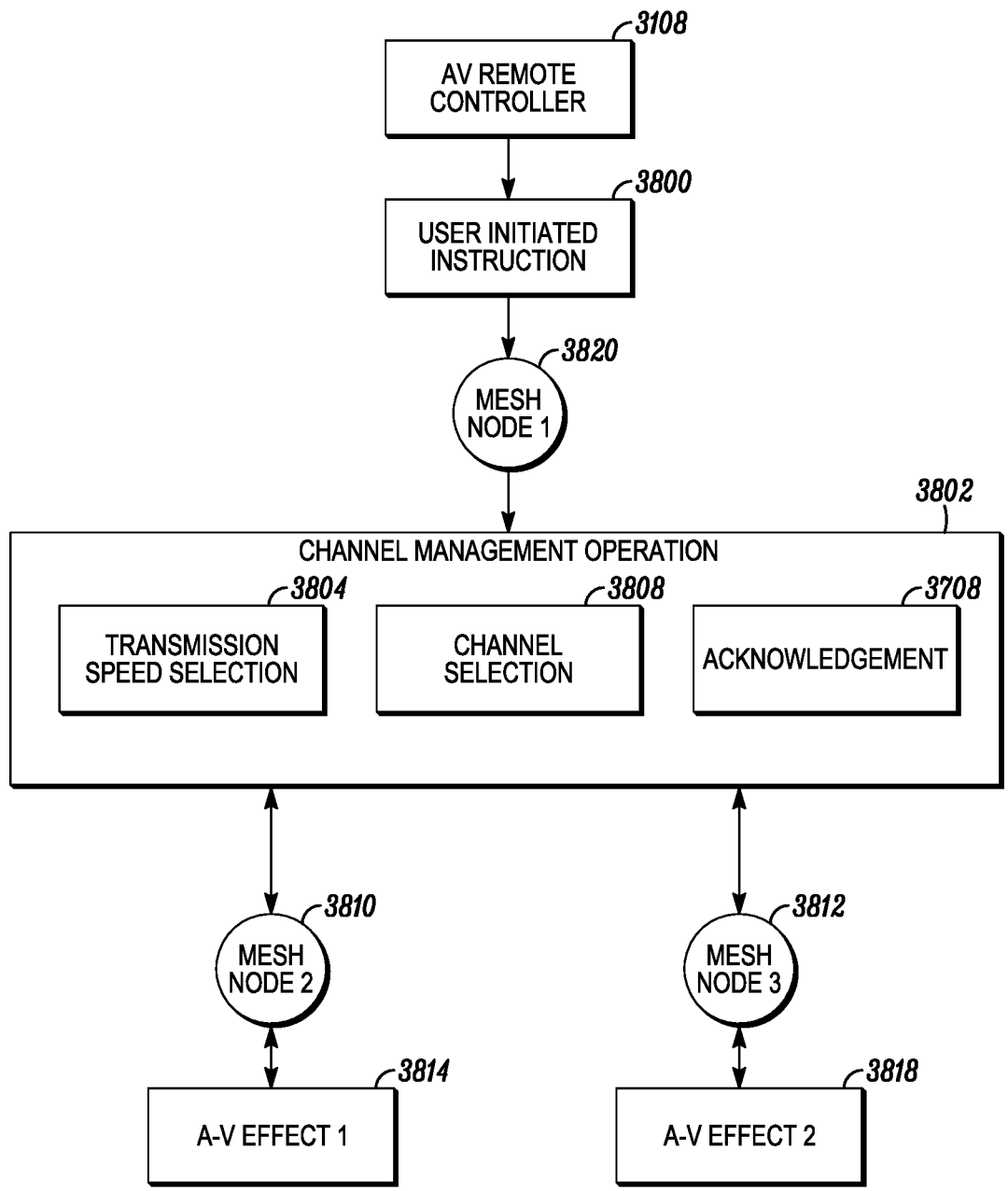
FIG. 38 illustrates using a mesh network channel management operation to control a plurality of audio-visual effects within an audio-visual system.

Referring to FIG. 38, in embodiments, a home audio-visual system may be provided that is at least in part controlled through a mesh network, wherein the home audio-visual system produces at least two effects (3814, 3818). Each of the at least two effects (3814, 3818) may be controlled through separate mesh network nodes (3810, 3812) responsive to user initiated instructions 3800, such as that received at a mesh network node 3820 from a remote controller 3108. Each of the separate mesh network nodes (3810, 3812) may be adapted to receive the user initiate instructions 3800 through a channel management operation 3802.

In embodiments, a channel management operation 3802 may involve selecting a communication transmission speed 3804, selecting a communication channel 3808, performing source routing, performing an acknowledgement procedure 3708, such as silent acknowledgement, or some other operation.

In embodiments, an effect (3814, 3818) may include an audio effect, a visual effect, a room darkening effect, an illumination effect, or some other effect.

In embodiments, a user initiated instruction 3800 may be adapted to control each of the at least two effects (3814, 3818) simultaneously. In embodiments, a single user initiated instruction 3800 may be adapted to control each of the at least two effects (3814, 3818).

In embodiments, a home audio-visual system may include a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, the control and effect production of a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

Figure 39:
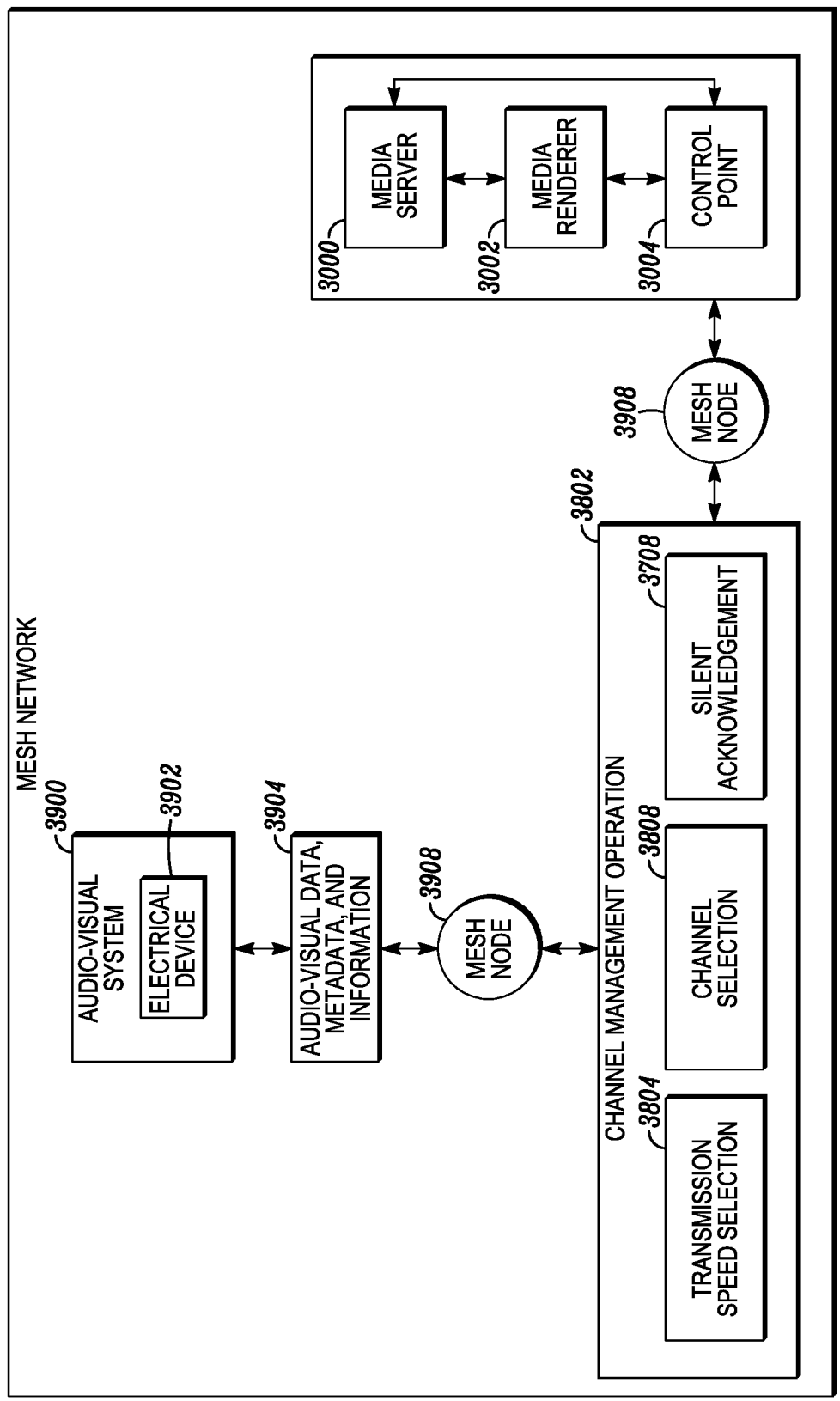
FIG. 39 illustrates using a mesh network channel management operation to communication information relating to an electrical device within an audio-visual system.

Referring to FIG. 39, in embodiments, a home audio-visual system 3900 may communicate information through a mesh network, wherein the home audio-visual system 3900 includes one or more electrical devices 3902 that produce the information 3904. The home audio-visual system 3900 may be associated with a channel management operation 3802 that is associated with one or more nodes 3908 of the mesh network to effect the communication of the information 3904. In embodiments, the information 3904 may be communicated to a media server 3000, media renderer 3002, control point 3004, or some other audio-visual system component.

In embodiments, the information may be communicated to a user. The information may relate to an audio-visual system setting. In embodiments, the information may be control information intended to be used by at least one of the one or more electrical devices within the audio-visual system. In embodiments, the information may relate to metadata. In embodiments, metadata may be related to an image, a photo, audio, a music track, an audio broadcast, an audio book, a video, a movie, a video broadcast, a stored video, a live video, a digital video recorder file, a music video, audio-visual equipment, an appliance, a content directory, and other metadata types. Metadata may be a description of content being delivered, a rating, a title, a music title, a movie title, a publisher, a right, a plurality of rights, a genre, a language, a relation, a region, a radio call signal, a radio station, a radio band, a channel number, an image name, an artist name, a music track, a playlist, a storage medium, a contributor, a date, a producer, a director, a DVD region code, a channel name, a scheduled start time, a scheduled end time, an icon, and the like.

In embodiments, a channel management operation 3802 may involve selecting a communication transmission speed 3804, selecting a communication channel 3808, performing source routing, performing an acknowledgement procedure 3708, such as silent acknowledgement, or some other operation.

In embodiments, the information communicated within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the information communicated within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

Figure 40:
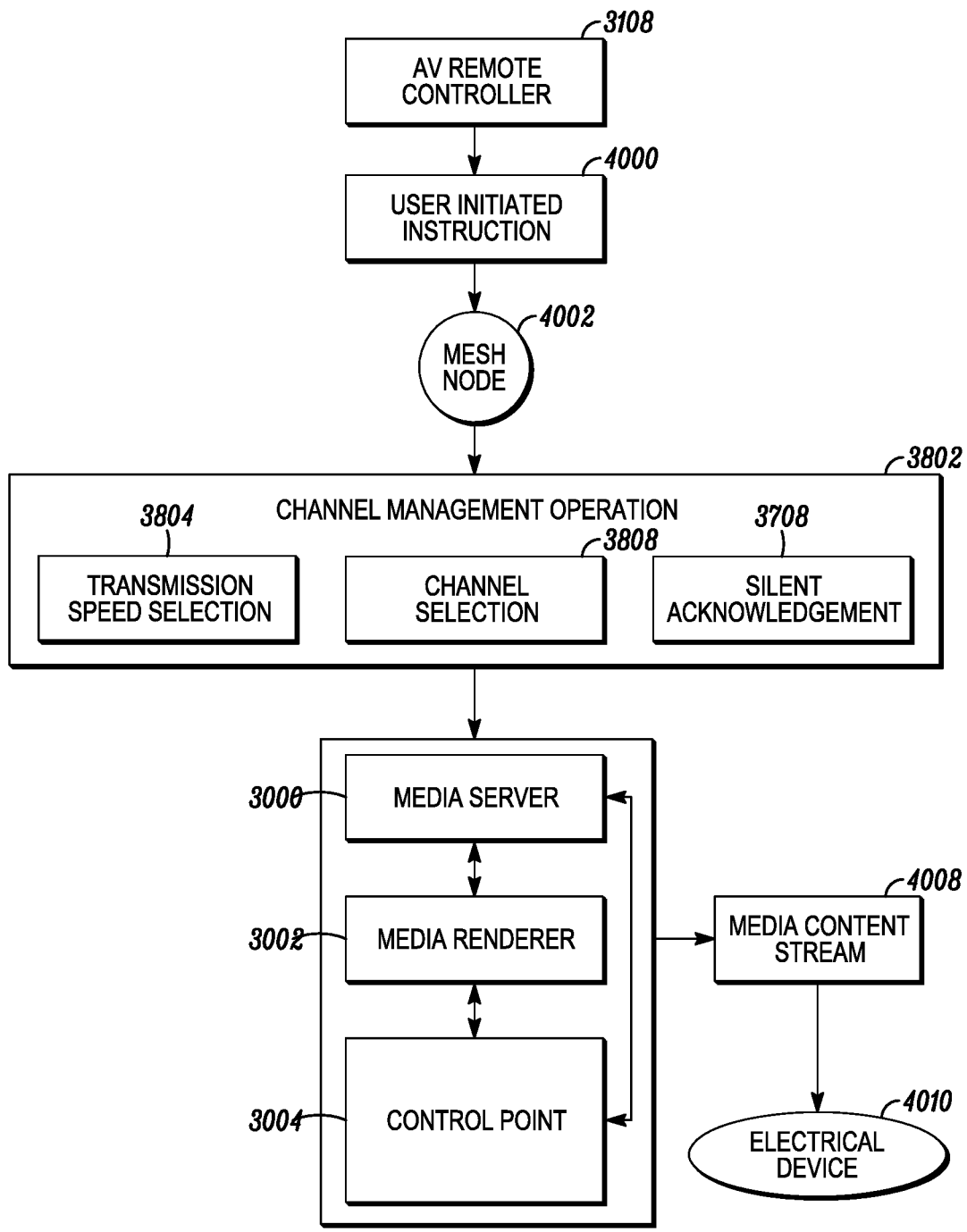
FIG. 40 illustrates using a mesh network channel management operation to communicate a user instruction relating to a media content stream within an audio-visual system.

Referring to FIG. 40, in embodiments, a media server 3000 may be enabled to control the delivery of a plurality of media content streams 4008 to a plurality of electrical devices 4010, wherein the media server 3000 is adapted to be controlled through a mesh network node 4002 using a mesh network channel management operation 4004. In embodiments, a command to the media server 3000 through the mesh network node may be transmitted in response to a user initiated instruction 4000 input to a hand held remote control 3108, causing the mesh network node 4002 to receive the user initiated command 4000 through manipulation of a channel control operation 3802. In embodiments, the media server 3000 may control the delivery of at least one of the plurality of media content streams 4008 to at least one of the plurality of electrical devices 4010 based on the user initiated command 4000. In embodiments, a media server 3000 may be associated with a media renderer 3002, control point 3004, or some other audio-visual system component.

In embodiments, a channel management operation 3802 may involve selecting a communication transmission speed 3804, selecting a communication channel 3808, performing source routing, performing an acknowledgement procedure 3708, such as silent acknowledgement, or some other operation.

In embodiments, the media server 3000 control within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the media server 3000 control within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

Figure 41:
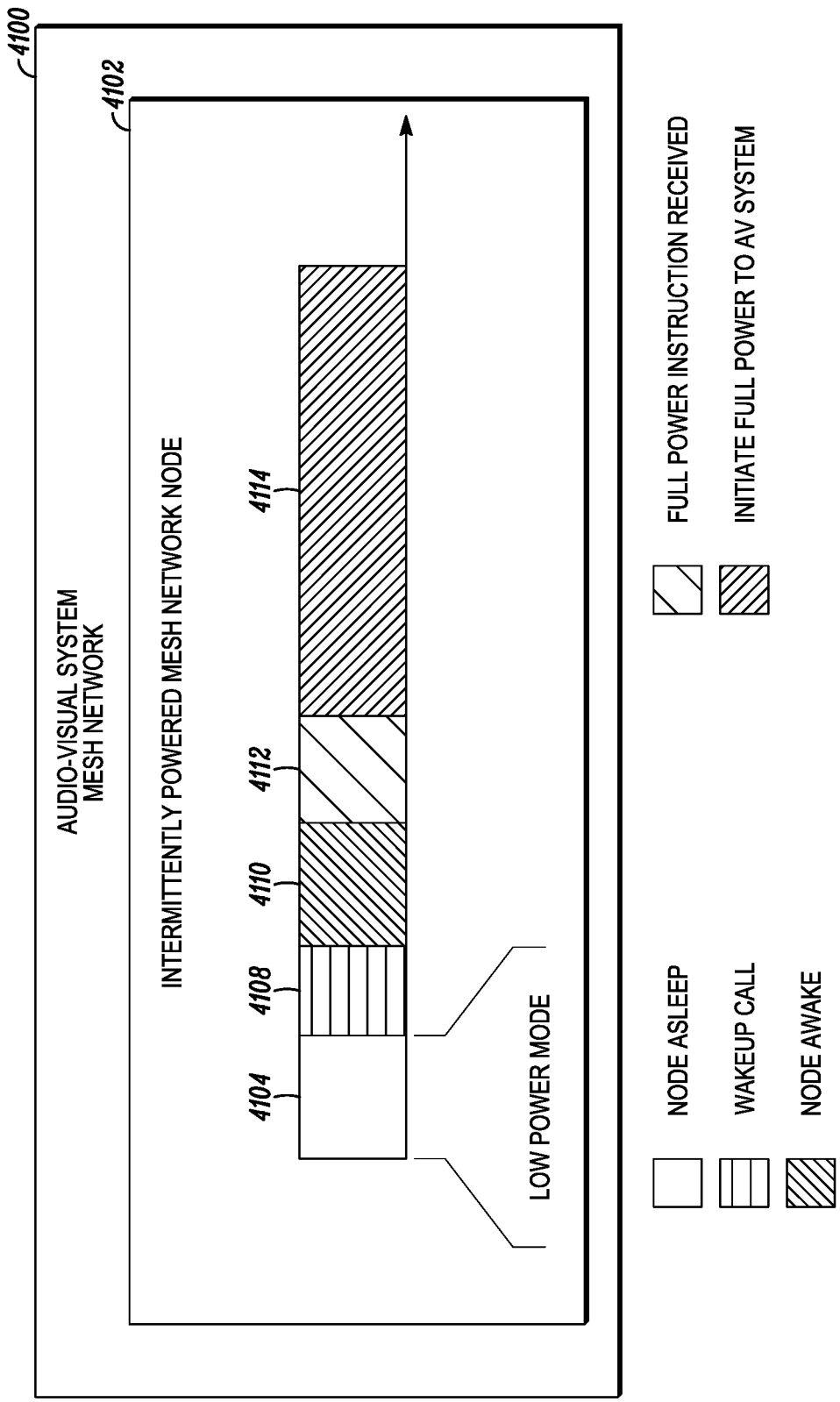
FIG. 41 illustrates using an intermittently powered mesh network node in association with an audio-visual system.

Referring to FIG. 41, in embodiments, a home audio visual system 4100 may include an energy savings mode based at least in part on an intermittently powered mesh network node 4102 that is associated with the home audio visual system 4100. In embodiments, the intermittently powered mesh network node 4102 may periodically wake up from a low power, or no power sleep mode 4104 upon receipt of a wake up call 4108. The wake up call 4108 may change the node 4102 to an awake status 4110 in which it can receive a full power instruction 4112 to initiate a full power mode 4114 in the home audio visual system. In embodiments, the wake up call may be routed to the intermittently powered mesh network node using a form of acknowledgement, such as silent acknowledgement as described herein.

In embodiments, the energy savings mode of the home audio visual system may draw no external power or a low power (e.g., 0-1 mA). In embodiments, a full power instruction may be used to close a power relay.

In embodiments, the intermittently powered mesh network node may request configuration information when the intermittently powered mesh network node powers up.

In embodiments, the intermittently powered mesh network node may transmit a command when the intermittently powered mesh network node powers up.

In embodiments, the intermittently powered mesh network node may acknowledge a command when the intermittently powered mesh network node powers up.

In embodiments, the intermittently powered mesh network node may respond to a node request when the intermittently powered mesh network node powers up.

In embodiments, the intermittently powered mesh network node may be powered at least in part using a battery, a fuel cell, a solar cell, an alternative energy source, an AC power source, or DC power source.

In embodiments, the energy savings mode of a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, a plurality of electrical devices may be associated with a mesh network. A message command may be transmitted over the mesh network to the plurality of electrical devices in response to a user initiated instruction. The command may be received by the plurality of electrical devices. The message command may be translated by the plurality of electrical devices, and the transmitted message presented at each of the electrical devices among the plurality of electrical devices.

In embodiments, the user initiated command may be initiated through spoken words. In embodiments, the spoken words may be spoken into an intercom, microphone, or some other electrical device. In embodiments, the spoken words may be converted into text through a speech recognition facility to form the message command. In embodiments, the spoken words may be interpreted and a message command selected based at least in part on the interpretation.

In embodiments, a message may indicate that a person is wanted on the phone, that a meal is prepared, that an appliance door is open/closed, a door is open/closed, a window is open/closed, that an appliance is on/off, or some other information.

In embodiments, the presentation of the message may be in a format that is appropriate for each of the electrical devices among the plurality of electrical devices. An appropriate format may include text, audio (e.g. an alarm or spoken human language), video, audio visual, photographic image, graphic, or some other format.

In embodiments, the message transmission within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the message transmission within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, a media server enabled to control the delivery of a plurality of media content streams to a plurality of electrical devices, wherein the media server is adapted to be controlled through a mesh network node. A parental control command may be transmitted to the media server through the mesh network based node in response to a user initiated instruction input to a handheld remote control. The command may cause the media server to control the delivery of at least one of the plurality of media content streams to at least one of the plurality of electrical devices based on the parental control command.

In embodiments, a parental control command may be a maximum volume threshold, related to a media content rating, may block access to a program, channel, Internet, webpage, electrical device, may be related to a time of day, or be some other parent control function.

In embodiments, a channel management operation 3802 may involve selecting a communication transmission speed 3804, selecting a communication channel 3808, performing source routing, performing an acknowledgement procedure 3708, such as silent acknowledgement, or some other operation.

In embodiments, the parental control command within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the parental control command within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, an electrical device may be associated with a mesh network. A user media preference may be associated with a user mesh network node. The user mesh network node may be associated with a user media control device. A user media preference command relating to the user media preference may be transmitted from the user media control device based at least on a physical proximity between the user media control device and the electrical device. The command may be received by the electrical device, and a setting of the electrical device may be altered based at least in part on the user media preference command.

In embodiments, the user media control device may be a chip, a cell phone, a PDA, a computer, a remote control, or some other control device.

In embodiments, a setting may be volume, a genre, a performer, a light level, a program, or some other setting.

In embodiments, the media preference command within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the media preference command within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, a mesh network node may be associated with a home security facility. An alarm command may be transmitted through the home security facility mesh network node to a plurality of electrical devices through the mesh network based at least in part on a change in the home security facility. An alarm condition may be presented through each of the plurality of electrical devices based at least in part on the change in the home security facility.

In embodiments, the change in the home security facility may be an opening action (e.g. a door), a closing action, a failure or open, a failure to close, or some other change.

In embodiments, a home security facility may be a door, window, floor, wall, fence, or some other home security facility.

In embodiments, an alarm condition may be the sound of a barking dog, the sound of people calling the police, the sound of a siren, the sound of a cocking shotgun, a high-decibel, high frequency sound, or some other alarm type.

In embodiments, the alarm command within a home audio-visual system may be associated with a node 3700 that is further associated with a functionality, a plurality of functionalities, combination of functionalities, or plurality of functionality combinations. A functionality associated with the node 3700 may include speed control 3702, including multi-speed node operations and the like, SIS 3704, acknowledgement 3708, battery functions 3710, including battery-powered nodes, battery monitoring, rechargeable battery operations, and the like, node initiated repair 3712, secondary channel enabling 3714, remote association 3718, security 3720, source routing 3722, controller replication 3724, dual functionality 3728 (e.g., application and network), or some other functionality 3730, as described herein.

In embodiments, the alarm command within a home audio-visual system may be associated with a television, a satellite receiver, a cable converter, a VCR, a digital video disc player, a laser disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, a light, a lamp, a gateway, a modem, an ISDN, or some other device, component, gadget, electronic system for indoor or outdoor audio-visual use.

In embodiments, a home audio-visual system may be provided that communicates information through a mesh network, wherein the home audio-visual system includes one or more electrical devices that produce the information. An electrical device may transmit a control command to the mesh network using a cell phone, and a channel management operation associated with one or more nodes of the mesh network may be controlled to effect the communication of the command. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. An electrical device may transmit a control command to the mesh network using a cordless phone, and a channel management operation associated with one or more nodes of the mesh network may be controlled to effect the communication of the command. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. An electrical device may transmit a control command to the mesh network using a text messaging device, and a channel management operation associated with one or more nodes of the mesh network may be controlled to effect the communication of the command. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. An electrical device may transmit a control command to the mesh network using a voice command, and a channel management operation associated with one or more nodes of the mesh network may be controlled to effect the communication of the command. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. Language subtitle information may be transmitted through the mesh network to an electrical device playing content associated with the subtitles; and a channel management operation associated with one or more nodes of the mesh network may be controlled to effect the communication of the subtitle information. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. A content retrieve command may be transmitted through a television associated with the mesh network. Content may be retrieved from a content storage facility that is independent of the television. The content may be transmitted through the mesh network for presentation on the television, and a channel management operation associated with one or more nodes of the mesh network may be controlled to effect the communication of the content. In embodiments, a channel management operation may involve selecting a communication transmission speed, selecting a communication channel, performing source routing, performing an acknowledgement procedure, such as silent acknowledgement, or some other operation.

In embodiments, a home audio-visual system may be provided that communicates information through a mesh network, wherein the home audio-visual system includes one or more electrical devices that produce the information. A television station may be selected on a television that is associated with the mesh network. A television station logo associated with the selected television station may be retrieved from a content storage facility that is independent of the television. The logo may be transmitted through the mesh network for presentation on the television, and a channel management operation associated with one or more nodes of the mesh network may be controlled to effect the communication of the logo. In embodiments, a channel management operation may involve selecting a communication transmission speed, selecting a communication channel, performing source routing, performing an acknowledgement procedure, such as silent acknowledgement, or some other operation. In embodiments, a home audio-visual system may be provided that communicates information through a mesh network, wherein the home audio-visual system includes one or more electrical devices that produce the information. Banner data may be streamed from a content storage facility that is independent of an electrical device in the mesh network. The streamed banner data may be presented to the electrical device in the mesh network, and a channel management operation associated with one or more nodes of the mesh network may be controlled to effect the communication of the streamed banner data. In embodiments, a channel management operation may involve selecting a communication transmission speed, selecting a communication channel, performing source routing, performing an acknowledgement procedure, such as silent acknowledgement, or some other operation.

In an embodiment, a monitoring system is provided to monitor an inhabitant of a living space. The monitoring may be performed by analyzing actions associated with actuators associated with the living space. The living space may, for example, have actuators such as those associated with light switches, audio visual equipment (e.g. on/off switches, control switches), kitchen appliances (e.g. on/off switches, control switches) or other such devices and each of them or many of them may be monitored to predict or infer behaviors of the inhabitants. The actuators may be associated with a network such that actuator interactivity may be monitored. Patterns of interaction may be monitored and compared with standard patterns to predict or infer a behavior of the inhabitant. For example, generally speaking, the inhabitant may typically go to bed at 8:00 p.m. Patterns of actuator interaction and actuator performance may be stored in a database. One of the patterns may be indicative of a sleeping inhabitant or an inhabitant preparing for sleep. A sleeping pattern may indicate, for example, that the light actuators in a particular room (e.g. the living room) are off during sleeping hours and that the kitchen appliances are all off. If the realtime actuator performance at 1:00 a.m. shows lights on or appliances on, an inference may be drawn that indicates the inhabitant is in trouble because of lack of compliance with the standard pattern. Of course, this is a very basic example, and the inference system may monitor several actuators and draw inferences on more complicated combinations of actual actuator performance versus standard patterns. The living space may be a home, a nursing home, a hospital, a daycare, a school, a business office, or some other space. For example, a user may monitor the activities of an elderly person residing at a distant location. Thus, an unattended elderly person can be remotely monitored for an unusual pattern in an otherwise normal routine.

In this embodiment, the method of monitoring may involve associating an actuator with a device within the living space; activating the actuator upon a status change of the device; transmitting data from the actuator to a data facility based at least in part on the activation of the actuator; comparing the transmitted data to a device standard using the data facility; and generating a message based at least in part on the data comparison.

The actuator may be associated with an electrical, electronic, or a mechanical device within the living space. The actuator may be associated with a mesh network node. The node may employ any or all of the node technologies as described herein. For example, the node may use speed control, silent acknowledgment, channel selections, or other technologies described in connection with FIGS. 1-37. Moreover, the device may be a light switch, a door lock, a window lock, a thermostat, a motion detector, or any other device described in connection with FIGS. 1-37. Also, the device may be a weight sensor, wherein the weight sensor is associated with a bed, a chair, a floor, or any other area where the inhabitant of the living space is likely to apply weight on.

The actuator may be activated upon status change of the associated device. Referring to the example mentioned above, the actuator may be activated when the elderly person switches on a light in the living space. Once activated, the actuator may transmit data related to the status change of the device to a data facility. In an embodiment the actuator transmits the data through a mesh network. The transmission through the mesh network may employ any or all of the transmission technologies as described herein. For example, the transmission may involve mesh channel manipulation, silent acknowledgement, transmitting through a battery operated node, repairing a node in the network to effect the transmission, or other technologies described in connection with FIGS. 1-37. Moreover, the transmission could be local to the living space, external to the living space, or broadcast locally and external to the living space.

In embodiments, the actuator may be separate from a device, associated with a device, combined with a device, embedded in a device, manufactured with a device as a single component, or associated with a device in some other manner.

The data received by the data facility may be compared to a standard for the device or collection of devices. The device standard may be a national norm, a personal norm representing an individuals' average use of the device or some other 'normal' condition. In our example, normal routine of the elderly person may involve all the lights at the residence to be switched off after 8:00 p.m. In this case, lights being switched off after 8:00 p.m. may be a personal norm for the light switches. Moreover, the comparison may result in generation of a message for the user, where the user may be a person attempting to monitor the inhabitant, the inhabitant, or other person involved in the monitoring process. In the example mentioned above, a message may be generated for the user in case the light is switched on after 8:00 p.m. in the evening. Switching the light on at this time does not match the personal norm and could imply an unusual activity that may require immediate attention. The message generated for the user may be in the form of an alarm, a phone call, a text message, an email, an instant message, a beeper message, or any other message to a user accessible interface.

In another embodiment, a monitoring system is provided to monitor an inhabitant of a living space. The living space may be a home, a nursing home, a hospital, a daycare, a school, a business office, or some other space. For example, a user may monitor the activities of an elderly person residing at a distant location. Thus, an unattended elderly person can be remotely monitored for an unusual pattern in an otherwise normal routine. A method for monitoring the inhabitant of the living space may involve the following steps: associating an actuator with a device within a living space; activating the actuator upon an elapsed time duration during which there is no status change of the device; transmitting data from the actuator to a data facility based at least in part on the activation of the actuator; comparing the transmitted data to a device standard using the data facility; and generating a message based at least in part on the data comparison.

The actuator may be associated with an electrical, electronic, or a mechanical device within the living space. The actuator may be associated with a mesh network node. The node may employ any or all of the node technologies as described herein. For example, the node may use speed control, silent acknowledgment, channel selections, or other technologies described in connection with FIGS. 1-37. Moreover, the device may be a light switch, a door lock, a window lock, a thermostat, a motion detector, or any other device described in connection with FIGS. 1-37. Also, the device may be a weight sensor, wherein the weight sensor is associated with a bed, a chair, a floor, or any other area where the inhabitant of the living space is likely to apply weight on.

The actuator may be activated upon an elapsed time duration during which there is no status change of the associated device. Referring to the example mentioned above, the actuator may be activated when the elderly person does not switch on a light when it is otherwise normally switched on after five in the evening. Once activated, the actuator may transmit data related to the status change of the device to a data facility. In an embodiment the actuator transmits the data through a mesh network. The transmission through the mesh network may employ any or all of the transmission technologies as described herein. For example, the transmission may involve mesh channel manipulation, silent acknowledgement, transmitting through a battery operated node, repairing a node in the network to effect the transmission, or other technologies described in connection with FIGS. 1-37. Moreover, the transmission could be local to the living space, external to the living space, or broadcast locally and external to the living space.

The data received by the data facility may be compared to a standard for the device or collection of devices. The device standard may be a national norm, a personal norm representing an individuals' average use of the device or some other 'normal' condition. In our example, normal routine of the elderly person may involve all the lights at the residence to be switched on after 5:00 p.m. every day. In this case, lights being switched on after 5:00 p.m. may be a personal norm for the light switches. Moreover, the comparison to the standard for the device may result in generation of a message for the user, where the user may be a person attempting to monitor the inhabitant, the inhabitant, or other person involved in the monitoring process. In the example mentioned above, a message may be generated for the user in case the light is not switched on after 5:00 p.m. Light switches being off after 5:00 p.m. does not match the personal norm and could imply an unusual activity that may require immediate attention. The message generated for the user may be in the form of an alarm, a phone call, a text message, an email, an instant message, a beeper message, or any other message to a user accessible interface.

In yet another embodiment, a monitoring system is provided to monitor an inhabitant of a living space. The living space may be a home, a nursing home, a hospital, a daycare, a school, a business office, or some other space. An actuator may be associated with an electrical, electronic, or a mechanical device within the living space, such as a light switch, a door lock, a window lock, a thermostat, a motion detector, or any other device described in connection with FIGS. 1-37 for example. The actuator may also be associated with a mesh network node. The node may employ any or all of the node technologies as described herein. For example, the node may use speed control, silent acknowledgment, channel selections, or other technologies described in connection with FIGS. 1-37. A method for monitoring the inhabitant of the living space may involve associating an actuator with a device within a living space; associating the actuator with a mesh network; activating the actuator upon a status change of the device; transmitting data from the actuator to a data facility, based at least in part on the activation of the actuator, wherein the transmission route is selected from a plurality of transmission routes based at least in part on a criterion; comparing the transmitted data to a device standard using the data facility; and generating a message based at least in part on the data comparison.

The actuator may be activated upon status change of the associated device. Once activated, the actuator may transmit data related to the status change of the device to a data facility. The actuator may transmit data through its associated mesh network, wherein the transmission route is selected from a plurality of transmission routes based at least in part on a criterion. For example, the selection of transmission route may be based on transmission speed, or any other criteria described in connection with FIGS. 1-37. Moreover, the transmission through the mesh network may employ any or all of the transmission technologies as described herein. For example, the transmission may involve mesh channel manipulation, silent acknowledgement, transmitting through a battery operated node, repairing a node in the network to effect the transmission, or other technologies described in connection with FIGS. 1-37.

The data received by the data facility may be compared to a standard for the device or collection of devices. Moreover, the comparison to the standard for the device may result in generation of a message for the user, where the user may be a person attempting to monitor the inhabitant, the inhabitant, or other person involved in the monitoring process. The message generated for the user may be in the form of an alarm, a phone call, a text message, an email, an instant message, a beeper message, or any other message to a user accessible interface.

In yet another embodiment, a monitoring system is provided to monitor an inhabitant of a living space. The living space may be a home, a nursing home, a hospital, a daycare, a school, a business office, or some other space. An actuator may be associated with an electrical, electronic, or a mechanical device within the living space, such as a light switch, a door lock, a window lock, a thermostat, a motion detector, or any other device described in connection with FIGS. 1-37. The actuator is also associated with a mesh network node. The node may employ any or all of the node technologies as described herein. For example, the node may use speed control, silent acknowledgment, channel selections, or other technologies described in connection with FIGS. 1-37. A method for monitoring the inhabitant of the living space may involve associating an actuator with a device within a living space; associating the actuator with a mesh network; activating the actuator upon an elapsed time duration during which there is no status change of the device; transmitting data from the actuator to a data facility, based at least in part on the activation of the actuator, wherein the transmission route is selected from a plurality of transmission routes based at least in part on a criterion; comparing the transmitted data to a device standard using the data facility; and generating a message based at least in part on the data comparison.

The actuator may be activated upon an elapsed time duration during which there is no status change of the associated device. Once activated, the actuator may transmit data related to the status change of the device to a data facility. The actuator may transmit data through its associated mesh network, wherein the transmission route is selected from a plurality of transmission routes based at least in part on a criterion. For example, the selection of transmission route may be based on transmission speed, or any other criteria described in connection with FIGS. 1-37. Moreover, the transmission through the mesh network may employ any or all of the transmission technologies as described herein. For example, the transmission may involve mesh channel manipulation, silent acknowledgement, transmitting through a battery operated node, repairing a node in the network to effect the transmission, or other technologies described in connection with FIGS. 1-37.

The data received by the data facility may be compared to a standard for the device or collection of devices. Moreover, the comparison to the standard for the device may result in generation of a message for the user, where the user may be a person attempting to monitor the inhabitant, the inhabitant, or other person involved in the monitoring process. The message generated for the user may be in the form of an alarm, a phone call, a text message, an email, an instant message, a beeper message, or any other message to a user accessible interface.

While many of the embodiments describe the tracking of a single or limited number of actuators and comparing their activity with a standard, it should be understood that these examples are provided to help in the understanding of the disclosure and are not intended to be limiting in anyway. For example, standards may be developed that are based on a number of actuator conditions or status. The accumulation of several or many such actuator conditions may be stored as a standard and the actual performance of the several or many actuators may be compared to the standard in a number of ways using a number of statistical techniques. One such statistical technique may involve making an inference based on a significant number of differences identified between the actual performance and the standard.

In embodiments, a one-to-many control system may be implemented that allows a controlling unit to control a multitude of units as well as a multitude of sub-units inside a multitude of units in a synchronous fashion. For example, a typical area of use for the system may be the control of light or window drapes in applications where it is desired that the units can react to commands with low latency in a synchronous fashion while maintaining protection against unwanted intrusion and replay attacks. In embodiments, by limiting the allowed number of units in the targeted subnet, it is possible to identify each unit as a bit in a bitmask or via a short address in a list of short addresses. The disclosure may allow a controlling unit to use bit-wise addressing of network units and/or sub-units within a network unit to send a control command to a multitude of units and/or sub-units. Encryption may be secured via a periodically updated token that protects against replay attacks, which may also be distributed via the bit-wise addressing method.

Figure 42:
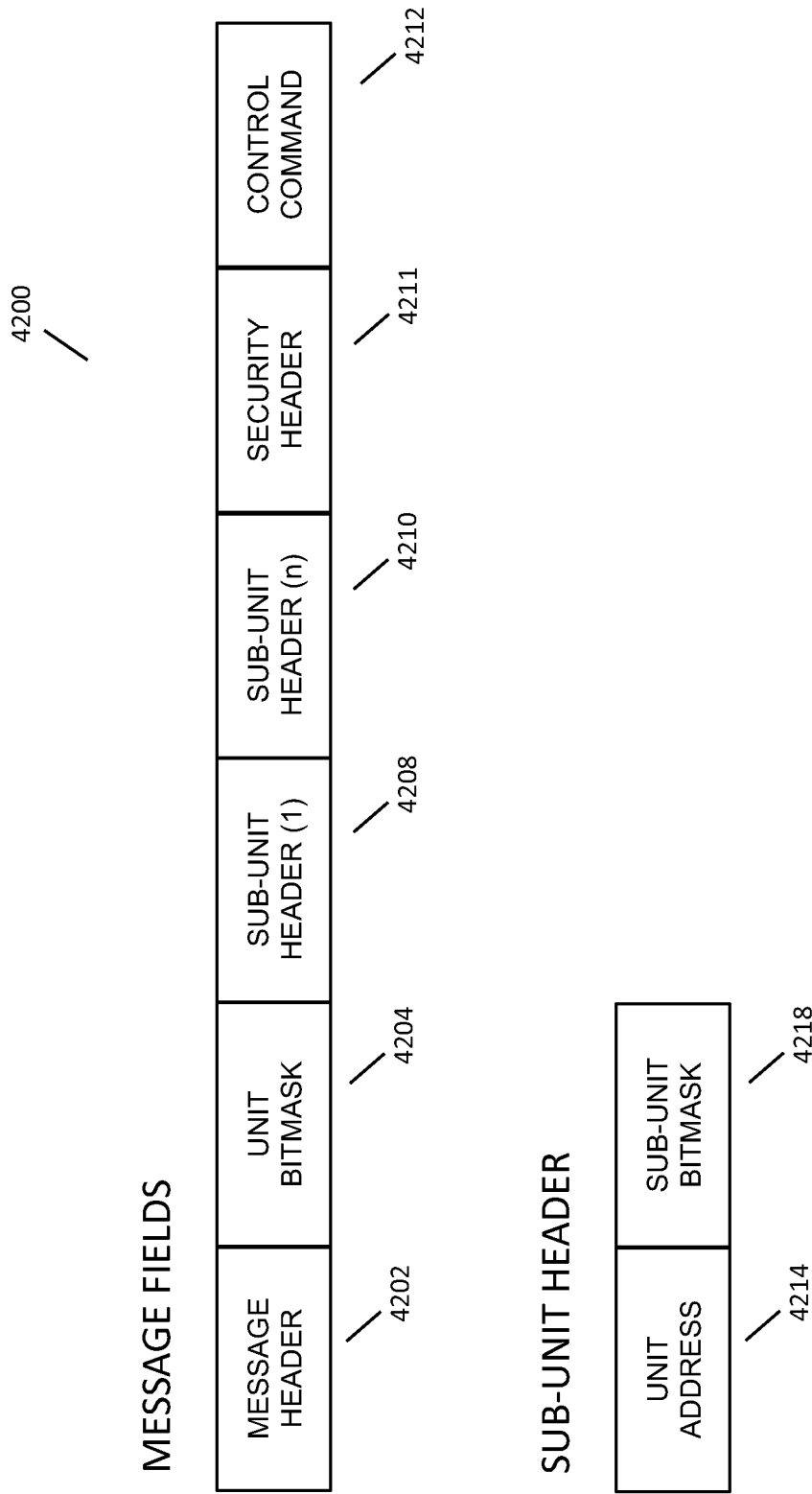
FIG. 42 illustrates a command format for delivering commands to a group of endpoints with low time latency.
Figure 43:
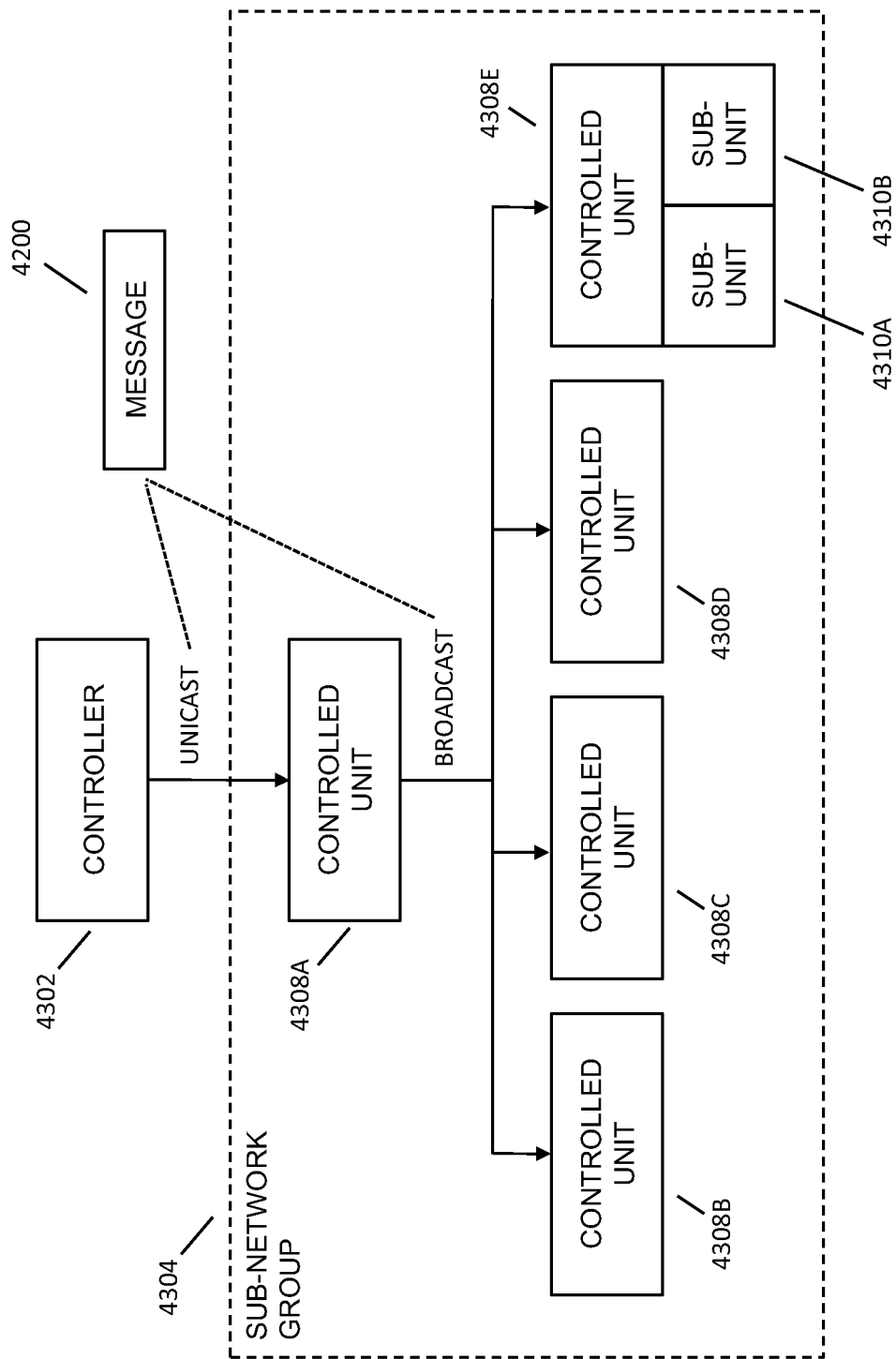
FIG. 43 depicts a block diagram relating to uniquely addressing a group of network units in a sub-network.

Referring to FIGS. 42 and 43, a controlling unit 4302 may transmit an encapsulated control message 4200 including a message header 4202, unit bitmask 4204, sub-unit header 4208, 4210, a control command 4212, and the like, where the sub-unit header 4208, 4210 may be further segmented into a unit address 4214, sub-unit bitmask 4218, and the like. In embodiments, the encapsulated control message may be transmitted via a unicast transmission to a unit being a member of the group described in the address fields 4204, 4208, 4210 using a plurality of units as repeaters. The receiving unit then re-transmits the encapsulated control command as a broadcast or multicast message to the plurality of units. All receiving units evaluate the unit bitmask fields to determine if the control command is to be executed.

Referring to FIG. 43, the message may be delivered in a layered approach, first unicasted from the control unit 4302 to a single controlling unit 4308A within a sub-network group 4304 of controlled units 4308A-E, and then broadcasted from the single unit 4308A to the rest of the group of units 4308B-E. In embodiments, the controlled units 4308A-E may be located logically in the same sub-network, the sub-network may have a maximum logical size which allows for bitmap-addressing of individual units, the control messages may be encrypted using a previously distributed security token to protect against replay attacks, and the like. In addition, sub-units 4310A-B included within a control unit 4308E may be bitmap-addressed through the sub-unit address 4214, 4218 of the message 4200.

An encapsulation message 4200 that contains a control message and a multitude of address fields may be used for explicitly identifying each controlled unit 4308A-E. A multitude of address field formats may be used, such as allowing a controlling unit to address any combination of destination units with reference to their sub-network address, a controlling unit to identify destination units via bitmap-addressing, supporting a unit address space sufficiently small so that all receiving hosts can be identified in one message, used in a single instance in a message header, allows a controlling unit to address any combination of destination sub-units within a unit, addresses individual sub-units via bitmap-addressing, supports a sub-unit address space of limited size so that all receiving sub-units can be identified in one message, used in a multitude of instances to manipulate sets of sub-units in different units in a synchronized fashion, and the like.

The entire list of individual controlled units 4308A-E may, following a one-to-many transmission, be walked though using acknowledged one-to-one communication to ensure that all receiving units 4308A-E receive updated information. However, the acknowledged one-to-one communications may be skipped in order to quickly distribute new state information to many destinations in a more time-expedient manner, where the one-to-one cycle may then be resumed subsequently.

Figure 44:
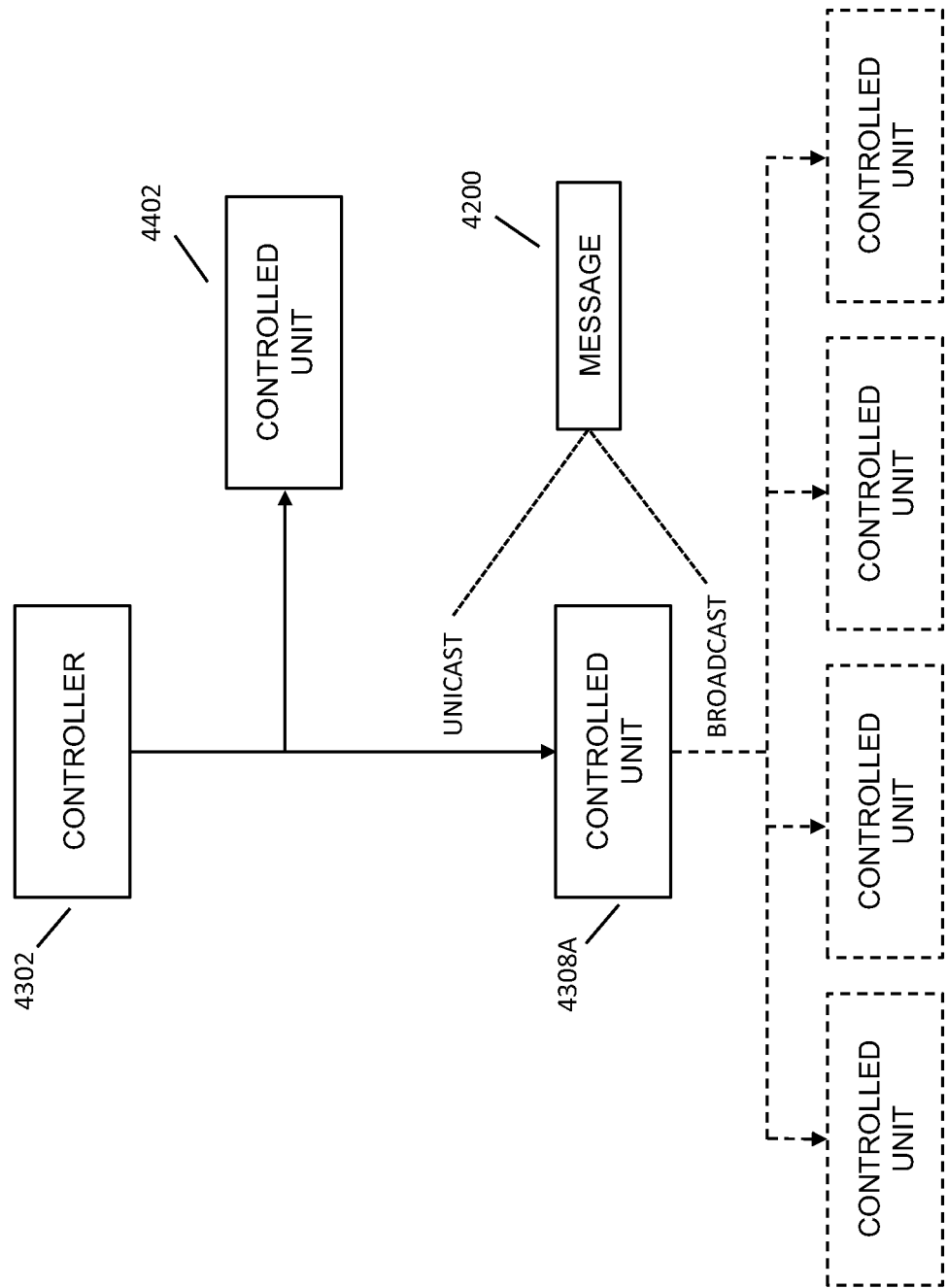
FIG. 44 depicts a block diagram relating to an intercepting device in uniquely addressing a group of network units in a sub-network.

In embodiments, and referring to FIG. 44, a controlled unit 4402 may intercept the message 4200 on its way through the network as a unicast message. In effect this means that any controlled unit along the route may react to an encapsulated message 4200, e.g. "Light On". Implementation of this may be through use of a special destination address, through 'deep packet inspection, and the like. Thus, a controlled unit 4402 may be able to read a routed unicasted encapsulated message 4200 on the way to the unicast route destination (e.g., a controlled unit 4308A). In this way there may be three ways a message may be received: (1) received by a controlled unit 4308A that is the target of a unicast message, (2) received by a controlled unit 4308B-E receiving the broadcasted message that follows from that targeted unicast message, and (3) received by a controlled unit 4402 that reads the message as the routed unicasted message passes by. In all three cases, the recipient may verify its membership via the address fields encapsulated in the message 4200.

In embodiments, security tokens may be utilized, and periodically updated to ensure freshness of the security token. The security token may be distributed (e.g. unacknowledged) using the security header 4211, and the transmission methods described herein. The security token may time out and be invalidated if the unacknowledged token update method fails. A destination node may receive a new valid security token from the controlling unit via the acknowledged one-to-one communication.

In embodiments, the encapsulation message 4200 may be forwarded by a multitude of units acting as repeaters, where the forwarded encapsulation message 4200 is broadcasted or multi-casted by the receiving unit in the sub-network. The forwarded encapsulation message 4200 may be broadcasted in the sub-network using a special preamble pattern to ensure that all intended battery operated units are awake and able to respond to commands in a synchronous fashion. All units receiving the broadcasted encapsulation message 4200 may evaluate the address fields of the broadcasted message. If a unit or sub-unit is represented in one of the address fields, the control command may then be executed.

In an example, the message 4200 may carry a 256-bit bitmask to identify all receiving nodes within a/120 IPv6 subnet (i.e., 8 bit host address), a reduced version may be crafted to carry a set number of bits (e.g. 232 bits), and the like. The message may carry a number of structures combining a host address (node ID) and an endpoint bitmask identifying a number of endpoints (e.g. endpoints 4, 7 and 8). The message 4200 may carry a security nonce update in the security header to provide low-latency and secure delivery of messages. Optionally unicasted follow-up transmission of the control command may ensure that all destinations get the intended state, which may also provide a fallback option for re-synchronizing the security token in nodes that did not receive the periodic nonce update. In embodiments, formats other than bitmaps may be used, such as providing for a list of short addresses (e.g. 1 byte) supported, combinations of short addresses and bitmaps, and the like.

The present disclosure concerns encapsulation of messages, queueing of message for better network traffic flow, and methods for mapping of individual nodes that connect to a local area network through a home area network of which the individual nodes are members.

When messages are sent from one user to another, the sending and receiving are transparent, in general, to both the sender and receiver. This is little different from analogous situations, such as physical courier or postal delivery, in which the path and the method used is typically not observed by either the sender or the receiver, until the message or package is received. In physical delivery, the message or the object is packaged on the sending end with an envelope or a wrapper by the sender, which the recipient then removes at the receiving end. In data or message transmission, the situation is different, since a new wrapper or package is added to the original application at a number of stages in the transmission. A number of encapsulation layers may thus be added as a message or data packet proceeds from sender to the intended recipient. As shown above in FIGS. 42-44, for instance, a message may have an address header, or more than one header, as it proceeds through transmission.

Typically, when a message is sent, it passes through a number of layers and may require encapsulation as it proceeds. For example, in one situation, a message may include data and at least one header with its destination, as shown in FIG. 42. The encapsulation for message 4200 has been deduced directly from the message header and from the way the message was received, as shown in FIG. 43, where the message 4200 is sent from the controller 4302 to a controlled unit 4308A. In this instance, the degree of encapsulation is minimal.

Figure 45:
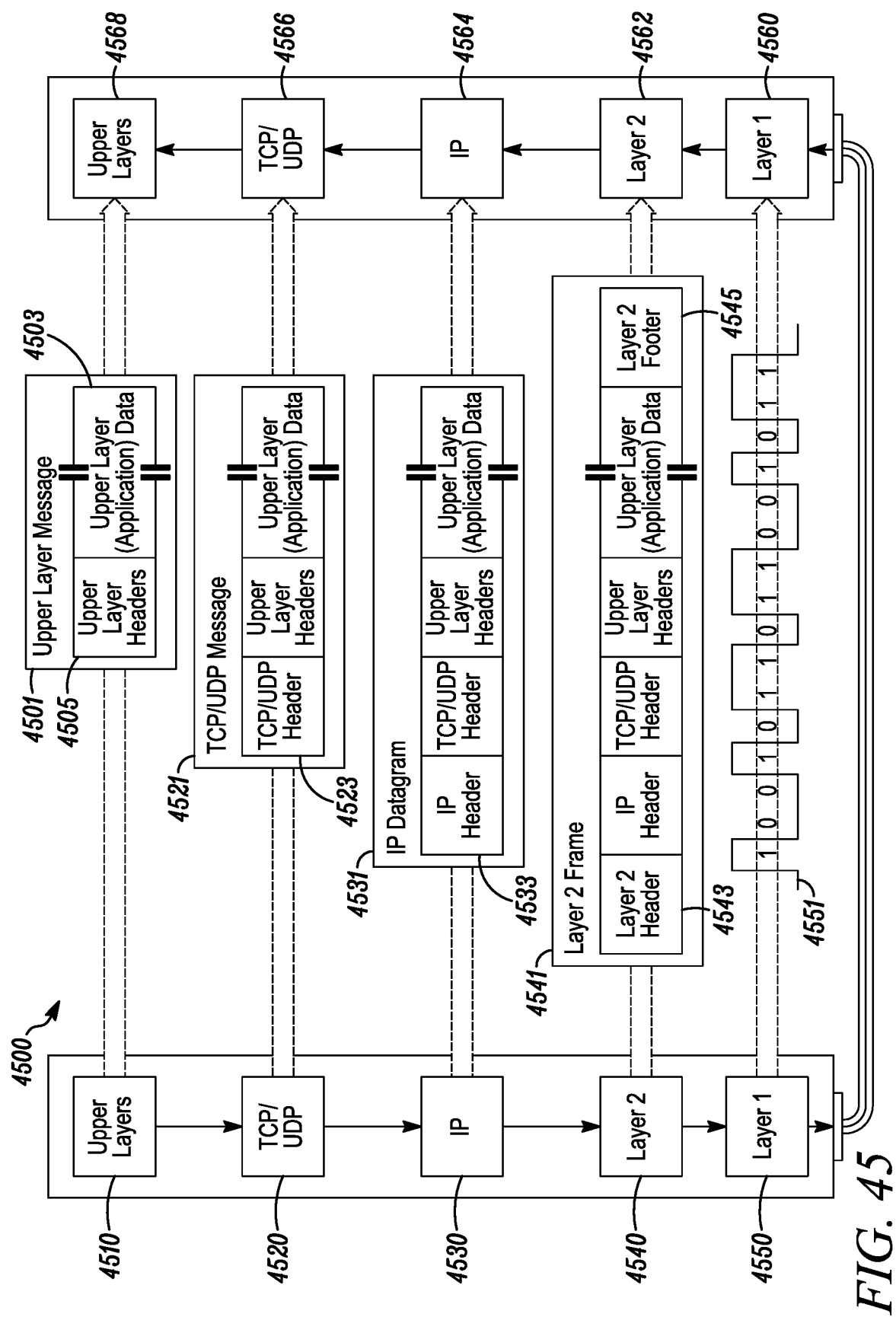
FIG. 45 depicts an encapsulation diagram for a packet or a message as it traverses from a sender to a receiver.

Other situations may be more complicated, as shown in FIG. 45, which depicts a possible sequence for a message sent via a TCP/IP protocol. A similar diagram can be made using a 7-layer OSI sequence, in which each layer requires separate encapsulation. Encapsulation sequence 4500 depicts how each succeeding layer adds encapsulation to the basic upper layer message 4501, which includes an upper layer application data, such as a message or data 4503 and one or more headers 4505, as shown in FIG. 42. When the message moves from the application or basic layer to the transmission control protocol/user diagram protocol (TCP/UDP) message layer 4520, a header 4523 is added to make a larger message 4521, a TCP/UDP message, and better ensure its transmission and reception. This may correspond to the transport layer in the OSI protocol.

The message then goes to the Internet layer or IP stage 4530 as an IP datagram 4531, which includes the previous TCP/UDP message 4521, along with a new header IP header 4533, to form the IP datagram. This corresponds to the Network layer in the OSI system. The message then goes to the network access layer or Layer 2 4540 as a Layer 2 frame 4541. Layer 2 frame includes all the elements of IP datagram 4531 and a Layer 2 header 4543, and may also include a Layer 2 footer 4545. This layer corresponds to the data link or physical layer in the OSI protocol. At this point, the Layer 2 frame 4541 is converted to a layer 1 message 4550 in binary code.

Each layer is encapsulated so that upon transmission across the Internet, the message can be routed correctly upon reception at the corresponding destination layers 4560-4568, as the message is routed from the layer 1 4560 to layer 2 4562, the IP layer 4564, the TCP/UDP layer 4566, and then to its destination 4568. Encapsulation is now removed at each stage so that the message appears with the appropriate headers in each stage for correct routing to its destination. The addition of encapsulation is typically done automatically at each stage based on the previous headers and based on how the message was received. Thus, on the left side of FIG. 45, the messages are received from a lower level with a header indicating an address that requires transmission to a higher level. This indicates that further encapsulation is needed and the message is then further encapsulated as the message proceeds from one stage to the next. On the right side of the FIG. 45, the messages are received from higher levels and have a header with an address requiring transmission to a lower level. Thus, encapsulation is to be removed at each stage and the message forwarded according to the header on the next layer underneath. Thus, encapsulation or de-encapsulation proceeds or is deduced from the message or packet headers and how the message was received.

It is also possible to use additional information from the packet to determine encapsulation. For example, items of information from a header of the packet concerning a destination of the packet may be gathered. Besides the packet header or destination information, each packet or message may have a number of attributes that can be used to determine appropriate encapsulation, especially for forwarding the message or packet. These attributes include the size of the packet, e.g., packet size, and also include whether the packet was received through a secure means, a checksum of the message or packet, and sender and receiver endpoints. This may be a virtual representation of multiple instances or services on the same physical device. In this manner, additional items of information concerning the packet may be gathered, e.g., from an additional part of the packet. The additional items of information may include without limitation a packet size, a degree of security of the packet, a degree of encapsulation security of the packet, a checksum strength of the packet, and so forth.

Additional information may also include knowledge about the sender and receiver of the message. A gateway of a home area network (HAN) discussed above and also discussed below herein, is privy to a great deal of information about all parties or nodes in its home area network, or in its local area network (LAN). For example, if the sender or receiver is unknown upon receiving information from a sender or a receiver, the gateway will probe the sender or receiver using probing mechanisms appropriate for the network on which it was received. For example, a low level query may be used to establish basic information about the receiver. Based on the initial query, a number of possible encapsulations may be found. These encapsulations are then queried to determine appropriate parameters for the encapsulation. In addition, information about the receiver may be used to gather a list of available encapsulations or encapsulation methods, where such encapsulations or encapsulation methods may be selected for encapsulating the packet. Of course, some encapsulation is almost always applied, with some messages or packets requiring minimal additional encapsulation because they may be known to be close by. In other cases, the amount of encapsulation may depend on the network or gateway's knowledge of the packet, or the sender or the receiver.

Examples of these encapsulations include a security encapsulation, a fragmentation encapsulation, a segmentation and reassembly encapsulation, a checksum encapsulation, and encapsulation for multiple endpoints (i.e., multi-endpoint encapsulation). For example, if a packet is received using a form of secure encapsulation on a network, the packet should always be further encapsulated with a secure encapsulation appropriate for the forwarding network. Of course, if the medium on which the packet was received explicitly states that the packet may be forwarded without additional security, then such security encapsulation is not needed. In this case, the packet or message may be forwarded using an appropriate security encapsulation for the forwarding network, if available. If not, the packet or message may then be forwarded without a security encapsulation. Thus, the degree of security of the packet may be pertinent to encapsulation.

Fragmentation encapsulation refers to packets with a packet size too large for the forwarding network, e.g., the size of the packet may exceed a permitted size for the network. In this case, the packet may be fragmented into smaller parts suitable for the forwarding network (e.g., the packet may be fragmented into two or more packets of the permitted size or smaller) and they may be encapsulated into an appropriate fragmentation encapsulation that will allow the receiver to reassemble it. If an appropriate fragmentation encapsulation is not available, then the packet may not be forwarded. The sender may then seek an alternate network or route that can accommodate the message. On the other end, when a fragmented packet is received, the gateway will reassemble all the parts or fragments to create a complete packet. If necessary, the gateway or other forwarding node or station may re-encapsulate the packet or message using a fragmentation fit for the forwarding network.

In other situations, a packet using a checksum strength greater than that of the forwarding network should re-encapsulate the packet using a similarly strong checksum mechanism. In other situations, a packet or message may be routed to multiple endpoints, e.g., a multicast message. The different networks to which the packets are addressed may have different services or endpoints on the same physical device. The gateway may reencapsulate the packet to an endpoint format suitable for the forwarding network. The endpoint formats may be the same for one or more endpoints, or the endpoint formats may be different for one or more endpoints. For example, in an implementation, the packet is encapsulated with a first endpoint format suitable for a first endpoint, a second endpoint format suitable for a second endpoint, and so on. Where other technologies may also add encapsulation, this is done statically based either on the application layer, or based on static knowledge, such as Wi-Fi adding WPA (Wi-Fi protected address), WPA2, and the like. In general, this disclosure determines the encapsulation based on information about the sender, the packet, the receiver, and the like. For instance, the encapsulation may be chosen based on the sender, the packet, and the receiver; alternatively, the encapsulation may be chosen using one or two parameters. Receiving a secure packet may require the gateway to forward it securely. In embodiments, receiving a secure packet may require the gateway to forward it securely only if the receiving node supports the appropriate security level. For example, adding an additional checksum may be decided based on how the packet was received and if the receiving node supports checksum encapsulation. An exception to this rule may be that the segmentation and reassembly mechanism will always segment packets into multiple frames if the packet size is bigger than the capability of the receiving network.

Figure 46:
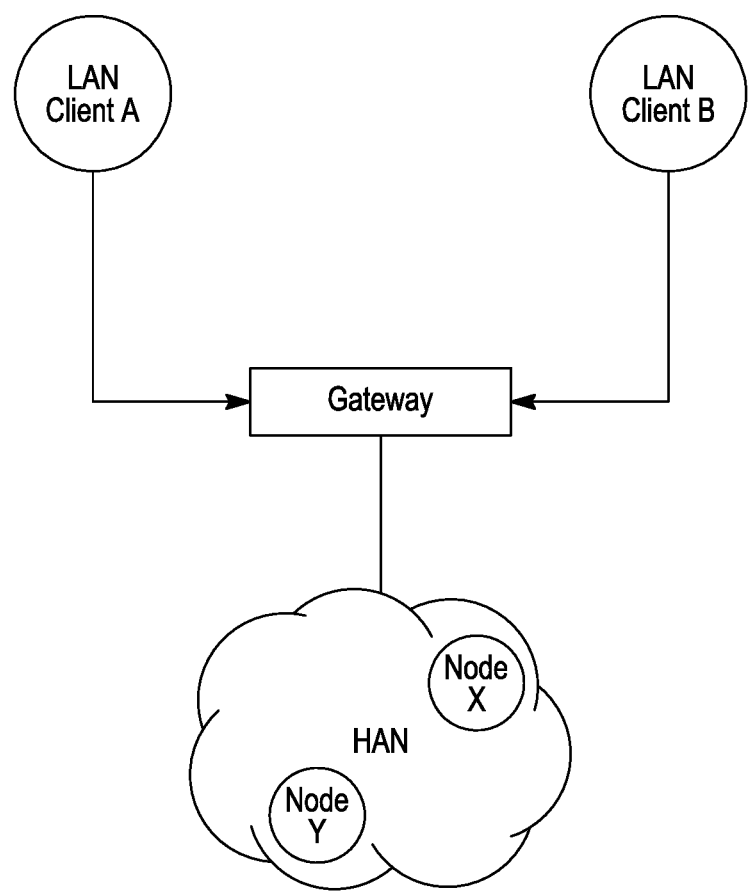
FIG. 46 depicts a gateway between users of a local area network and nodes in a home area network.

In one embodiment of networks, a user may wish to improve transmission speed of a gateway to a network with which the user wishes to connect. This disclosure may describe improvements to the perceived response time, the actual response time, or both. The actual response time is improved by letting faster message overtake slower messages. The perceived response time is improved by providing early delay notifications to clients of a local area network (LAN) concerning the expected latency or delay. The situation is explained with reference to FIG. 46, which depicts a system 4600 with LAN client A 4602 and LAN client B 4604 communicating with their respective home Node X 4606 and Node Y 4608 via a home area network (HAN) 4610 through a gateway 4612. Within the HAN 4610, Node X 4606 and Node Y 4608 may communicate without going through the gateway 4612. Thus, the implementation of FIG. 46 depicts nodes connected in a HAN 4610. Also, in the configuration shown, the gateway 4612 provides access to the nodes in the HAN 4610 and connects the HAN 4610 to at least one outside local area network (LAN), e.g., LAN client A 4602 and LAN client B 4604. In an implementation, the HAN 4610 and the LANs operate on Internet Protocol (IP) addresses. In another implementation, the gateway 4612 is adapted for allowing clients in the LANs to identify each of the nodes in the HAN 4610. Additionally, the nodes may appear to clients of the outside LAN as separately addressable nodes.

Of course, in an actual situation, the gateway might accommodate many more than two users, leading to a situation in which many users or clients attempt to connect to many nodes, such as nodes X, Y, through one home area network, or through more than one area network. The gateway may become a bottleneck, i.e., an impediment to quick transmissions for any number of reasons. The home area network may have a more limited bandwidth than one or more local area networks (LANs). The gateway, in this example, can only communicate with one home area network (HAN) node at a time. In addition, the response time of the HAN nodes, such as Node X and Node Y, may have longer response times. For example, the response time of a HAN node, in some embodiments, can range from 10-20 milliseconds to 10-20 seconds. The situation in the home area network may be similar to the situation discussed above with respect to FIGS. 35-36, in which some nodes shut down to conserve power, periodically awakening to check for messages or for a need to power up. This situation alone may lead to delays and bottlenecks in the gateway.

Figure 47:
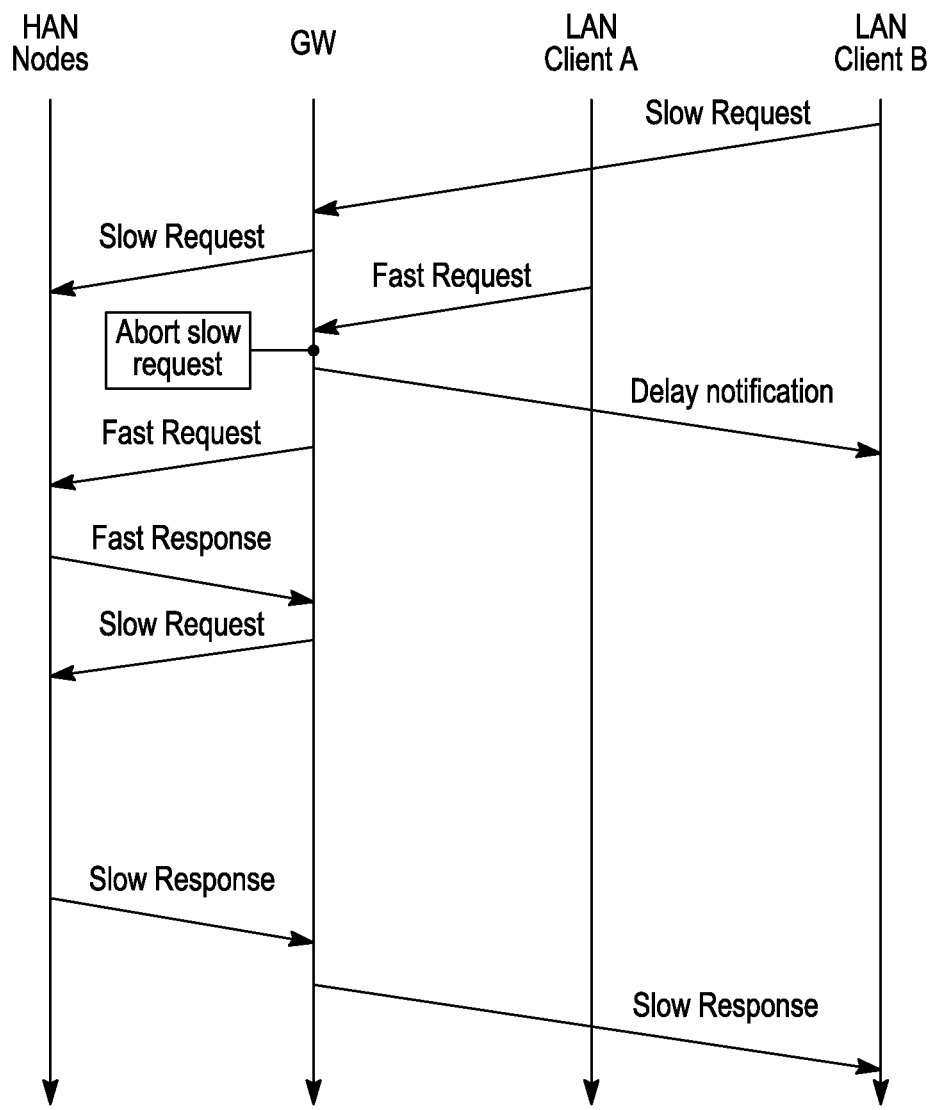
FIG. 47 depicts a timing diagram of a fast request overtaking a slower message.

The gateway, which may be a controller of the home area network, is aware of the periods and timing of the nodes in the home area network. If messages are sent from one or more clients external to the gateway and the home area network, the gateway is in a position to know which Node(s) in the gateway will be quicker or slower to respond because the gateway may control the awake and asleep periods or states of the various nodes. Thus, the gateway may be said to have a priori knowledge of the home area network and its nodes, and is in a position to predict the timing of delivery of messages to the nodes in the home area network (HAN). In this manner, the system (or a component thereof, e.g., the gateway) may predict whether a message to a node in the HAN from a client in an outside LAN will be a fast delivery message or a slow delivery message, where such a prediction may be based on prior knowledge of the HAN, the nodes, and the message. The prediction may also or instead be based on whether the node in the HAN spends time in an asleep state. FIG. 47 illustrates a timing diagram for messages from LAN clients A, B to one of the HAN nodes through the gateway GW.

In this situation depicted, LAN client B sends a slow request to a HAN node. In this instance, the gateway may realize that the request is slow because the recipient HAN node, perhaps node Y, has short awake periods, as shown in FIG. 35. Thus, gateway GW may be said to have a priori knowledge of the timing of a request, slow, from LAN client B to node Y. In an implementation, the slow delivery message may only be delivered to the node in the HAN when there are no fast delivery messages awaiting delivery. The gateway may predict a fast delivery or a slow delivery based on at least one node operating characteristic. It is also possible to categorize the message as "slow" or "fast" based on another criterion, such as the size of the message or the number of hops (i.e., repeaters) that a message will traverse on its way to the gateway. This criteria may be judged by the gateway.

Using these criteria, it is possible to set up rules for judging or determining a speed or "slowness" of a message. For example, if the destination node is a "sleeping node," the message stands a much greater chance of being slow than an "awake" node. A list of destinations with recent slow deliveries can be made and used for comparison. The list may be updated periodically, e.g., every hour or day, or for shorter periods of time. If the number of hops is greater than a set limit, that limit may be used to distinguish fast requests or message from slow ones. If the message is above a set size limit, that may also be used to distinguish. If a message has none of these criteria, the message may be a "fast" message or request. A set time period may be used to distinguish fast from slow, e.g. 500 ms between a beginning of a transmission and a delivery acknowledgement. The time period may be changed or adjusted by the user's experience with the system. Additionally, the criteria judged by the gateway may be adjusted based on actual delivery times versus expected delivery times of messages to the nodes of the HAN.

At about the same time, LAN client A also sends a message, through the gateway, to HAN node X. Node X may be a non-sleeping mode or its awake periods 3508 may be longer than those of Node Y, as shown in FIG. 35. In this instance, the fast request arrives at the gateway after transmission of the slow request has started. Gateway GW is aware that both a fast message and a slower message have begun. In some situations, the slow request may not have been recognized or predicted as a slow request when transmitted from LAN client B. If the actual time taken to deliver the "slow request" message exceeds a threshold, such as the time to deliver a "fast message," the message may be recategorized and then aborted. This may be termed a "time out" situation.

The gateway can only process one message at a time, and the preference is to minimize the total of all delay times, i.e., to pass through the "fast requests" first. Thus, in FIG. 46, the slow request is not routed through the gateway GW, but is aborted. As shown in FIG. 47 a delay notification or pending acknowledgment is sent from the gateway to LAN client B, telling the client that there be a delay of some period of time. The delay notification or pending acknowledgment may include an expected waiting time. Thus, even though B's message has been delayed, it is not as bad as may be imagined, at least because the user has been told there will be a delay or a possibility of a delay. While this may not be especially welcome news, the user has at least received feedback and is kept in the know as the process continues. This may help to reduce perceived delay, in the sense that the user is aware that the message is en route, rather than experiencing some unknown delay. The message need not be permanently aborted. For example, the delay notification may inform LAN client B, "your message has been delayed. Please confirm you wish your message to be forwarded to its destination as soon as possible." When the user confirms the wish to forward the message, the gateway will forward the "slow message" to its destination as soon as possible, under its rules for forwarding messages and minimizing delays.

The fast request, in the meantime, is transmitted from the gateway to the desired node in the home area network, perhaps Node X or Node Y. An automatic or other response may then be generated from the Node to the gateway, and thence to its desired destination, which may be LAN client A, or to another Node in the local area network. Alternatively, the response may be routed to another non-local destination per the client's desire and per the set-up of the network.

Figure 48:
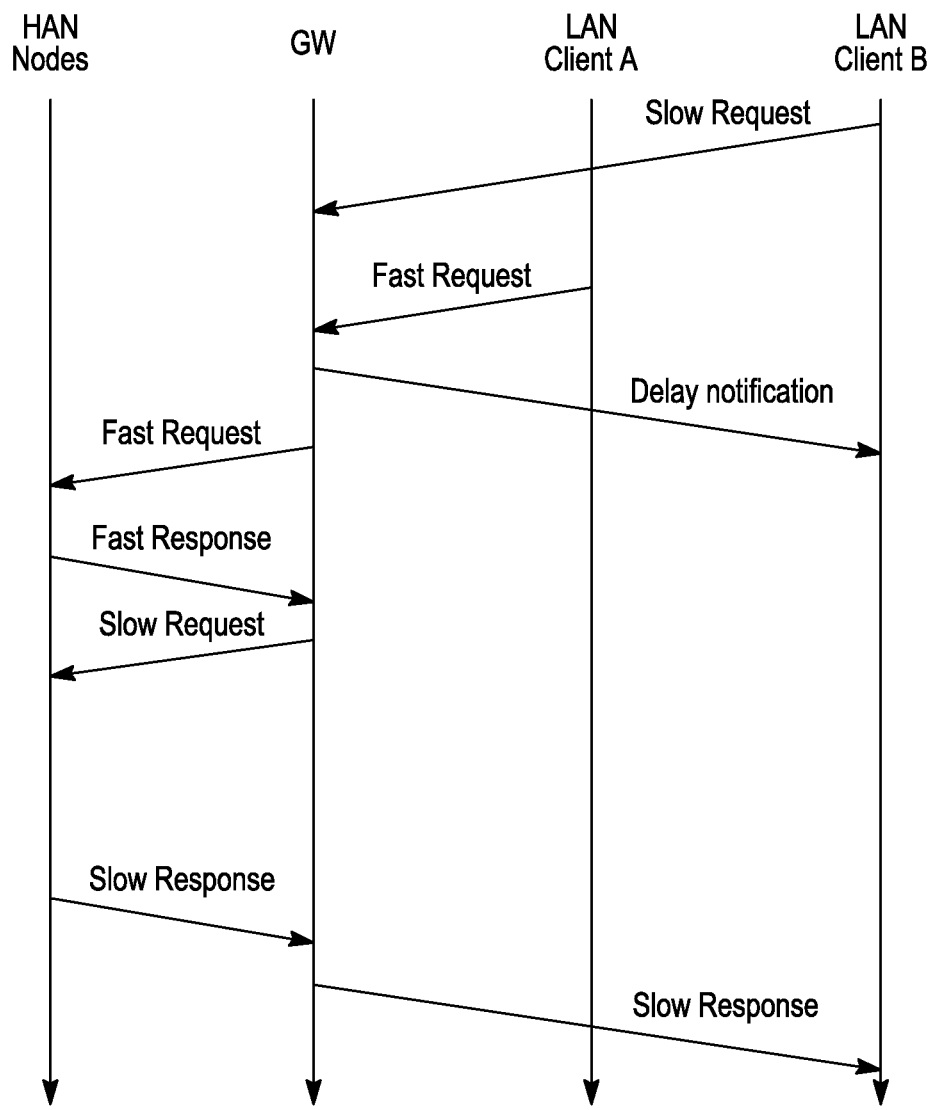
FIG. 48 depicts a timing diagram of a fast message overtaking a slower message and the system sending a delay notification.

The situation involving a "time out" is depicted in FIG. 48. In this situation, the request from LAN client B is initially classed as a slow request and a slow request time out clock is started. In this situation, a fast request from LAN client A arrives during the time out clock or period. The fast request is forwarded without delay by the gateway while the gateway delays the slow request and sends a message to LAN client B about the delay. The slow request is not aborted. In the meantime, the fast request proceeds to the destination HAN node, which also generates a fast response. The slow message is later forwarded by the gateway to the desired HAN node, which may generate "slow" response, which is forwarded to LAN client B. There need be nothing "slow" about this response, it may be at any speed of which the node, the home area network, the gateway and the LAN clients are capable. It is labeled a "slow response" because it is the response to the "slow request." The system may include tracking groups of HAN nodes. For example, the system may include tracking a first group of one or more HAN nodes having a higher delivery delay than a second group of one more HAN nodes. By way of further example, the system may predict that a message sent to a node of the first group is a slow-delivery message and that a message sent to a node of the second group is a fast delivery message, where the fast delivery message is delivered before the slow delivery message. The slow delivery message may instead be aborted when a fast delivery message is presented to the gateway from an outside LAN.

The above discussion concerns one or more local area networks (LANs) connecting to a home area network, and how to resolve speed-of-delivery issues. Another issue in home area network/local area network connectivity is how to map nodes or devices in a home area network to IP addresses in a LAN, such as a home-premises LAN, or other LANs. In home networks, a gateway may be very helpful in connecting to (outside) local area networks. These may be a wired connection, such as an Ethernet connection, or a wireless connection, such as a Wi-Fi hot spot or other wireless connection. These connections may be to an outside network that uses the same or a different physical medium.

One way to solve addressing issues is to place an additional router on the network. For example, IPv6 describes a low-power Wireless Personal Area Network (LOWPAN) procedure for how to implement a routing protocol. In this situation, the home area network has a gateway and the gateway will act as an IPv6 router. This may introduce at least two problems, because very few homes at present, in the U.S. or elsewhere, use an IPv6 network for their LAN, instead most use IPv4. If an additional router is added, then the other routers on the network may require updates for the new router and updates for routes to all routers, at least to the internet service provider (ISP). Since there is generally no common way to add a new router to a home area network, this may require attention from a networking professional.

Figure 49:
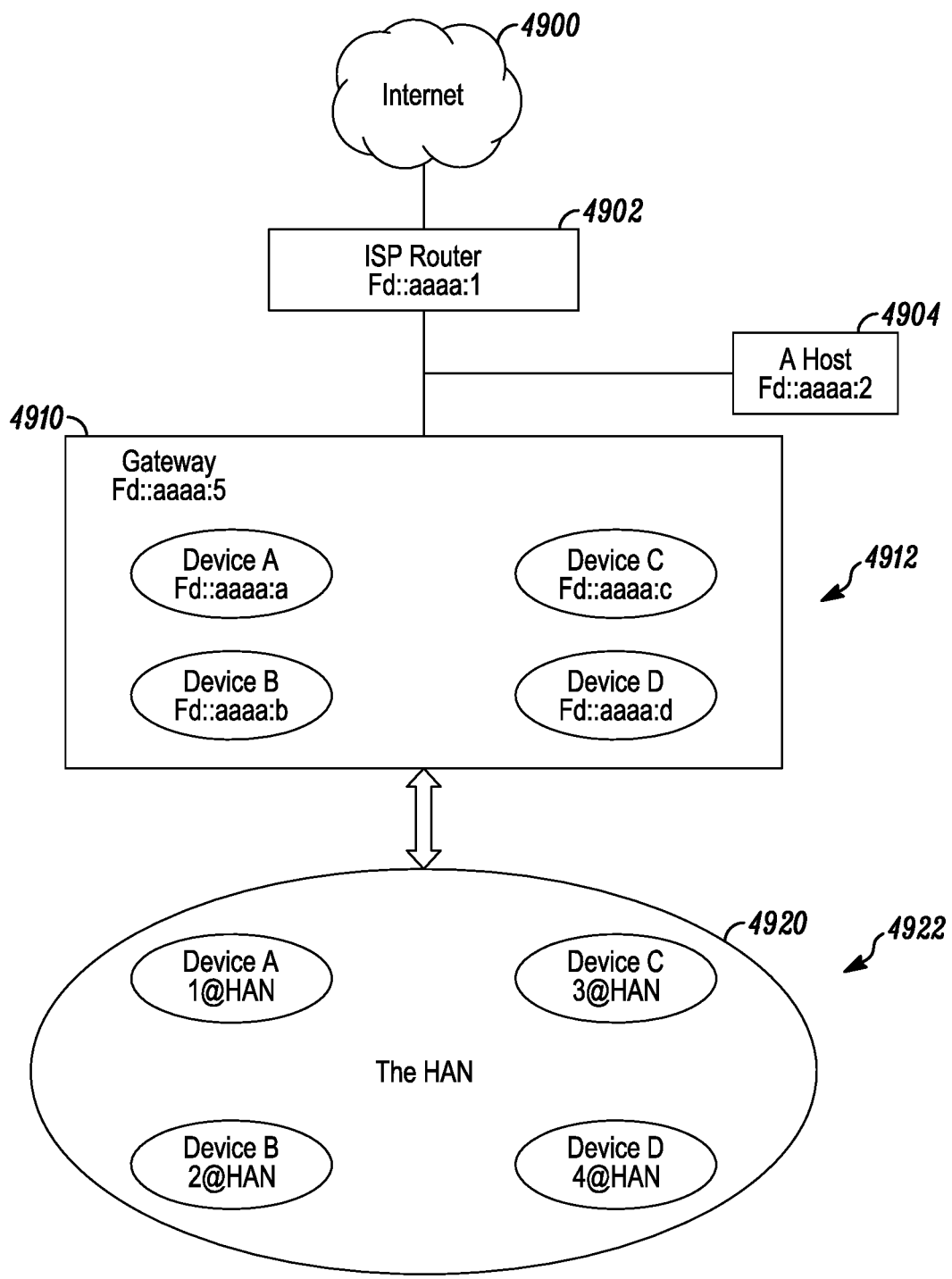
FIG. 49 depicts a home area network with a gateway connected to the internet in which each device in the home area network is depicted by the gateway as having a separate address and in which each device is separately addressable from outside its local network.

A better way may be to use the gateway to present the devices on the home area network as host devices. In this way, each device becomes a part of the same layer-2 broadcasting domain as the home area network gateway and the ISP router. In one aspect, the gateway will represent each of the devices has having a distinct IP address, such as an IPv4 or an IPv6 address. In this manner, devices in a LAN having addresses that are not addressable outside the LAN may be connected through the gateway. The situation is depicted in FIG. 49. The Internet 4900 connects to a home area network 4920 via an ISP router 4902 and a gateway 4910. The gateway 4910 also connects to other devices 4904, such as a personal computer (not shown) or as desired. The gateway is configured with Internet-addressable addresses 4912 for itself and for each device in the home area network. These addresses are in the form of Fd:aaaa:5 for itself and Fd::aaaa:a though Fd:aaaa:d for the nodes in the home network 4920. The gateway may have separate "local" addresses 4922 for each device in the home area network, e.g., Device A through Device D, with separate addresses, 1@HAN though 4@HAN, for the devices. Using duplicate "host" addresses, the devices in the home area network are now separately addressable from outside the gateway. In this manner, host addresses may be provided in the gateway for each device, where each device is separately addressable from outside the LAN by the host address.

In embodiments, the addresses of the messages or requests may be stateless, e.g., implemented with UDP or for the Internet layer, using ICMP translation or IP addresses, such as IPv4 or IPv6. In other embodiments, the addresses may implement the TCP protocol, requiring a "state" on each element. All these are within the scope of the present disclosure.

For the IPv4 situation, standard IPv4 protocols are followed. For example, the gateway will answer address resolution protocol (ARP) requests on behalf of all its connected devices using the IPv4 address obtained by a dynamic host configuration protocol (DHCP) request on behalf of the devices. In this manner, the host address may be provided by the DHCP request by the gateway. Additionally, the gateway may thus respond to a request for ARP for one of the devices in the local area network. The target link-layer address of the ARP reply may be the MAC (media access control) address of the gateway. Thus, the gateway may provide a MAC address as a source of each message sent on behalf of each device in the local area network. Upon reception of an IPv4 frame destined for a "connected device" the gateway will forward part of or the entire IP datagram. Upon transmission of a frame, the gateway forwards the message using its MAC address as a source Layer 2 address but using the address of the connected device as Layer 3 address just as it was acting as a standard IPv4 router.

In embodiments, a connected device gateway with Internet connectivity will represent each of the devices as having a distinct IPv4 or IPv6 address in the same subnet/prefix as the gateway itself. If IPv6 is used, for the most part, standard IPv6 protocols are followed. The gateway will choose IP addresses for all its devices according to the standard IPv6 auto addressing scheme. The gateway will use a combination of its MAC address and the device id to form a pseudo-random address. The gateway will perform duplicate address detection on behalf of all addresses, using its own MAC address as source. The gateway will answer to IPv6 neighbor solicitations on behalf of all devices, setting its own MAC address as target link-layer address. When a user of a personal computer with an IPv6 address wishes to communicate with another device, also having an IPv6 address "A", the personal computer sends a neighbor solicitation for "A" on a MAC broadcasting address. The device holding IPv6 address "A" will reply to the message using a neighbor advertisement, in effect telling the sender that recipient is at a particular MAC address corresponding to the IPv6 address. The sender can then map the "A" IPv6-type address to the MAC address that is supplied, and can use the MAC address for future communications of all types. Neighbor solicitation is necessary because only MAC addresses can be used when sending packets from A to B in a switched network, but in this case the sending of the neighbor solicitation may be on behalf of multiple physical devices that are connected through another pathway.

Upon reception of an IPv6 frame destined for a "connected device," the gateway will forward part of or the entire IP datagram. Upon transmission of a frame, the gateway will forward the message using its MAC address as source Layer 2 address but use the address of the connected device as Layer 3 address, just as it was acting as a standard IPv6 router.

In the more common situation, a request (and a response) may use the IPv4 protocol. The gateway will choose a MAC (media access control) address for each of its connected devices. The MAC address chosen has the local administered bit set. The gateway may send dynamic host configuration protocol (DHCP) requests to discover, request and renew messages on behalf of all its connected devices. This protocol is a standardized network protocol used to distribute network configuration parameters, such as IP addresses for interfaces, gateways and services. The source MAC address of the messages is the MAC address of the gateway, but the client hardware address (chaddr) and the client identifier is set to the connected device MAC address. The acquired IP address is assigned to the connected devices. The source address for a message sent from one of the devices in the local area network may also or instead be assigned as an address of the gateway. Also, a message from one of the devices in the local area network may be sent using the host address of the gateway as a source address and using the host address of the one of the devices as the address of the connected device. The client hardware address and client identifier may also or instead be assigned as an address of one of the devices in the local area network. In an embodiment, the local area network is a home area network.

While IPv4 is at present the dominant protocol, it may be overtaken in the future by IPv6. IPv4 uses a 32-bit address space, with about 2 billion possible IPv4 addresses. IPv6 uses a 128-bit address space, with about many, many billion possible IPv6 addresses, more than the 10 billion people expected soon on the planet and more than the 281,474 billion MAC addresses possible with a 48-bit address space per the original IEEE 802 specification. An additional attraction for IPv6 is the possibility of a neighbor solicitation. A "neighbor" solicitation, part of standard IPv6, is a translation between an IPv6 address, an assigned or programmed address and a MAC address, which is a permanent, unchangeable address usually made a part of a particular piece of hardware, such as a network controller and stored in the MAC protocol layer of the OSI reference model. Another example is the address of a home internet router, which may be connected to one or more Ethernet plugs as well as a Wi-Fi module.

In embodiments, a method and system my provide for delivering a command to a group of computing devices, comprising sending a message from a controller to a first of a plurality of computing devices, wherein the plurality of computing devices are on the same network, and where the message includes a plurality of bit-wise addresses and a command; broadcasting the message from the first of the plurality of computing devices to the remaining of the plurality of computing devices; reading the plurality of bit-wise addresses by each of the plurality of computing devices to determine if one of the plurality of bit-wise addresses matches a predetermined bit-wise address of the each of the plurality of computer devices; and executing the command in each of the plurality of computer devices where the bit-wise address matches the predetermined bit-wise address, wherein the execution of the command amongst the executing each of the plurality of computer devices is made with low time-latency due to the near-simultaneous delivery of the message to the plurality of computing devices.

In embodiments, the bit-wise address may be a bit-mask with each bit representing one of the plurality of computing devices. The message sent from the controller to the first of the plurality of computer devices may be sent as a unicast message. A message intercepting computer device may intercept the message being sent from the controller to the first of the plurality of computing devices, the message intercepting computer reading the plurality of bit-wise addresses for a match to a predetermined bit-wise address for the message intercepting computer device, and the message intercepting computer device executing the command if a match is found, wherein the execution of the command by the message intercepting computer device and amongst each of the plurality of computer devices finding a match is made with low time-latency due to the near-simultaneous delivery of the message to the message intercepting computer device and the plurality of computing devices. At least two of the plurality of computing devices may execute the command, where the at least two of the plurality of computing devices are an actionable device. For example, the actionable device may be a lighting device, and the controller may be a lighting controller. The at least two of the plurality of computing devices may be reconfigurable by the controller through selected grouping of the at least two of the plurality of computing devices for execution.

In embodiments, a method and system may provide a networked controlling unit and a plurality of networked controlled units controlled by said controlling unit, the controlling unit sending control messages to the controlled units, where (a) the controlled units are located logically in a single sub-network, (b) the sub-network has a maximum logical size which allows for bitmap-addressing of the controlled units, (c) the encapsulation messages are encrypted using a previously distributed security token, and the like, and where a control command is executed by at least two of the plurality of controlled units, where the control command is embedded in the encapsulation message, and at least two controlled units are identified in a bitmap-address embedded in the encapsulation message. In embodiments, the delivery of the control command to the two controlled units may provide a low time latency between the execution of the control command in the two controlled units. For instance, the security token may protect against replay attacks. The control message may be provided in an encapsulation message which contains a plurality of address fields used for explicitly identifying each controlled unit. The address field may have an address field format. The address field format may include (a) allowing a controlling unit to address any combination of destination controlled units with reference to their sub-network address, (b) allowing a controlling unit to identify destination controlled units via bitmap-addressing, (c) supporting a unit address space sufficiently small so that all receiving controlled units can be identified in one message, and the like. The address field format may include (a) allowing a controlling unit to address any combination of destination sub-units within a controlled unit, (b) addressing the individual sub-units via bitmap-addressing, (c) supporting a sub-unit address space of limited size so that all receiving controlled sub-units can be identified in one message, (d) enabling a multitude of instances to manipulate sets of sub-units in different controlled units in a synchronized fashion, and the like.

The controlling unit may subsequently command each of the plurality of commanded units using acknowledged one-to-one communication to ensure that all receiving commanded units receive updated information. The controlling unit may skip the acknowledged one-to-one communications in order to quickly distribute new state information to the controlled units in a timelier manner, wherein the one-to-one communications cycle is subsequently resumed. The security token may be periodically updated to ensure freshness of the security token. The security token may time out and invalidated if the unacknowledged token update method fails. The destination-controlled node may receive a new valid security token from the controlling unit via the acknowledged one-to-one communication. The encapsulation message may be forwarded by a plurality of units acting as repeater units. The encapsulation message may be broadcasted in the sub-network. The encapsulation message may be broadcasted in the sub-network using a special preamble pattern to ensure that all intended battery operated units are awake and able to respond to commands in a synchronous fashion. All repeater units receiving the encapsulation message may evaluate the address fields.

This disclosure introduces a new operational mode in controllers and actuator devices that help solve limitations often encountered with classic actuators with local buttons, which are hard to integrate in scene control. This is achieved with two new mechanisms. The first is a communication mode between controllers essentially transferring messages, such as in communicating with controller 'X' to let it know that a command Z was sent to node Y. This is referred to as a 'Proxy Update' herein. In another instance, controller 'A' may command a proxy controller 'B' to deliver a command 'C'. This is referred to as a 'Proxy Command' herein. The second is a message to an actuator style device that informs the actuator that if it detects an event, to communicate back that the event has taken place, but not to change the actuator's state until commanded to do so. For example, in this mode, a plug-in module receiving a button press may not react immediately to the button press, other than notifying a peer node. The peer node then tells the plug-in module what to do. This is referred to as a 'Trigger Setup' herein.

Figure 50:
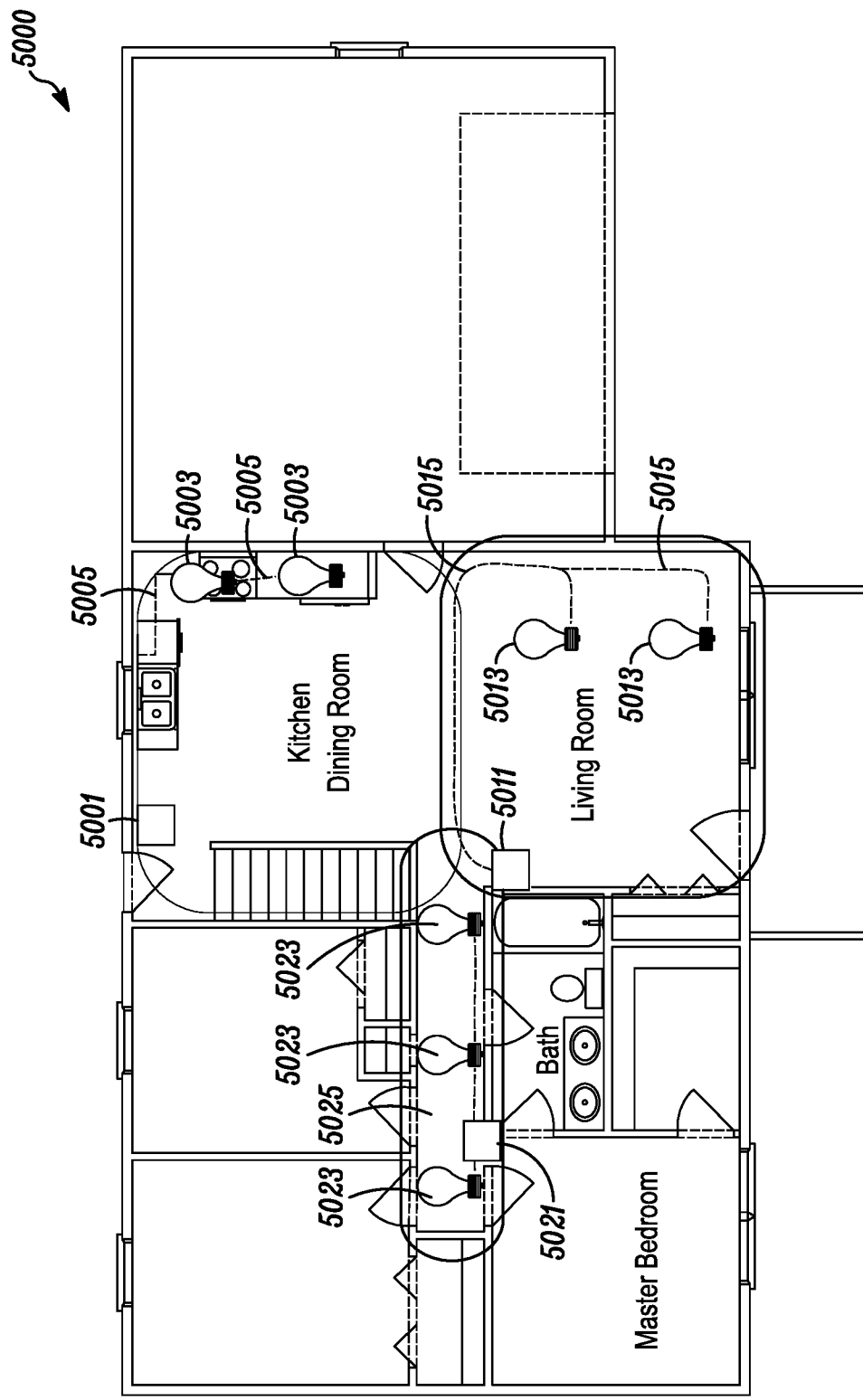
FIG. 50 depicts a prior art house-wiring configuration.

Referring to the prior art in FIG. 50, most houses are wired in zones so that a wall controller is only electrically connected to local light sources. Exceptions include solutions for rooms with multiple entry points where the electrician creates a so-called "traveler system," also known as a "common system." In the example of FIG. 50, house 5000 includes several rooms, including a kitchen/dining room with a wall switch 5s001 for control of two lights 5003 via a control circuit 5005, which may be simply wires connecting the controller to the lights. The living room is in a similar situation, with a controller 5011, such as a wall switch that controls lights 5013 in the living room. Control commands are issued by the switch and are received by the lights or actuators 5013 via wires 5015.

There is also a possibility of a traveler system in the house. For instance, where light switch 5021 near the master bedroom controls lights 5023 in an adjacent hallway 5025. In this instance, wall switch 5011 for the living room is also adjacent to the hallway 5025. Wall switch 5011 may include two switches, one for the living room lights 5013 and a separate switch for the lights 5023 for the hallway 5025. The traveler system in this instance includes both switches 5011 and 5021, which are each able to turn lights 5023 on or off. Thus, it is both possible and useful to have two "controllers" or switches for multiple actuators, as in the case of the same multiple actuators, such as lights.

Figure 51B:
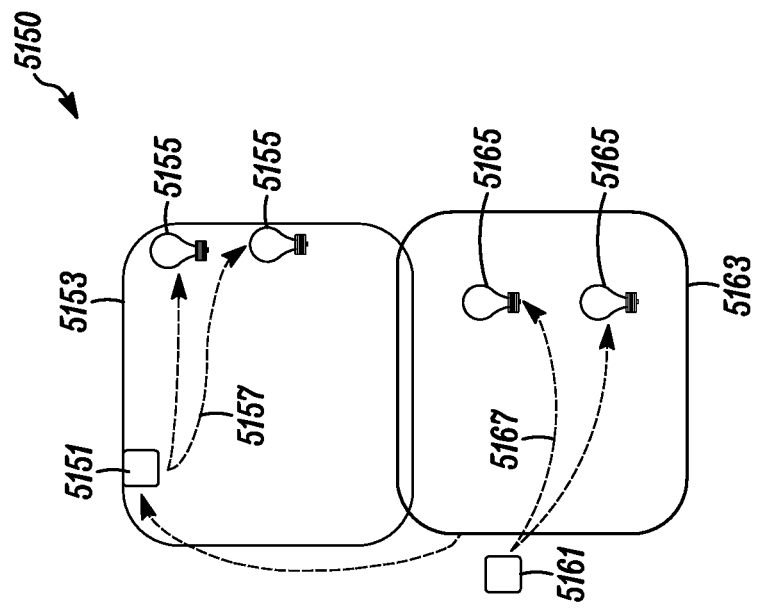
FIGS. 51A and 51B depict a house-wiring control configuration with wireless controllers.
Figure 51A:
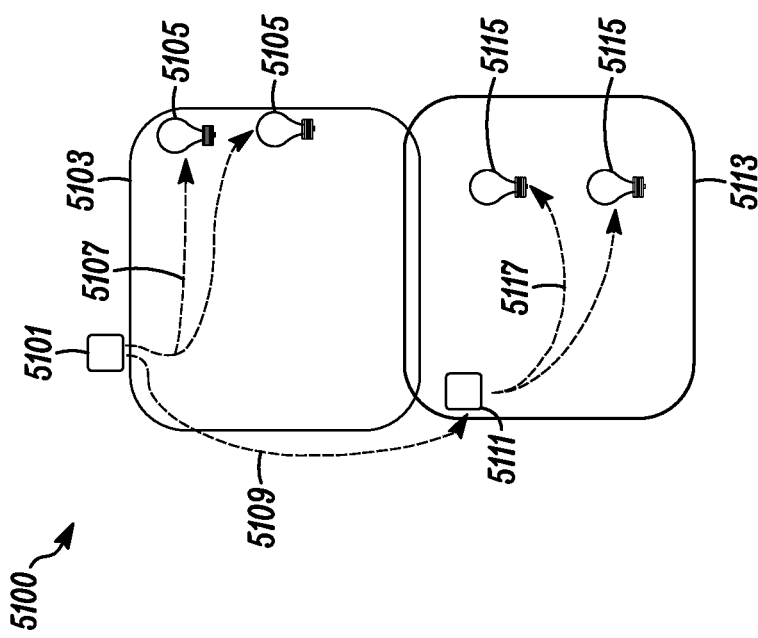

Referring to FIGS. 51A and 51B, with wireless wall controllers, it is possible to simplify the wiring, where the traveler system functionality may be established via logical control messaging rather than physical wiring. For instance, one wall controller may send a message to another wall controller, instructing the receiving controller to send control messages to actuators, such as lamps, ventilation fans, decentralized air conditioner units, motorized drapes, window shades and the like. Other actuators that may be controlled include, without limitation, the home control devices listed above. These devices may include pumps, such as home sump pumps or water pumps, irrigation systems, emergency power systems, home entertainment systems, and so forth. In FIG. 51A, controllers 5101 and 5111 establish a wireless traveler control sequence. Wireless wall controller 5101 in room 5103 can wirelessly issue "on" or "off" commands 5107 to lights 5105. In other embodiments, the objects of the commands may be window shades, fans, air conditioners or other actuators or devices. One additional possibility is a home entertainment system or heater.

FIG. 51A also depicts how controller 5101 can control actuators or objects in another room. Controller 5101 may wirelessly issue a command 5109 to controller 5111 in room 5113, instructing controller 5111 to turn on actuators or lights 5115 via wireless commands 5117. The rooms need not be adjacent, but the controllers should be in contact in order for commands to be issued and received. In this sequence, controller 5101, which could be termed a first or primary controller, may not be in direct contact with lights 5115. The contact takes place through intermediary controller 5111, which may also be termed a proxy controller. Proxy controller 5111 accepts commands from the originating controller 5101 and relays the commands to the desired actuators 5115. This may be useful if the actuators or lights 5115 are on another floor or in a farther-away room of a house.

In another embodiment, as shown in FIG. 51B, a controller 5161 in room 5163 may be the primary controller and controller 5151 in room 5153 may be the proxy controller. This would be also useful in a situation in which a person may be near room 5163 and controller 5161, perhaps in a second floor of a home, but the person is not near room 5153 and controller 5151 on a main floor. The controllers in FIG. 51B perform in a manner similar to those in FIG. 51A. Controller 5161 is in wireless contact with lights or actuators 5165, issuing commands 5167 wirelessly. Controller 5161 also issues commands to the other controller 5151, which may be termed the proxy controller in this embodiment. Controller 5151 issues wireless commands to lights or actuators 5155 after receiving instructions to do so from controller 5161. The homeowner still has the option to turn on lights 5155 directly by using controller 5151. In embodiments, there may be no physical difference between the primary controller and the proxy controller, where the difference may be which is chosen to be the primary controller and which to be the proxy controller. The controllers may also be programmed or set up so that each is the proxy for the other, giving the owner the option to control lights or actuators in another room by using either the "primary" controller or the "proxy" controller.

Figure 52:
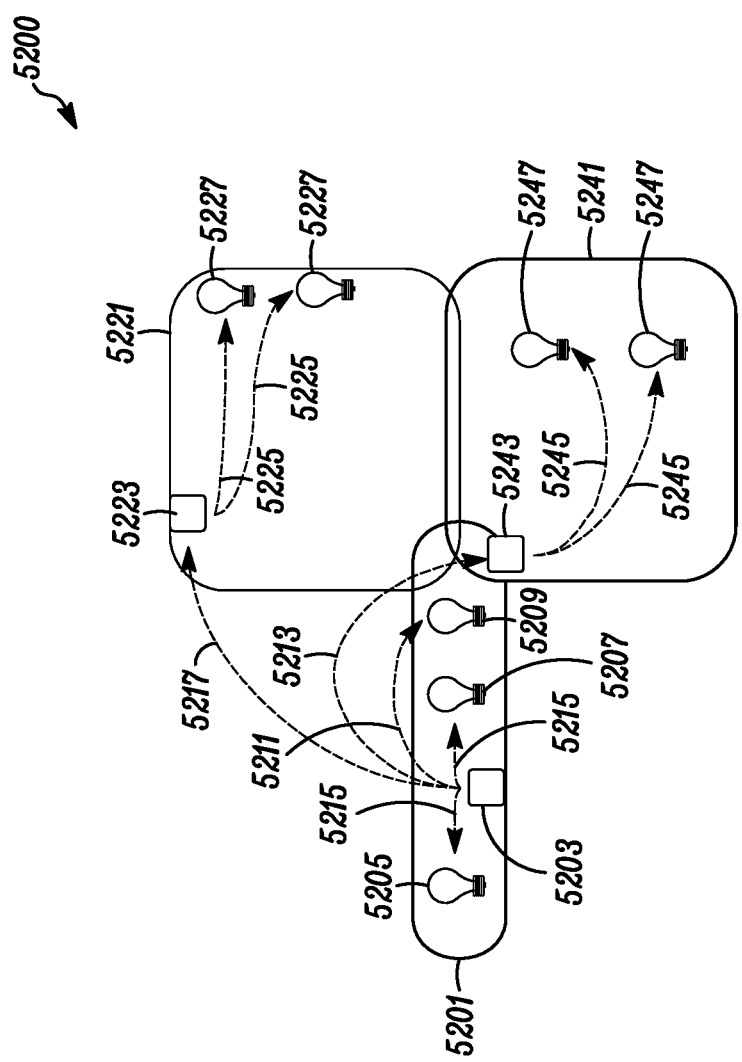
FIG. 52 depicts another house-wiring control configuration with wireless controllers.

Referring to FIG. 52, using the same messaging principle, one controller may implement specific scenes by sending control commands to several other controllers. An example of a "Goodnight scene" is provided in FIG. 52. In this embodiment, controller 5203 in room 5201 may be termed a primary controller, in wireless contact with controllers 5223 and 5243 in other rooms or floors 5221 and 5241. In an example, when the homeowner wishes to turn all the lights off, the homeowner issues a command to controller 5203 to do so. Alternatively, controller 5203 may have a timer that issues an alert at an appointed time every evening for "lights out."

In one embodiment of this sequence, it may be desired for the lights in all three rooms to be simultaneously turned off. In other embodiments, the command may be to raise or lower window shades simultaneously. In this embodiment, controller 5203 issues a command to controllers 5223 and 5243 to execute the command at a given time, at which time controller 5203 also executes. All lights then turn off at the same time. Controller 5203 directly controls, wirelessly, lights 5205, 5207 via wireless commands 5205, 5215 and controls light 5209 via wireless command 5211. Controller 5203 sends wireless command 5217 to controller 5223 and wireless command 5213 to controller 5243. At the given time, proxy controller 5223 wirelessly sends commands 5225 to actuators or lights 5227, and proxy controller 5243 wirelessly sends commands 5245 to actuators or lights 5247.

Figure 53:
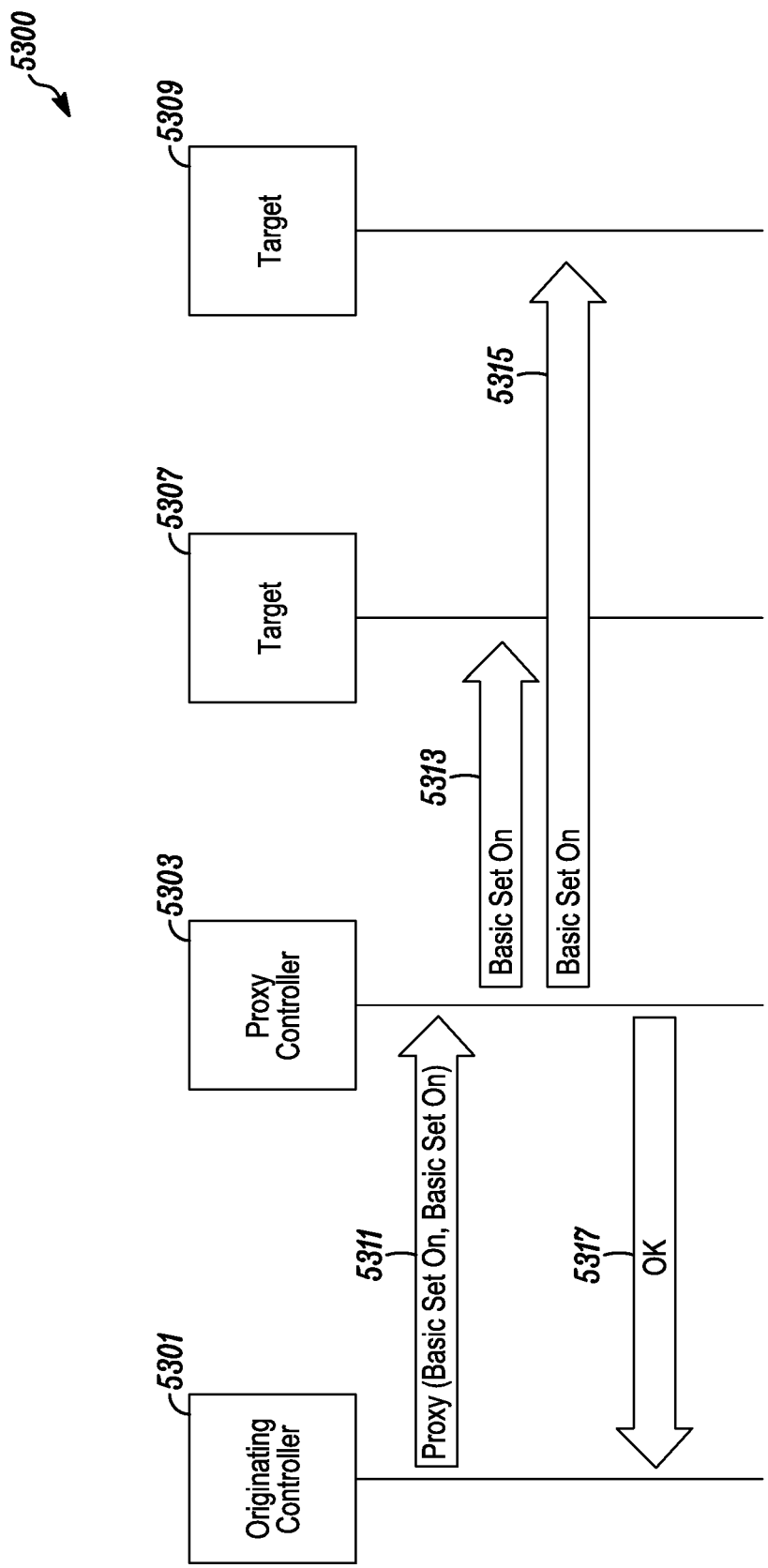
FIG. 53 depicts an embodiment with an alternative control sequence.

Referring to FIG. 53, a sequence diagram 5300 for a proxy command embodiment is presented. In this example, an originating controller 5301 sends one or more messages 5311 to a receiving proxy controller 5303. The proxy controller sends messages 5313, 5315 to two actuators or targets 5307, 5309. In this sequence, the originating controller 5301 is not in direct communication with the actuators or targets, which receive their commands only from proxy controller 5303 via proxy command 5311 from the originating controller. To close the loop, feedback from the proxy controller 5303 may be made by a confirmation message 5317 to the originating controller that the messages have been received by the proxy controller, commands have been issued to the actuators, and the like. The feedback may be important in an overall control scheme for the wireless network. It may also be possible for the actuators themselves to acknowledge receipt of the control commands.

Two Controllers Controlling the Same Actuators While Staying in Sync

Figure 54:
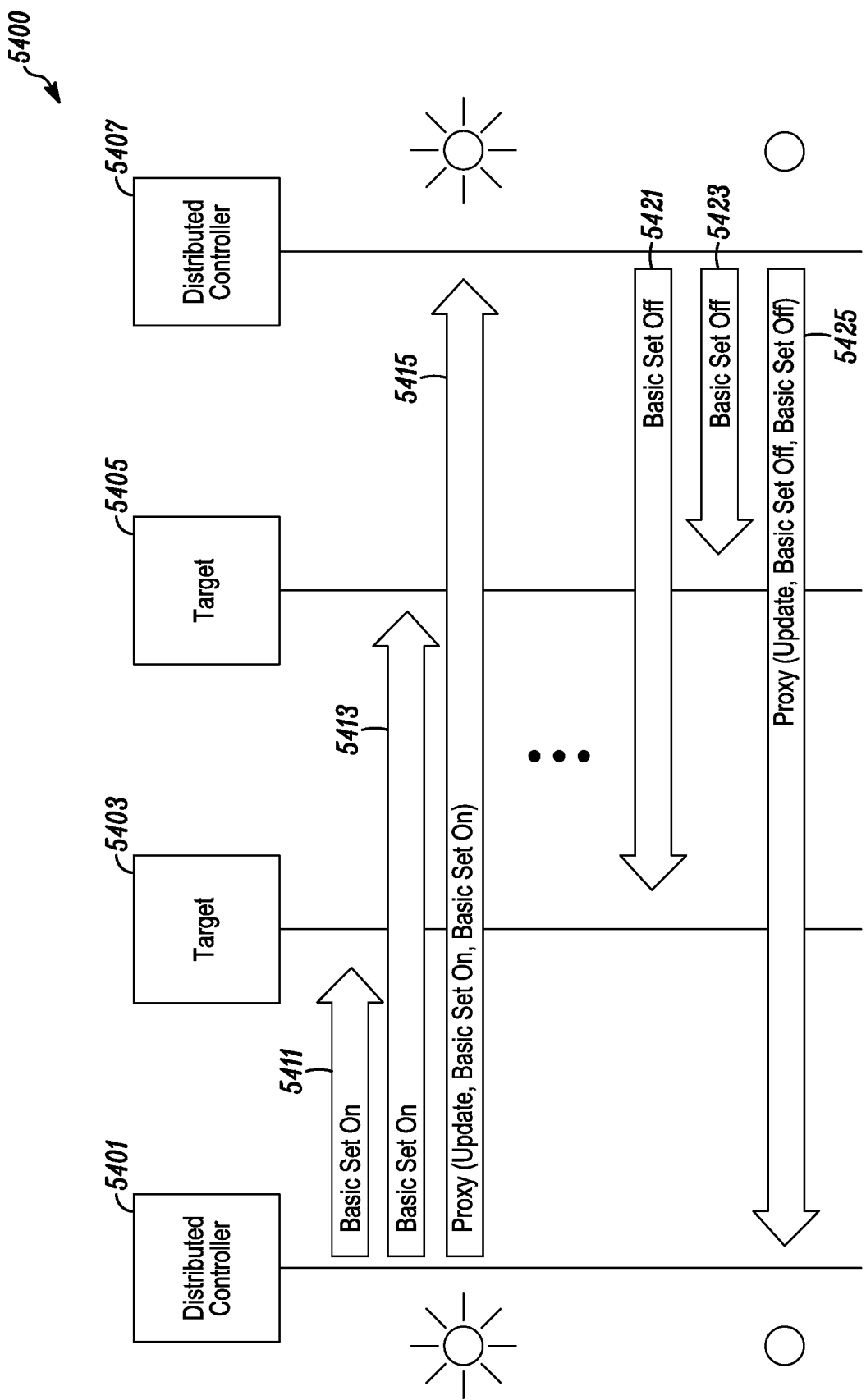
FIG. 54 depicts another embodiment of a control sequence.
Figure 55:
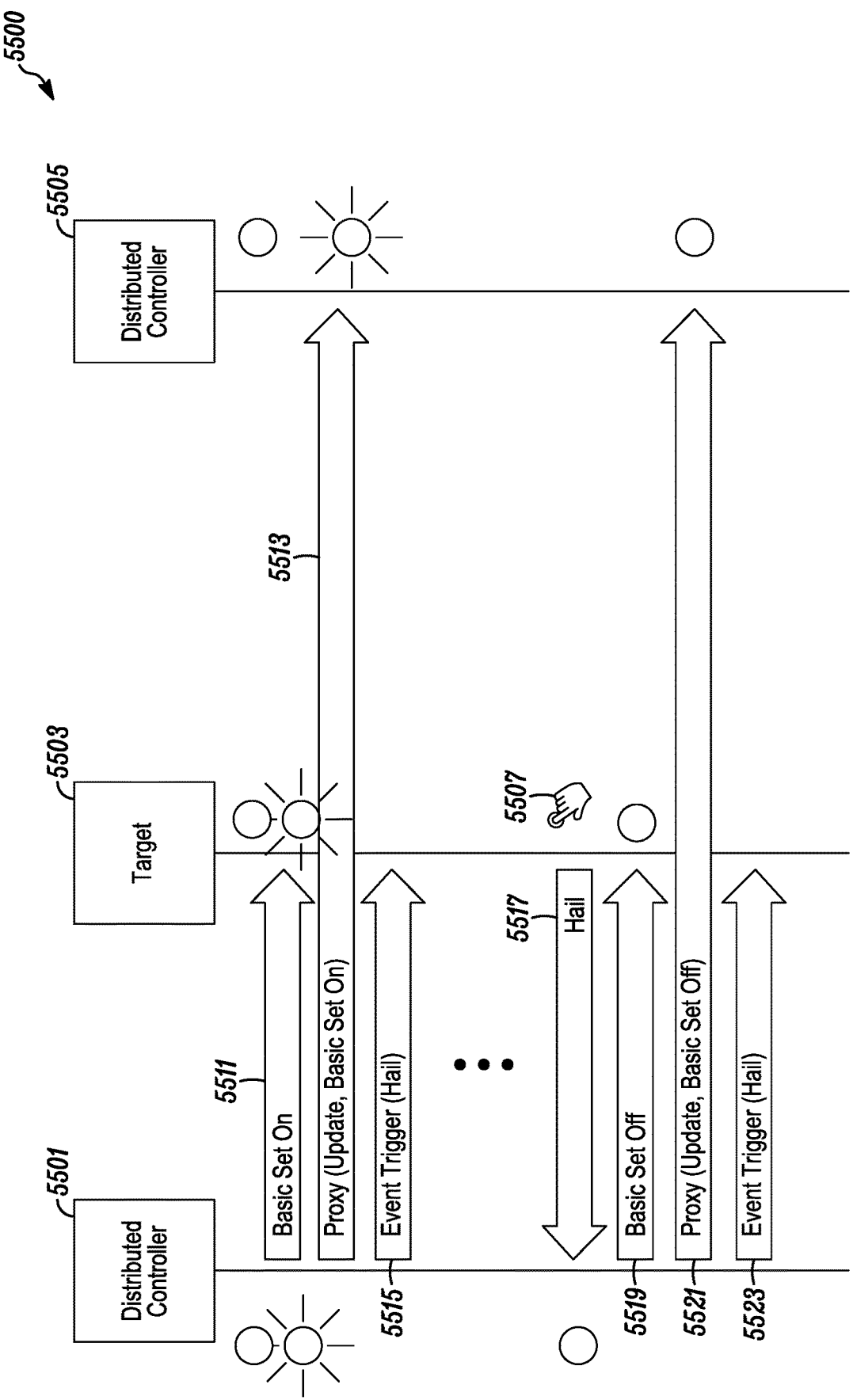
FIG. 55 depicts another embodiment of a control sequence with wireless controllers.

In the situation depicted in FIG. 53, the originating controller 5301 is not in direct contact with the actuators. In this example, the control system is depicted as relatively simple because the actuators receive commands only from one source, proxy controller 5303. A more complicated situation is presented in FIG. 54. In this embodiment, two distributed controllers 5401, 5407 jointly control two targets or actuators 5403, 5405 in an example of distributed control via wireless controllers. In order for the situation to remain manageable, each controller keeps the other controller informed of its actions. In this embodiment, controller 5401 may turn on two actuators 5403, 5405 with basic on commands 5411, 5413 sent to each. Controller 5401 then sends an update message 5415 to inform the second controller 5407 that it has turned on the actuators. At a later point in time, an owner or manager may want to use the second controller 5407 to turn off the lights. This may be occasioned by the owner being out of range of the first controller 5401 but within range of the second controller 5407, or for other suitable reason. The second controller 5407 may now be commanded to turn off the actuators 5403, 5405. Second controller 5407 sends commands 5421, 5423 to the actuators to turn off. Again, to close the loop, the second controller 5407 subsequently informs the first controller 5401 via update message 5425 that the actuators have been turned off Another interesting control situation occurs when there are two controllers controlling an actuator that also has local control (e.g., a manual switch), as shown by the control scheme 5500 in FIG. 55. In this instance, a distributed controller 5501 may turn on an actuator 5503 via a wireless command 5511. Actuator 5503 may be a single actuator or may be a plurality of actuators, e.g., lights, window shades, or the like. Controller 5501 may then inform another distributed controller 5505 that it just turned on actuator 5503. The controller 5501 may then instruct the actuator 5503 via event trigger "hail" instruction 5515 to send a 'Hail' message when an event occurs, e.g. a button press 5507 to turn off the actuator. In embodiments, actuator 5503 may be waiting for this event for an extended period of time (e.g. days, years). Actuator 5503 may even store the information in non-volatile memory that it is waiting for an event, so that it can resume waiting after a power interruption.

When the actual event occurs after some waiting time, the actuator 5503 sends the requested "Hail" message 5517 to the requester, i.e., to controller 5501. Up to this point, the actuator 5503 has not changed state but is waiting for a command from controller 5501, pursuant to the event 5507 and the hail message 5517. Upon receiving the hail message 5517, the controller 5501 decides the proper response to the received Hail message. In this example, controller 5501 may assume that the current state is "ON," as shown. The controller 5501 therefore sends a control command 5519 to the actuator 5503 to turn off the actuator. Subsequently, the controller 5501 informs other controllers (e.g. controller 5505) via proxy update message 5521 of the state change of the actuator 5503. The controller 5501 may then update its event trigger "hail" instruction 5523 to the actuator 5503 for the actuator to send a 'Hail' message when another event occurs.

In embodiments, the function of a push button of the actuator device may be software defined. In its default mode of operation, the button may directly turn on or off the actuator(s) locally. If receiving an Event Trigger enabling command, the function may be changed to sending a specified message. If the specified message cannot be delivered to the requester, the function may be returned to the default mode of the button; e.g. local control. In a special instance, the Event Trigger may define a time window in which additional events also cause the transmission of the message defined with the event trigger. One special time window value may be the "infinite" value. Several strategies may be devised on how often to enable event triggering in actuators if the time window is not infinite.

Figure 56:
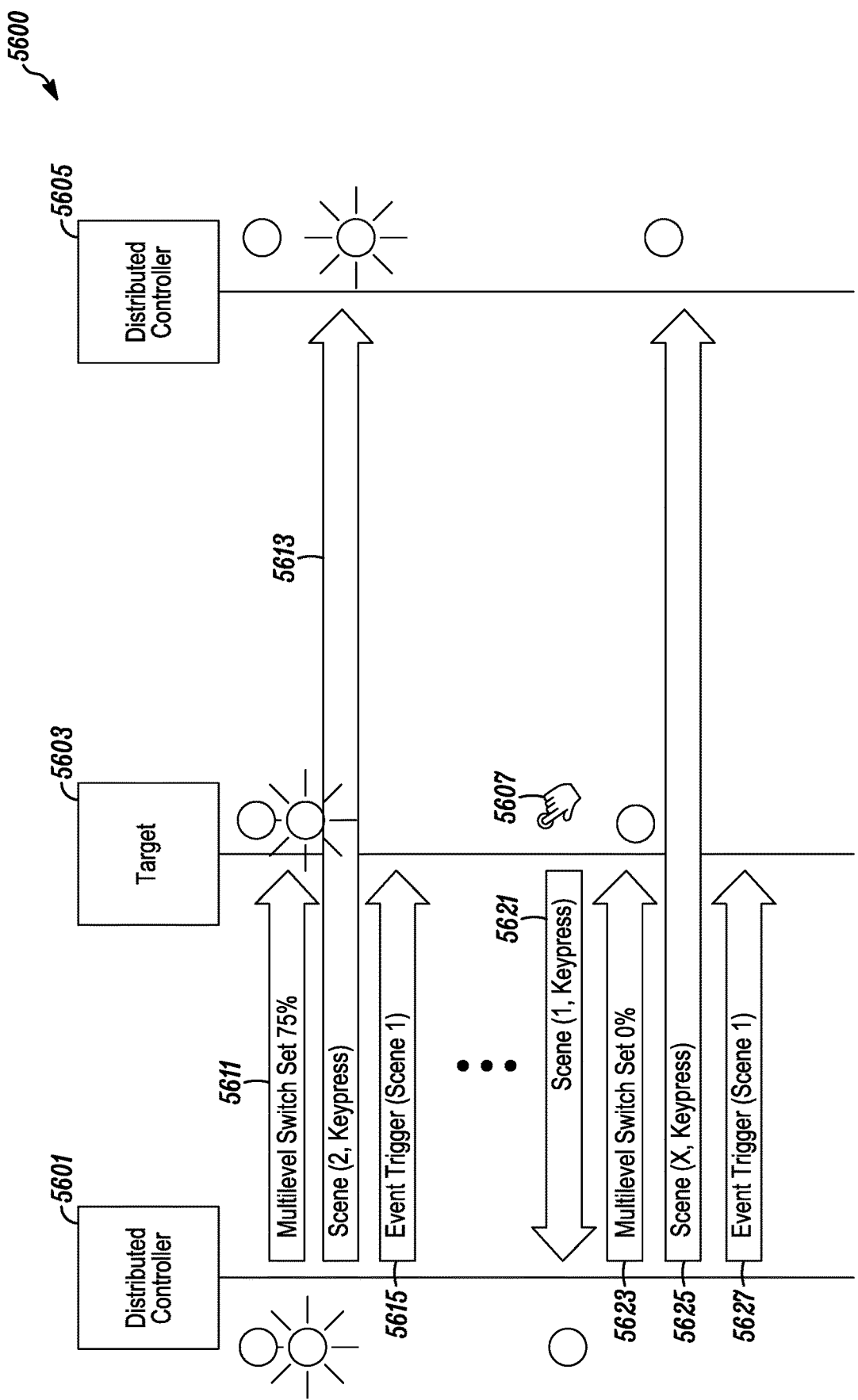
FIG. 56 depicts another embodiment of a wireless control sequence.

Referring to FIG. 56, another control configuration 5600 is presented. In this instance, a controller 5601 may set a control level of a target or actuator 5603 as part of a scene involving other actuators. In the example depicted in FIG. 56, controller 5601 has sent a command 5611 to actuator 5603 to set the switch to 75% brightness, as shown. This may be a fan speed, light brightness, a shade length, and so forth. The controller 5601 may also inform another distributed controller 5605 that it has just switched to a new scene via message 5613. The controller 5601 then instructs the actuator 5603 via trigger message 5615 to send a 'Scene' message when an event occurs, e.g. a button press 5607. Actuator 5603 may be waiting for this event for an extended period of time, e.g. days, years. Actuator 5603 may even store the information in non-volatile memory that it is waiting for event 5607, so that it can resume waiting after a power interruption.

When the actual event 5607 occurs after some waiting time, the actuator 5603 may send the requested "Scene" message 5621 to the requester, that is, to controller 5601. Up to this time, actuator 5603 has not changed state, i.e., no change has been made e.g., on/off, up/down, extend/retract, etc. Upon receiving the scene message 5621, controller 5601 activates the desired scene. In this example, controller 5601 may send a "set light level" control command 5623 to the actuator 5603, in this instance to "0%," i.e. off. Subsequently, the controller 5601 sends Scene control commands 5625 to other controllers, such as controller 5605. The actual scene identifier may vary for each receiving controller, or may be the same, as desired. Controller 5601 may then re-send event trigger 5627 to the actuator to prepare for the next scene control, and the process may be repeated for the next desired "scene," perhaps the next button push 5607.

The function of the push button of the actuator device 5603 may be software defined. In its default mode of operation, the button may directly turn on or off the actuator(s) locally. If the actuator receives an Event Trigger enabling command, the function may be changed to sending a specified message, rather than turning the actuator on or off or otherwise changing a state of the actuator. If the specified message cannot be delivered to the requester, the function may be returned to the default mode of the button; e.g. local control. In a special instance, the Event Trigger may define a time window in which additional events also cause the transmission of the message defined with the event trigger. One special time window value may be the "infinite" value. Several strategies may be devised on how often to enable event triggering in actuators if the time window is not infinite. One example is that the trigger is re-instantiated every hour. In embodiments, a controller may skip setting up a trigger after controlling an actuator if it is already the owner of the trigger in that given actuator.

Figure 57:
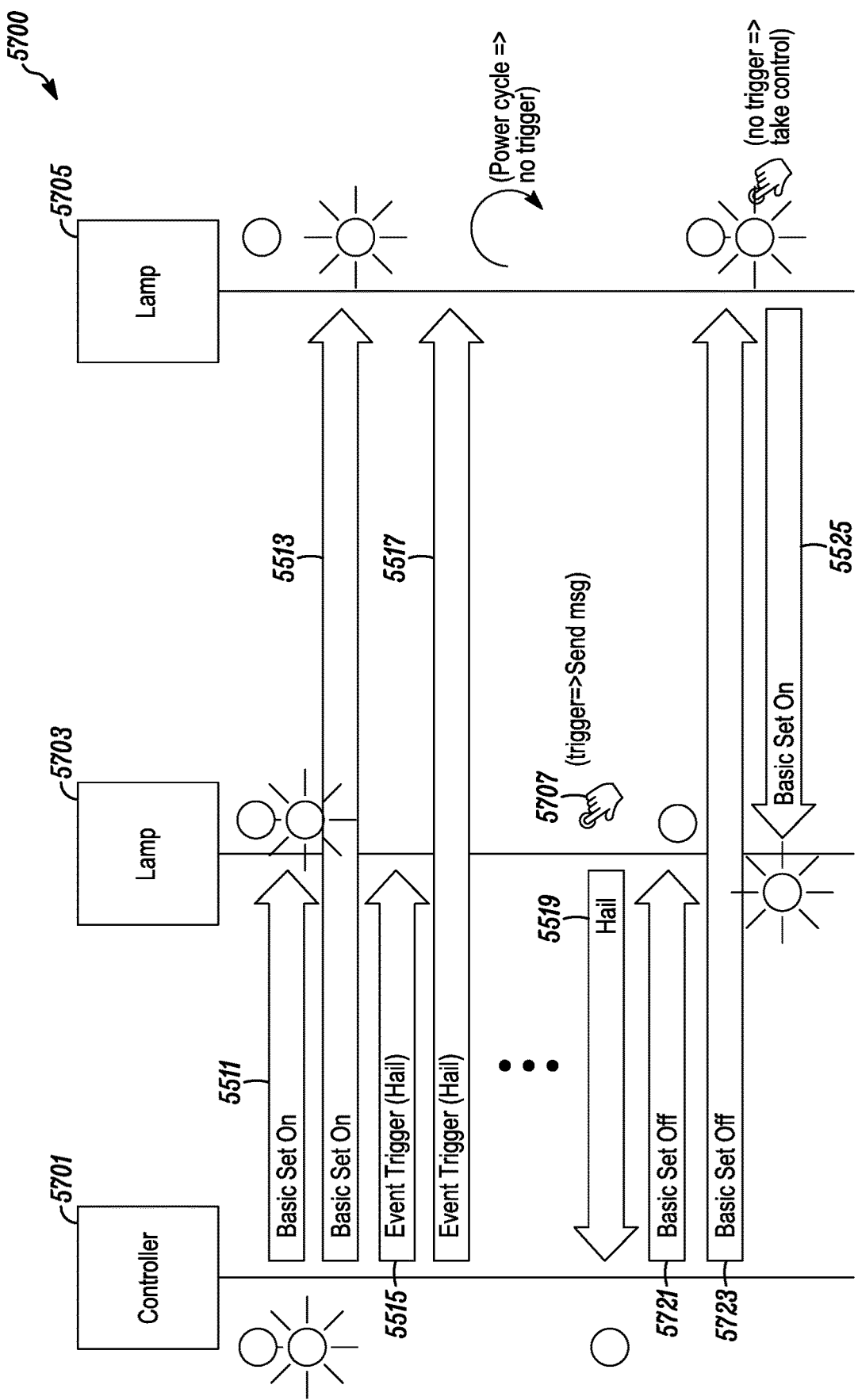
FIG. 57 depicts another embodiment of a control sequence with wireless controllers.

Referring to FIG. 57, in yet another control configuration 5700, there is a controller 5701 and several actuators or devices, 5703, 5705. In this example, actuators 5703, 5705 form a group and are configured to control the other devices in the group via an association group mapped to a local event, e.g. a pushbutton 5707. In addition, all the devices may be controlled from a controller, e.g., controller 5701. At any given time, each device may have an active trigger waiting for a button press 5707. In case of a button press, a notification is sent to the trigger owner, i.e., controller 5701, which then commands all members of the group. In case of a power cycle event, e.g., a power failure, a device 5705 may lose the trigger state. In that case, the device may respond locally by controlling all devices that are members of the local group. In embodiments, the trigger state may only be re-established by a controller actively setting up a new trigger.

In this example, controller 5701 sends commands 5511, 5513 to lamps or actuators 5703, 5705, turning the actuators on, as shown. Controller 5701 also sets and sends triggers 5515, 5517, to both lamps 5703, 5705, each trigger also containing a command to send a hail message in case of a button press 5707. When the button press occurs, the hail message 5519 is sent to controller 5701. The controller then re-sets the actuators 5703, 5705, in this case by turning the actuators off with commands 5721, 5723. Other actions may also be called for by the trigger or triggers set by the controller. In case of a power failure, any configured trigger is forgotten. The trigger is not re-set when power returns. In the absence of a configured trigger, actuator 5705 responds to a local button press by turning on actuator 5705 and also sending a control command 5525 to local group member actuator 5703. If there are other actuators in the group, they are also controlled by actuator 5705. The sending of command 5525 may be accompanied by a message to controller 5701 by either actuator 5703 or 5705, notifying the actuator of the power failure. The control scheme then may cause controller 5701 to reset the trigger, to send an alarm, or to take other actions.

In embodiments, one may set up a trigger in an actuator device. If the trigger fires, a message is sent to the requester, i.e., a controller, and the requester/controller then decides which command to send to the actuator. A safe fallback may be implemented in case of errors. A safe fallback may be achieved by allowing the actuator to locally map the button to an operation (e.g. toggle a light), such as in the following two example cases. In a first case, no trigger may be set up. Thus, the local button controls the light.

In a second situation, a trigger has been established. A trigger may be the occurrence of an event, a passage of a period of time, or a set time. If the target of the trigger message does not acknowledge the reception of the message after a brief period of time perhaps five seconds, the trigger state may be cleared. In a low-speed network, routing attempts may be limited for instance to two previously working routes and one route repair attempt. Further, as part of a safe fallback strategy, an association group may be mapped to the event, allowing the local event to control not only the local actuator resource but also other resources identified in the association group. This allows the user to control groups of actuators even if a scene controller breaks down. For instance, the control command that internally controls the local actuator resource may also be sent to all configured members of the association group. Association group members are always maintained in non-volatile memory.

The mesh network technology's routing capability enables an interconnection of all the nodes in the network, where each mesh network node may transform any standalone device into an intelligent networked device (e.g., sensor, actuator, controller, repeater, and the like) that may be controlled and monitored wirelessly. Further, the intelligence that the network device connects to may be integrated with the network node or be in a separate physical or virtual device wirelessly or otherwise interconnected with the node. For instance, a functionally integrated network device may be a lighting device where the network node is integrated with a lighting controller, enabling the network node to act as an end-point controller-monitor of the controlled lighting facility as well as acting as a network node for fulfilling routing capacities of nodes in the network. In another instance, a network node may wirelessly communicate with an external node that may or may not be connected to the rest of the mesh network. In an example, a network node may connect wirelessly with a stand-alone low-power node that acts to perform a monitoring and alert function where the alert is communicated to the network node for further relay through the mesh network. A stand-alone low-power node includes a node that provides for its own power, and/or has power separated from the mesh network power (intermittently, selectively, periodically, and/or permanently).

The stand-alone low-power node may be powered at least in part through an external energy facility, stored energy facility, alternative energy facility, energy-harvesting facility, and the like (e.g., through a battery, capacitor, supercapacitor, solar power, electro-magnetic radiation incident on the harvester (e.g., a micro-antenna), electro-magnetic induction, wind power, thermal gradients, salinity gradients, other chemical gradients, kinetic energy, ambient energy, vibration energy, energy generated through the piezoelectric effect, and the like), or a combination of these, as well as other energy sources, storage, and generation facilities known to the art. Without limitation, this disclosure will refer to this family of stand-alone low-power device-nodes as energy-harvesting (EH) nodes, such as for their general capabilities to at least in part utilize ambient energy sources to power functions of the device.

EH nodes may be small and/or low-cost autonomous electronics devices, such as to provide low-level signals to indicate an event has occurred. For example, an EH node may be mounted on a door or window to detect an open-close condition, where the EH node utilizes energy generated by an EH mechanism (e.g., a spring-magnet mechanism that when the door opens draws the magnet through a conductive coil to generate an electrical current through electromagnetic induction). The energy generated by the EH mechanism (e.g., the spring-magnet-coil mechanism) during the EH event (e.g., the opening of a door that generates an electrical current through the EM mechanism) may then be utilized to send a wireless communication (e.g., RF or IR signal) to a mesh network node. The mesh network node may then forward the message through the mesh network. Although the spring-magnet-coil EH mechanism has been used as an example, one skilled in the art will appreciate the wide range of small EH devices that may act as an extended information point in a mesh network, such as for the detection of events, motions, and actions, and the like throughout a home, building, grounds and the like through which the mesh network maintains connectivity.

Certain example EH nodes are described throughout the present disclosure having an EH capability that is in the same dimension as the detection capability of the node—for example if the EH node detects vibration, it may harvest energy from the detected vibration; if the EH node detects deflection or displacement, the EH node may harvest energy from the detected deflection or displacement; if the EH node detects a temperature event, the EH node may harvest energy from the detected temperature event (e.g., a temperature rise or gradient); and/or if the EH node detects light, the EH node may harvest energy from the light. In certain embodiments, the EH node harvesting energy from the detected dimension provides for an EH node that has energy available when the detected event occurs. In certain embodiments, the EH node may harvest energy from a distinct dimension from that detected—for example to provide a periodic, episodic, and/or more reliable energy availability to the node. In a further example, an EH node that detects and reports vibration on a window may have a thermal harvesting aspect (e.g., a thermoelectric solid-state device or the like) that harvests energy from periodic thermal events (e.g., window warming and cooling cycles). In certain embodiments, the additional or alternative energy source that is in a distinct dimension from the detected dimension can provide a more reliable energy source and/or can provide for more immediate response (e.g., the EH node does not have to wait for enough energy from the detected event to be able to send a message). EH nodes that harvest energy from the detected dimension, that harvest energy from one or more alternative dimensions, and that harvest energy from the detected dimension in addition to one or more alternative dimensions are specifically contemplated herein.

The EH node may be a low power device with no means for long-term storage of energy, and relies solely on energy generated through the EH mechanism for operation. In this instance, the EH node may utilize the energy generated from the EH mechanism to transmit a wireless signal or message and then power off and await the next EH event.

The EH node may be a low power device, perhaps having no capability for long-term storage of energy, but may have short-term energy storage (e.g., through a capacitor, supercapacitor, small rechargeable battery, and the like). As such the EH node may be capable of secondary messaging in addition to an initial sending of a message at the time of the EH event. For instance, an EH node may have the capability for receiving a message back from the mesh network after sending the initial message resulting from the EH event. The EH node may be able to remain powered long enough to receive a reply message back from the network (e.g., for resetting a state associated with the EH node, setting an indicator on the EH node, and the like).

In certain embodiments, an EH node does not include short-term or long-term storage capability. In certain embodiments, an EH node includes short-term storage capability but no long-term storage capability. In certain embodiments, an EH node includes long-term storage capability. In certain embodiments, an EH node includes access to one or more energy sources and/or power supplies, wherein it may nevertheless be useful that the EH node does not utilize the energy sources and/or power supplies during nominal operation, but the EH node includes access to these for emergency response, when harvesting operations are not providing sufficient energy to provide for the functions of the EH node, and/or to improve response times for certain detected events (e.g., a high rate of change in a response, a response above a threshold value, and the like) where waiting for sufficient energy harvesting may not be the desired operation. The time frames that are contemplated by short-term or long-term depend upon the role of the EH node, the operations of the system, the expected availability of communication to a mesh network at least intermittently in communication with the EH node, and the like. For example, in certain systems, a short-term storage capability may be several microseconds, a few hundred milliseconds, on the order of seconds (e.g., 1-100 seconds), on the order of minutes (e.g., 1-100 minutes), on the order of hours (e.g., 1-100 hours), and/or on the order of days (e.g., 7-90 days). In certain systems, a long-term storage capability may be on the order of seconds (e.g., 1-100 seconds), on the order of minutes (e.g, 1-100 minutes), on the order of hours (e.g., 1-100 hours), on the order of days (e.g., 7-90 days), on the order of months (e.g., 1-12 months), and/or practical perpetuity (e.g., through storage in non-volatile memory, access to external power, power to last for the expected life cycle of the application, etc.).

The capture of energy by the energy harvesting mechanism may be described as an energy harvesting action, a physical action by the energy harvesting mechanism, and/or a harvesting action of the energy harvesting mechanism. In certain embodiments, when the system or environment physical, photo-electric, thermal, vibration, chemical, or other characteristics are in a condition where the energy harvesting mechanism is able to capture energy from the system or environment, the energy harvesting mechanism can be said to be harvesting from the system or environment. Additionally or alternatively, when the energy harvesting mechanism is actually capturing energy from the system or environment, the energy harvesting mechanism can be said to be harvesting from the system or environment.

Alternately the EH node may have the capability for transitioning to a low or very low power state after sending the initial message and then waking back up for reception of a reply message from the mesh network. In embodiments, the delay may be executed with a low power wakeup timer on the EH node that is set for a predetermined period of time, after which the EH node is awakened to await reception of a message. The predetermined period of time for the wakeup timer may be transmitted to the network node in the initial message so that the network node knows when the EH node will wake up and monitor for a message. For example, an EH node may be initially activated by an EH event that generates energy sufficient to send an initial message, set and run a timer for two seconds, wake the EH node back up at the end of the two seconds and await a message from the network node. In embodiments, the network node may set its own network timer based on the predetermined period of time transmitted from the EH node to determine when to send a reply message to the EH node (e.g., the network node sets a network timer to two seconds when the initial message from the EH node is received). The timing of the reply message may be adjusted from the predetermined period of time from the EH node—for example to account for message delays through the mesh network or the like. In this example, some of the generated power from the EH event is used in real-time for sending the initial message and some is stored in an energy storage device at least long enough for operation of the wake-up timer and message reception functionality. In addition, energy may be stored long enough for execution of any functional message received from the network node (e.g., setting a visible indicator, sounding an audible signal, setting a non-volatile memory information storage location, and the like).

The EH node may comprise energy sources, energy storage capacity, and/or access to non-volatile memory storage that enable the EH node to maintain stored information (e.g., logic states, configuration information, timer settings, saving last message information, maintaining message history, saving routing information, and the like) over longer periods of time (e.g., minutes, hours, days). The EH node may provide energy on a continuous basis under certain conditions, such as when the EH node experiences a consistent activation through EH events. For example, an EH node may comprise an EH mechanism for generating energy plus a small rechargeable energy storage facility (e.g., rechargeable battery, super capacitor, and the like) for maintaining an energy source over an extended period of time. For instance, an EH node associated with a door mechanism may operate a locking mechanism for the door, unlocking the door on a first action and keeping the door unlocked over the period of time that the EH node is able to store energy (e.g., two minutes), after which time the EH node runs out of power and re-locks the door. Alternatively, the energy storage capability could be sized such as to provide longer term powering of the EH node, such as for a full day or week, dependent upon the needs of the application.

EH nodes may be located in fixed locations, mobile locations, wearable locations, and the like, and directly connect to one or more of a plurality of network nodes, dynamically connect to one or more of a plurality of network nodes, be assigned to a fixed mesh network node that acts as the connection device to the mesh network, and the like. For instance, the EH node may be assigned to a specific network node or nodes for connection into the mesh network or be dynamically assigned to network nodes based on changing conditions (e.g., when the EH node is mobile and connects to the nearest network node for messaging in association with an event, when the assigned network node is unresponsive, and the like).

Connectivity between a mesh network node and an EH node may be established on an ad hoc basis where the mesh network node establishes connectivity with the EH node each time the EH node activates and sends a message, or the mesh network node may have stored connection information associated with the EH node for when the EH node sends a message. The mesh network node may recognize a first message from the EH node as a one-time event, such as when a new mesh network node is first integrated into the mesh network, or the mesh network node may store the information associated with EH node from the first message for future communications. In this way, the EH node may always be considered an outside node communicating into the mesh network or the EH node may be considered as a member node for communication with the mesh network. An EH node that is recognized by at least one mesh network node may or may not be considered by the mesh network as a mesh network node. That is, even if EH node information is stored in the memory of at least one of the mesh network nodes it does not necessarily mean that the EH node is a mesh network node. For instance, mesh network nodes may operate in the mesh network through stored routing information and protocols. The EH node may be a very simple device operating at very low power, and as such may be unable to support the infrastructure facilities required for the EH node to operate as a mesh network node (e.g., routing algorithms). Therefore, an EH node may be restricted to functionality associated with energy harvesting, event detection, messaging, and the like, rather than to being an integrated mesh network node.

Alternatively, the EH node may contain the necessary functionality to perform as one of the plurality of mesh network nodes in the mesh network, such as similar to a battery powered mesh network node but with energy harvesting as at least one source of operational energy. In embodiments, the EH node may act as a mesh network node at some times, but as a stand-alone node apart from the mesh network at others. For instance, there may be a period of time where there is increased activity with an EH node, such as the EH node being mounted to a door that is being constantly opened and closed for a period of time. In this instance, the EH node may be regularly communicating messages with the mesh network, and as such, for that period of time essentially becoming an active node on the mesh network (e.g., the EH node becomes listed in routing tables of the mesh network, the EH node becomes an end point for communications with a controller node, and the like). However, when the activity with the door ceases, the EH node may drop off the mesh network (e.g., being removed from mesh network routing tables as an inactive or removed node).

A mesh network node that acts as a connection point for the EH node to communicate a message into the mesh network may act as an EH proxy node for the EH node such that messaging with the EH node by the mesh network is directed to the EH proxy node rather than to the EH node, where the other network nodes within the mesh network may not know the EH node exists (e.g., the EH node does not show up on any node routing table within the mesh network, except possibly in the EH proxy node). For example, a mesh network controller node may be assigned as an EH proxy node for an EH node. When the EH node has a message to send it sends it to the EH proxy node, which then communicates the message into the mesh network. In this instance, if there were a reply message sent back from the mesh network it would be directed to the EH proxy node (e.g., as if the EH proxy node were the final destination of the message). The EH proxy node would then forward the message to the EH node (e.g., at a time when the proxy node wakes up to receive a reply message).

Messages transmitted from the EH node may be broadcast messages. EH node broadcast messages may be directed to all mesh network nodes within the wireless transmission range of the EH node, and any or all mesh network nodes may be enabled to receive the broadcast messages. In embodiments, a single mesh network node may be assigned as a proxy EH node and receive broadcast messages from the EH node. The proxy EH node is then responsible for relaying the message into the mesh network, such as by receiving and decoding the message for the destination. The proxy EH node may then also be the network destination for messages back to the EH node, where a sending mesh network node directs the return message to the proxy EH node for relay to the EH node (e.g., where the sending mesh network node may not know of the existence of the EH node, and is responding to the EH proxy node as if it were the originator of the message).

Figure 58:
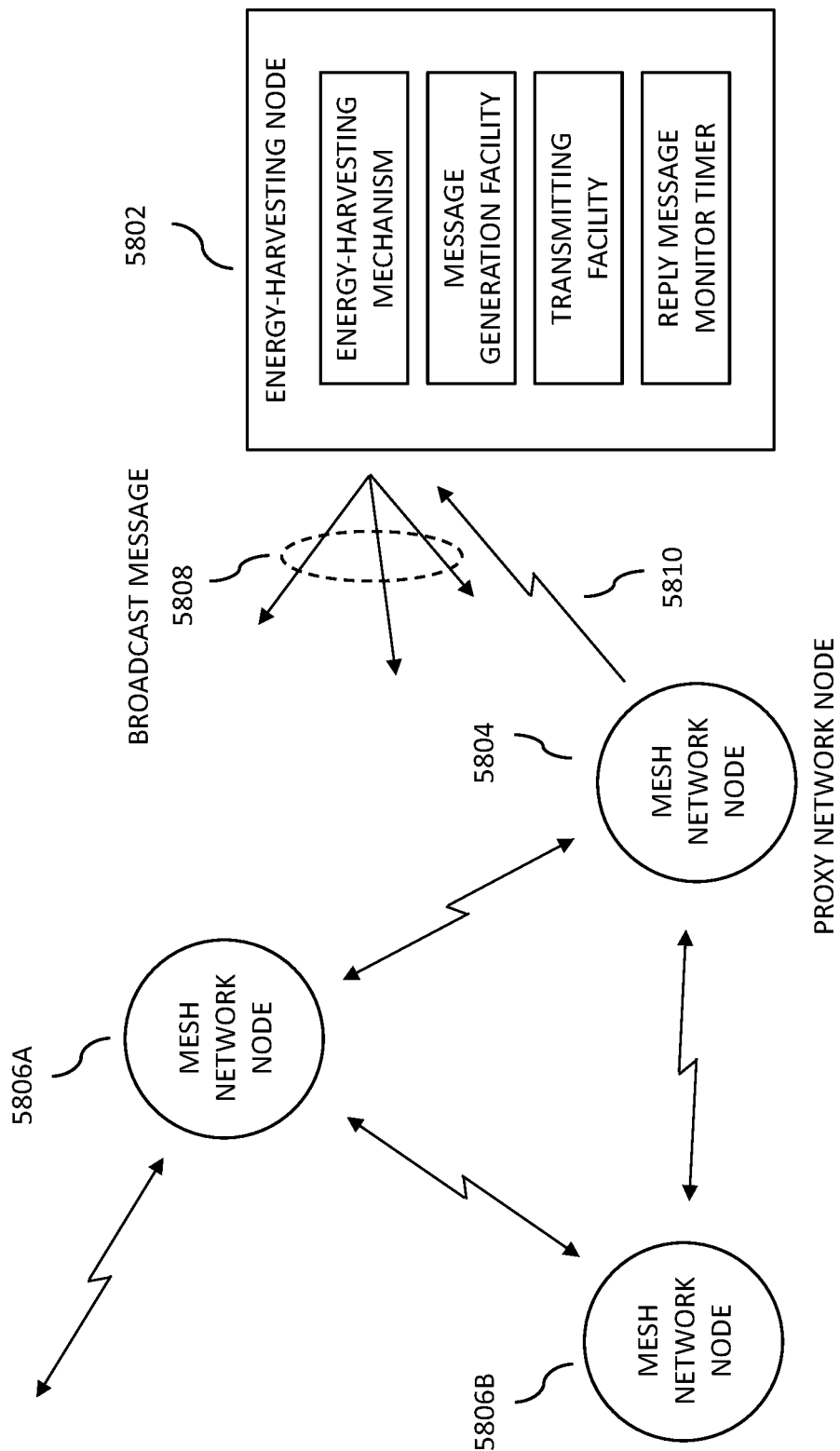
FIG. 58 depicts an energy-harvesting node interfacing with a mesh network.

Referring to FIG. 58, an energy-harvesting node 5802, which may comprise an energy-harvesting mechanism, a message generation facility, a transmitting facility, a reply message monitor timer, and the like, may transmit a broadcast message 5808 that may be received by one or more mesh network nodes 5804, 5806A, and 5806B. A mesh network node 5804 may be assigned to be the connection point (e.g., as an EH proxy node) for communications between the energy-harvesting node 5802 and the mesh network comprising at least in part of mesh network nodes 5804, 5806A, and 5806B, where the mesh network node 5804 receives the broadcast message and forwards it into the mesh network nodes 5806A and/or 5806B as a network message. A reply network message may be sent back from the mesh network to the mesh network 5804 and on as a message 5810 to the energy harvesting node 5802. The energy-harvesting node 5802 may listen for the message 5810 at a specific time based on the setting of a reply message monitor timer.

Broadcast messages from the EH node may be received and processed by a plurality of mesh network nodes, where the plurality of mesh network nodes then negotiate with each other to determine which will act as the proxy EH node. This configuration may be effective when any single mesh network node is busy, off-line, disabled, or otherwise not able to service the broadcast message from the EH node. This configuration is also effective in the instance when an EH node has been placed but is only infrequently activated such that the mesh network node configuration has changed from one activation to the next. For instance, an EH node may be placed in a garden gate for open-close indication, but the garden gate is only infrequently used. The mesh network nodes that support the area around the garden area may change from time when the EH node is placed and when it is activated by an EH event. In more general usage, this may be the case for any EH node, where over time the mesh network node configuration changes such that the assignment of any one single mesh network node to act as the proxy EH node is ineffective over time. This is particularly true for an EH node as opposed to a mesh network node, where the EH node may spend most of its life in a powered off mode waking up only periodically and broadcasting to a mesh network that may have changed since the last message. Therefore, a plurality of mesh network nodes may be enabled to receive the broadcast message from the EH node, where it is then the function of the more fully active and powered plurality of mesh network nodes to determine what mesh network node will act as the point of contact for the EH node with respect to the current broadcast message.

Negotiation amongst a plurality of mesh network nodes to determine which node is to serve as the connection point for the EH node once a broadcast message is received may include a predetermined configuration that specifies a protocol for the plurality of mesh network nodes determining which network node will take control. For instance, a primary mesh network node may be identified and takes control unless the others of the plurality of network nodes fail to see a subsequent transmission by the identified node, in which case there may be an algorithm for determining which secondary node is to take control. Negotiation may be dynamic, where each time the plurality of network nodes receives a broadcast message from an EH node they determine which node is to take control based on at least one node condition, such as the current activity of a node, the speed capability of a node, the strength of signal from the EH node at the receiving node, and the like. Once a mesh network node is determined to be the contact point for the EH node, the determined mesh network node may then be identified as the EH proxy node for the EH node for that communication period. That is, EH node communications will typically occur at discrete times corresponding to single EH events. Message exchanges associated with a single EH event may therefore be assigned to a single mesh network node for the duration of the messaging associated with the EH event. Then, for subsequent EH events a re-negotiation may be undertaken. In embodiments, the last mesh network node to act as the EH proxy node may become the default selected EH proxy for the next EH communication period.

A plurality of EH nodes may be located within range of one another, and since they may comprise a diverse set of energy storage capabilities, may be able to act as relays for one another under certain circumstances. For example, an EH node may be capable of sensing a rapid increase in temperature (e.g., a fire detection EH node), were the EH mechanism in this instance is only capable of generating a small signal that can transmit only a short distance. A plurality of these small devices could then be deployed throughout a remote garage. Unfortunately, none of these devices may be capable of transmitting over sufficient range to reach the nearest mesh network node. However, if a more fully powered EH device is deployed in the same vicinity as the plurality of small devices it could act as a repeater if it was equipped with a receiver-repeater that was capable of receiving at least one of the signals generated by the fire detection EH node and where the repeater has a transmitter that was capable of transmitting to the nearest mesh network node. This enables the extension of the sensing capabilities of the mesh network out beyond the bounds of the mesh network to areas covered only by small and/or low-cost EH devices, where with repeater capability may be able to reach well beyond the mesh network installation. A more fully powered EH device may be a device having an external power source, access to an external power source, and/or a device with a cyclic, periodic, episodic, and/or otherwise repeatable harvesting power supply (e.g., positioned in a location to see periodic thermal gradients, light activity, etc.). In certain embodiments, a number of EH devices may be configured such that at least one of them is expected to receive reliable energy harvesting opportunities, where the one receiving power under the given operating conditions acts at the repeater for other ones of the EH nodes.

A plurality of EH nodes may be associated with one another in that they are sensing events that are related to the same overall action. For instance, a plurality of EH nodes that sense vibration on a window may be mounted on a set of window panes, each being activated when there is a sensed vibration in the given window pane. In this instance, if all of the window panes are set into vibration from the same event (e.g., a tree crashing into the window) all of the EH nodes may activate and send out a broadcast message (e.g., each with their own ID) where the receiving mesh network node then forwards each on to a destination for processing at an EH node processing facility, where the multiple EH node activations may be related together to form a comprehensive alert to the condition sensed at the window. In this way, a plurality of EH nodes may be able to extend the mesh network's ability to sense conditions beyond single-point activations but more to a collective sensed environment.

Low power wireless EH nodes may enable an extension of a mesh network wireless routing capability through single-point extensions of sense-gathering activation sites. EH nodes may autonomously connect into the mesh network through broadcast messaging to mesh network nodes acting as EH proxy nodes, thus enabling the EH nodes to be added to the mesh network without undue burden to configuration of the mesh network. EH nodes may therefore provide a low-cost solution to extension of the mesh network with potentially low-complexity devices to provide an extended information sensing environment layer on top of the mesh network layer.

Figure 59:
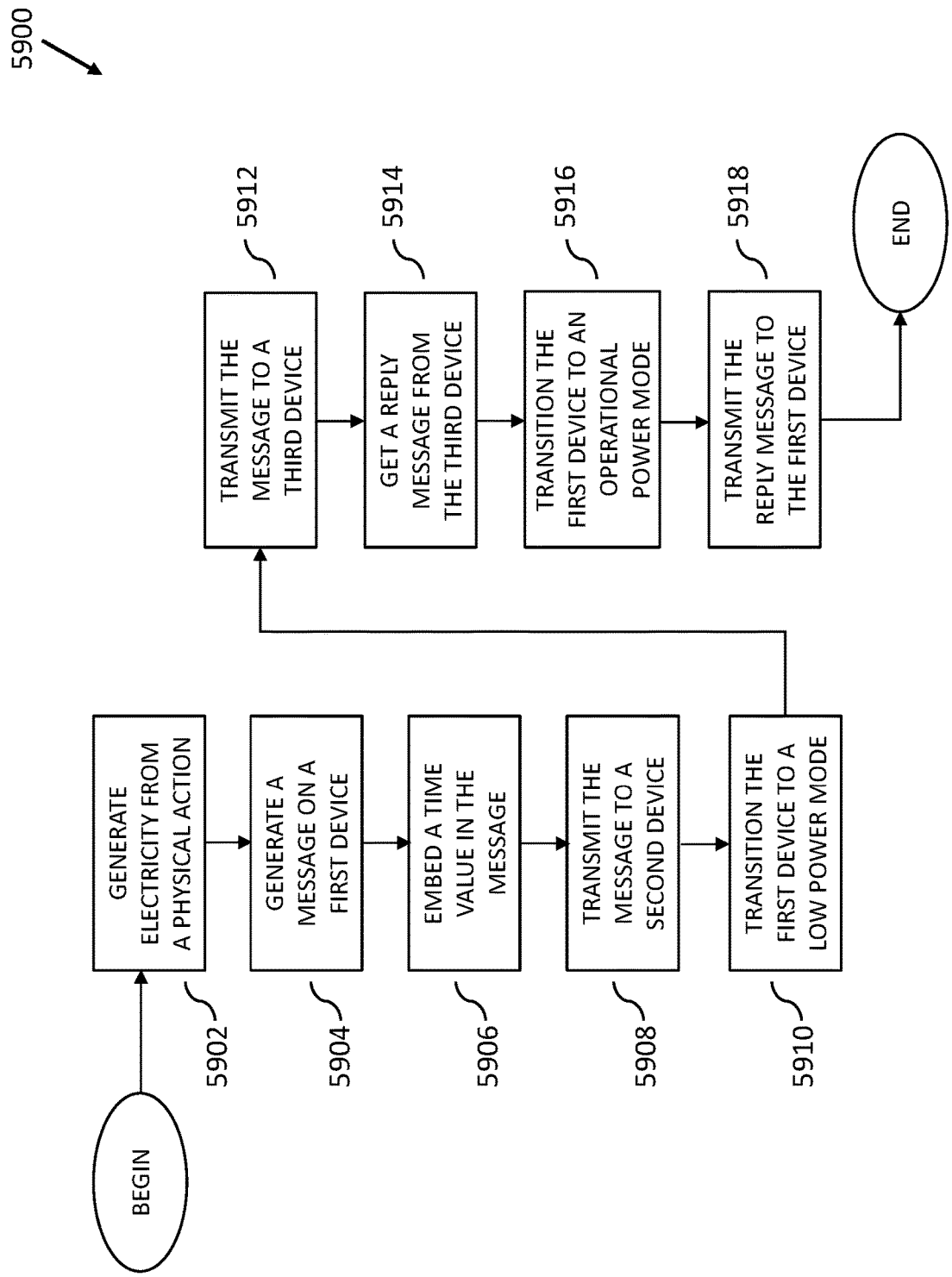
FIG. 59 is a schematic flow diagram of a procedure for interfacing an energy-harvesting node with a mesh network.

Referencing FIG. 59, an example procedure 5900 to operate an EH node 5802 is schematically depicted. The procedure 5900 includes an operation 5902 to generate electricity from a physical action. In certain embodiments, the operation 5902 includes any energy harvesting operation described throughout the present disclosure, and may include physical action, thermal action, photo-action, EM activity, displacement, deformation, and/or any other mechanism. The example procedure 5900 further includes an operation 5904 to generate a message on a first device (e.g., an EH node having an energy harvesting mechanism that performs operation 5902), in response to the generated electrical energy and/or the physical action. For example, a physical action may be a vibration, a deflection, and/or a deformation of a physical object (e.g., a window, door, or a surface) where the operation 5904 is generated to communicate the physical action and/or due to the available electrical energy generated (e.g., where the measured value and the harvesting operations are in the same dimension). Additionally or alternatively, the operation 5904 may be in response to only the physical action, where the EH node has stored or other energy available, and/or where the EH node is communicating a different message (e.g., not the physical action) but now has energy available to send the message. The example procedure 5900 further includes an operation 5906 to embed a time value into the message—for example to communicate to a receiving device that the EH node is going into a low power mode for a period of time to preserve power consumption and give the receiving device, or another device downstream, time to process and/or reply to the message.

The example procedure 5900 further includes an operation 5908 to transmit the generated message—for example to another wireless device such as a node on a mesh network, another EH node communicatively available to the EH node performing the operation 5904, and/or to a repeater or the like. The example procedure 5900 further includes an operation 5910 to transition the first device into a low power mode (e.g., the EH node that generates the message), and an operation 5912 to transmit the message on to a third device (e.g., the second device transmitting the message to a mesh network and/or within the mesh network). The example procedure 5900 further includes an operation 5914 to get a reply message from the third device (e.g., the second device receives a supply from the mesh network). The example procedure 5900 further includes an operation 5916 to transition the first device from the low power mode to an operational mode (e.g., at the expiration of the time communicated in the message), and an operation 5918 to transmit the reply message (e.g., from the second device back to the first device, after the second device determines that the time communicated in the message has elapsed). Accordingly, utilizing one or more operations of the procedure 5900, operations of a low power EH node may be improved, including lower utilization of network resources, repeated messages, unnecessary power consumption from futile messages and/or monitoring on a network, and the like. Additionally or alternatively, energy harvesting operations may be synchronized with detection operations (e.g., where vibration is detected and generates electrical energy), and/or may be at least partially independent (e.g., where the detected and harvesting operations are de-coupled at least partially, such as being in distinct dimensions and/or utilizing energy storage on the EH node).

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a non-transitory storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent, non-transitory storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

All documents referenced herein are hereby incorporated by reference.

What is claimed is:

1. A system, comprising:
a radio frequency (RF) wireless energy-harvesting device comprising an energy-harvesting mechanism, a message generation facility, and a transmission facility; and
an RF wireless mesh network comprising a plurality of RF mesh network nodes, wherein at least a first of the plurality of RF mesh network nodes is at least intermittently communicatively coupled to the RF wireless energy-harvesting device;
wherein the RF wireless energy-harvesting device is configured to:
generate electrical energy from a harvesting action of the energy-harvesting mechanism;
generate a broadcast message through the message generation facility; and
transmit the broadcast message through the transmission facility;
wherein the first of the plurality of RF mesh network nodes is configured to receive the broadcast message and transmit the broadcast message as a network message to at least a second of the plurality of RF mesh network nodes;
wherein the energy-harvesting device is further configured to:
set a device timer for a period of time;
transition to a low-power mode until the device timer reaches the end of the period of time; and
transition from the low-power mode to an operational mode and monitor for reception of a reply message from one of the plurality of RF mesh network nodes; and
wherein the energy-harvesting device is further configured to embed a time value into the broadcast message that corresponds to the period of time set in the device timer.

2. The system of claim 1, wherein the first of the plurality of RF mesh network nodes is configured to decode the broadcast message, determine the time value, and set a network timer in response to the period of time.

3. The system of claim 2, wherein the first of the plurality of RF mesh network nodes is further configured to receive a response network message from the at least second of the plurality of RF mesh network nodes and transmit the reply message to the RF wireless energy-harvesting device in response to the response network message and the network timer.

4. The system of claim 1, wherein the first of the plurality of RF mesh network nodes acts as a network node proxy for the RF wireless energy-harvesting device, and wherein the plurality of RF mesh network nodes communicate with the network node proxy as if it were the originator of the network message.

5. The system of claim 1, wherein the RF wireless energy-harvesting device operates solely from energy generated in the energy-harvesting mechanism.

6. The system of claim 1, wherein the energy-harvesting mechanism comprises at least one energy harvesting mechanism selected from the mechanisms consisting of:
a piezo-electric mechanism;
a thermal-electric mechanism;
a photo-electric mechanism;
an RF recovery mechanism;
an inductive mechanism; and
a chemical gradient mechanism.

7. A system, comprising:
an RF wireless energy-harvesting device comprising an energy-harvesting mechanism, a message generation facility, and a transmission facility, wherein the RF wireless energy-harvesting device is configured to:
generate electrical energy from a harvesting action of the energy-harvesting mechanism;
generate messages through the message generation facility; and
transmit messages through the transmission facility to at least one RF wireless device;
wherein the RF wireless energy-harvesting device is further configured to:
set a device timer for a period of time;
transition to a low-power mode until the device timer reaches the end of the period of time; and
transition from the low-power mode to an operational mode and monitor for reception of a reply message; and
wherein the RF wireless energy-harvesting device is further configured to embed a time value into the broadcast message that corresponds to the period of time set in the device timer.

8. The system of claim 7, wherein the message is a broadcast message and the at least one RF wireless device comprises a member of a mesh network.

9. The system of claim 7, wherein the at least one RF wireless device that receives the transmitted message from the RF wireless energy-harvesting device acts as a repeater and retransmits the message to another RF wireless device comprising a member of a mesh network.

10. The system of claim 7, wherein the energy-harvesting mechanism generates the electrical energy at least in part from the single physical action.

11. The system of claim 7, further comprising a second RF wireless energy-harvesting device, wherein the RF wireless energy-harvesting device and the second RF wireless energy-harvesting device are activated by a single physical action.

12. The system of claim 11, wherein the RF wireless energy-harvesting device and the second RF wireless energy-harvesting device both broadcast messages from the single physical action.

13. The system of claim 12, wherein the messages broadcast by both the RF wireless energy-harvesting device and the second RF wireless energy-harvesting device are received by a at least one RF wireless device comprising a member of a mesh network.

14. A method, comprising:
generating electrical energy on a first wireless device in response to a physical action;
setting a device timer for a period of time within the first wireless device;
generating a message on the first wireless device in response to the physical action and the generated electrical energy, wherein the generating the message comprises embedding a time value in the message that corresponds to the period of time set in the device timer; and transmitting the generated message to a second wireless device;

transitioning the first wireless device into a low-power mode after the transmitting; and transitioning the first wireless device from the low-power mode to an operational mode after an expiration of the time value in the low-power mode.

15. The method of claim 14, further comprising transmitting the generated message from the second wireless device to a third wireless device, and receiving a reply message from the third wireless device at the second wireless device.

16. The method of claim 15, further comprising transmitting the reply message from the second wireless device to the first wireless device after the expiration of the time value in the generated message.

* * * * *